US012361443B2

(12) United States Patent
Glazier et al.

(10) Patent No.: US 12,361,443 B2
(45) Date of Patent: *Jul. 15, 2025

(54) SYSTEM THAT ACTIVATES MONETIZATION AND APPLIES A PAYMENT METHOD

(71) Applicant: WILDFIRE SYSTEMS, INC., Solana Beach, CA (US)

(72) Inventors: Jordan Glazier, Rancho Santa Fe, CA (US); Ian Miller, Solana Beach, CA (US); Lloyd Daniel Markham, Jr., San Diego, CA (US); Chase Robert Glazier, Rancho Santa Fe, CA (US)

(73) Assignee: WILDFIRE SYSTEMS, INC., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,063

(22) Filed: Jun. 7, 2022

(65) Prior Publication Data

US 2022/0300998 A1    Sep. 22, 2022

Related U.S. Application Data

(63) Continuation-in-part of application No. 16/984,306, filed on Aug. 4, 2020, now Pat. No. 11,354,694.
(Continued)

(51) Int. Cl.
*G06Q 30/0214*    (2023.01)
*G06Q 30/0207*    (2023.01)
(Continued)

(52) U.S. Cl.
CPC ..... *G06Q 30/0214* (2013.01); *G06Q 30/0239* (2013.01); *G06Q 50/01* (2013.01); *H04L 67/535* (2022.05); *H04L 67/02* (2013.01)

(58) Field of Classification Search
None
See application file for complete search history.

(56) References Cited

U.S. PATENT DOCUMENTS 7,630,937 B1 * 12/2009 Mo ........................ G06Q 30/04
705/40
7,664,726 B2    2/2010 Jain et al.
(Continued)

FOREIGN PATENT DOCUMENTS

KR    10-2009-0081957    7/2009
KR        10-1445054    9/2014
(Continued)

OTHER PUBLICATIONS

IP.com "Dynamically Matching Coupons from Targeted Competitors" Aug. 1, 2001; IMB pp. 1-3 (Year: 2001).*
(Continued)

*Primary Examiner* — Rashida R Shorter
(74) *Attorney, Agent, or Firm* — ARC IP Law, PC; Joseph J. Mayo

(57) ABSTRACT

System that determines when a user is about to make a purchase, and that activates a monetization offer available for the purchase, such as a discount or cashback, and selects a payment method for completing the transaction. The system accesses a database of the user's payment methods, such as credit cards or funds transfer accounts. The database may contain any information needed for payment, such as account numbers, names, addresses, expiration dates, and verification codes. Some payment methods may be associated with additional benefits such as cashback offers or points. When an application reaches a screen associated with payment, the system automatically populates the application with payment information. Some payment methods may support one-time use account numbers, and the system may automatically retrieve and enter these numbers. A link to the
(Continued)

selected monetization offer is inserted into the application so the offer is activated and applied after completing purchase.

9 Claims, 40 Drawing Sheets

Related U.S. Application Data which is a continuation of application No. 16/846,451, filed on Apr. 13, 2020, now Pat. No. 10,733,622, which is a continuation-in-part of application No. 16/681,468, filed on Nov. 12, 2019, now Pat. No. 10,643,230, which is a continuation-in-part of application No. 16/520,209, filed on Jul. 23, 2019, now Pat. No. 10,540,671, which is a continuation-in-part of application No. 15/826,585, filed on Nov. 29, 2017, now Pat. No. 10,402,845, which is a continuation of application No. 15/706,637, filed on Sep. 15, 2017, now Pat. No. 10,169,770, which is a continuation-in-part of application No. 15/483,791, filed on Apr. 10, 2017, now Pat. No. 10,229,427.

(51) Int. Cl.
  *G06Q 50/00* (2012.01)
  *H04L 67/50* (2022.01)
  *H04L 67/02* (2022.01)

(56) References Cited

U.S. PATENT DOCUMENTS

| | | | |
|---|---|---|---|
| 8,027,883 B2 | 9/2011 | Donaldson | |
| 8,103,547 B2 | 1/2012 | Mah et al. | |
| 8,521,818 B2 | 8/2013 | McGann et al. | |
| 8,849,931 B2 | 9/2014 | Linner et al. | |
| 9,348,813 B2 | 5/2016 | Mankovich et al. | |
| 10,164,932 B2 | 12/2018 | Attolini et al. | |
| 2005/0149851 A1 | 7/2005 | Mittal | |
| 2006/0129455 A1 | 6/2006 | Shah | |
| 2008/0154951 A1* | 6/2008 | Martinez | G06Q 30/02 705/14.69 |
| 2011/0004525 A2 | 1/2011 | Byrne | |
| 2011/0106746 A1 | 5/2011 | Ventilla et al. | |
| 2011/0145057 A1 | 6/2011 | Jones et al. | |
| 2012/0010940 A1* | 1/2012 | Masi | G06Q 30/02 705/14.1 |
| 2012/0041838 A1 | 2/2012 | Serbanescu | |
| 2012/0084160 A1 | 4/2012 | Badros et al. | |
| 2012/0173367 A1 | 7/2012 | Soroca et al. | |
| 2012/0215871 A1 | 8/2012 | Zhang | |
| 2012/0316948 A1 | 12/2012 | Shipley et al. | |
| 2013/0041733 A1* | 2/2013 | Officer | G06Q 50/01 705/14.16 |
| 2013/0066722 A1 | 3/2013 | Alkatib | |
| 2013/0173367 A1 | 7/2013 | Beighley, Jr. | |
| 2013/0204703 A1 | 8/2013 | Carlson et al. | |
| 2013/0246225 A1 | 9/2013 | Blitz | |
| 2013/0246323 A1 | 9/2013 | Athas et al. | |
| 2013/0346841 A1 | 12/2013 | Ahmed et al. | |
| 2014/0067501 A1 | 3/2014 | Rozenvasser | |
| 2014/0172812 A1 | 6/2014 | Chisalita | |
| 2014/0282016 A1 | 9/2014 | Hosier | |
| 2014/0292016 A1 | 10/2014 | Masuda | |
| 2015/0007307 A1 | 1/2015 | Grimes et al. | |
| 2015/0019203 A1 | 1/2015 | Smith et al. | |
| 2015/0154623 A1 | 6/2015 | Jin et al. | |
| 2016/0155175 A1 | 6/2016 | Isaacson et al. | |
| 2016/0283951 A1 | 9/2016 | Boss et al. | |
| 2017/0011383 A1 | 1/2017 | Melzer | |
| 2017/0061460 A1 | 3/2017 | Kwon | |
| 2017/0186027 A1* | 6/2017 | Hudson | G06Q 30/0222 |
| 2017/0279747 A1 | 9/2017 | Melzer et al. | |
| 2018/0182014 A1 | 6/2018 | Cheng | |
| 2018/0204197 A1* | 7/2018 | Guyot | G06Q 20/20 |

FOREIGN PATENT DOCUMENTS

| | | | |
|---|---|---|---|
| KR | 10-2014-0122330 | 10/2014 | |
| KR | 10-2015-0023308 | 3/2015 | |
| WO | WO-2009126851 A1 * | 10/2009 | ............ G06Q 30/00 |
| WO | 20140197635 A2 | 12/2014 | |
| WO | 2016046824 A1 | 3/2016 | |

OTHER PUBLICATIONS

Office Action issued in South Korea Application No. 10-2019-7033361 on Jun. 21, 2022, and translation thereof.
"Self-expression shouldn't be limited to text", webpage retrieved on Apr. 17, 2017, from http://tapslash.com/features, 8 pages.
Pierce, David, "Super-Smart Apps are Invading our Keyboards", web article dated Sep. 22, 2015, retrieved from https://www.wired.com/2015/09/keyboards-invaded-super-smart-apps/, Wired, 9 pages.
"Thirsty Affiliates Autolinker Add-On", webpage retrieved on Apr. 19, 2017, retrieved from https://thirstyaffiliates.com/product/thirstyaffiliates-autolinker-addon, 6 pages.
Grant, Rebecca, "SkimLinks helps publishers nail affiliate marketing, no wooing required", web article dated Apr. 22, 2013, retrieved from https://venturebeat.com/2013/04/22/skimlinks-helps-publishers-nail-affiliate-marketing-no-wooing-required/, Venture Beat, 4 pages.
"Skimlinks Launches SkimWords 2.0, an Advanced In-text Monetization Solution Driving E-Commerce", web article dated Oct. 26, 2011, retrieved from http://www.prnewswire.com/news-releases/skimlinks-launches-skimwords-20-an-advanced-in-text-monetization-solution-driving-e-commerce-132606883.html, PR Newswire, 3 pages.
Webpage retrieved on Apr. 19, 2017, retrieved from http://www.affilinker.com/affiliate-wordpress-plugin/, AffiLinker, 10 pages.
"Transform your sit into a thriving ecommerce business", Webpage retrieved on Apr. 19, 2017, retrieved from http://www.viglink.com/, VigLink, 4 pages.
"Instant Links Inserter—Convert Words to Links", Webpage retrieved on Apr. 19, 2017, retrieved from http://www.affiliateswitchblade.com/content-creation/instant-links-inserter.htm, Affiliates Switch Blade, 9 pages.
Patterson, Ben, "Too much tapping? Create your own Android and iOS keyboard shortcuts", web article dated Nov. 14, 2014, retrieved from http://www.pcworld.com/article/2847469/too-much-tapping-create-your-own-android-and-ios-keyboard-shortcuts.html, PCWORLD, 2 pages.
"How to use Shortcuts with SwiftKey Keyboard for Android", web article retrieved on Apr. 19, 2017 from https://support.swiftkey.com/hc/en-us/articles/213711789-How-to-use-Shortcuts-with-SwiftKey-Keyboard-for-Android, SwiftKey Support, 3 pages.
Raj, Vijay, "Meet Xploree, an Intelligent NLP Powered Keyboard for Android", web article dated Nov. 19, 2016, retrieved from https://www.tech.ink/1324/meet-xploree-keyboard-android, Tech Ink, 10 pages.
"What's the difference between predictive keyboards and predictive text?", web article dated Nov. 12, 2014, retrieved from https://blog.swiftkey.com/whats-difference-predictive-keyboards-predictive-text/, SwiftKey Blog, 5 pages.
Henry, Alan, "How Predictive Keyboards Work (and How You Can Train Yours Better)", web article dated Oct. 8, 2014, retrieved from http://lifehacker.com/how-predictive-keyboards-work-and-how-you-can-train-yo-1643795640, Lifehacker, 10 pages.
International Search Report and Written Opinion received in PCT/US2018/025223, dated Jun. 22, 2018 (6 pages).
International Preliminary Report on Patentability received in PCT/US2018/025223, dated Oct. 15, 2019 (4 pages).
Xiaoxing Gao and Xueyongli, Xu Han; "Studying and Implementation of Embedded System's Code Replacement Technique" (IEEE 2008) (2008).
Office Action issued in EP18784757.9 on Nov. 21, 2023 (13 pages).

\* cited by examiner

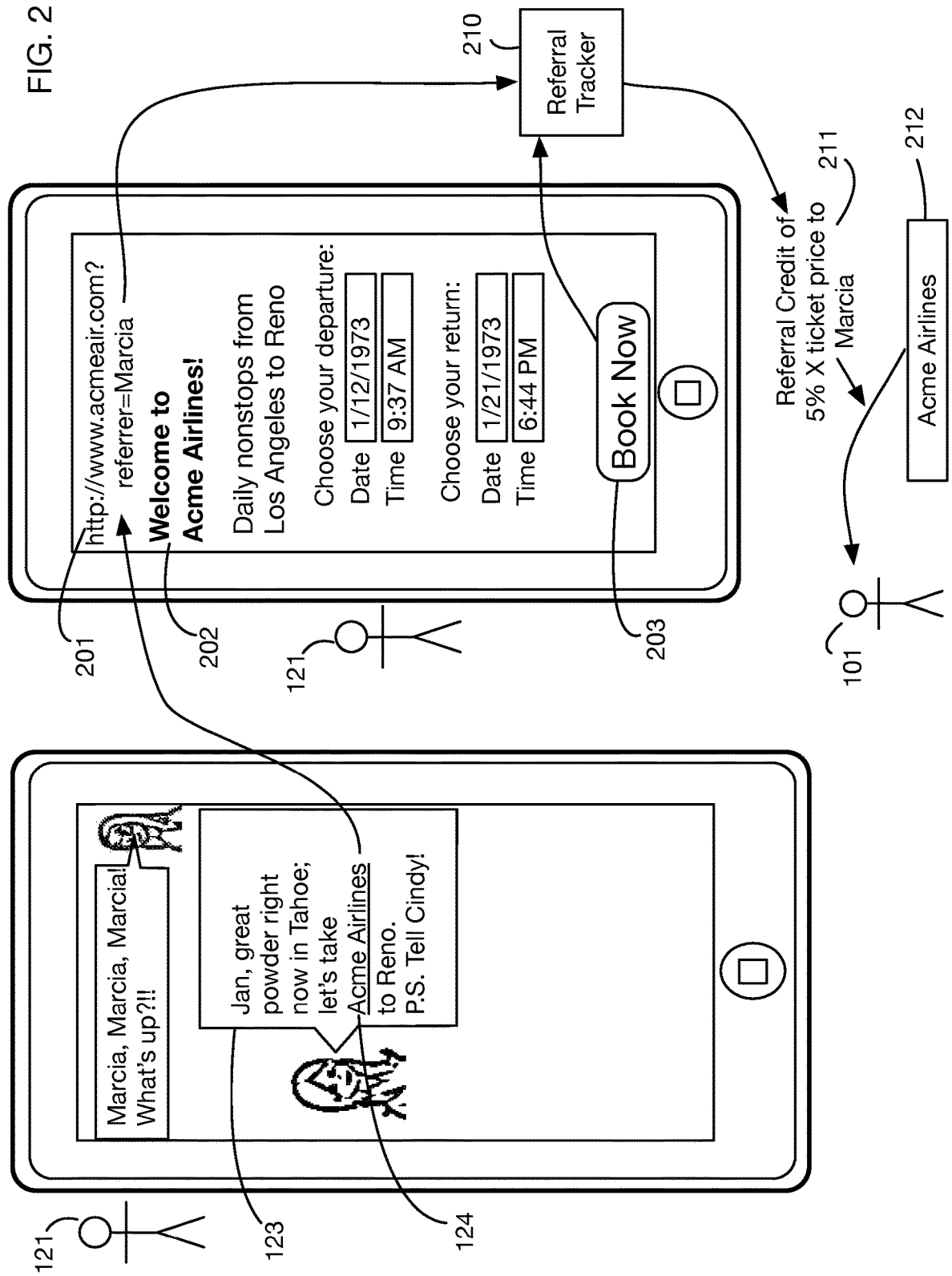

Keyboard Input Process Flow

Process Flow with Two Stage Referral Matching

Share Button Process Flow

User Initiated Lookup Process Flow

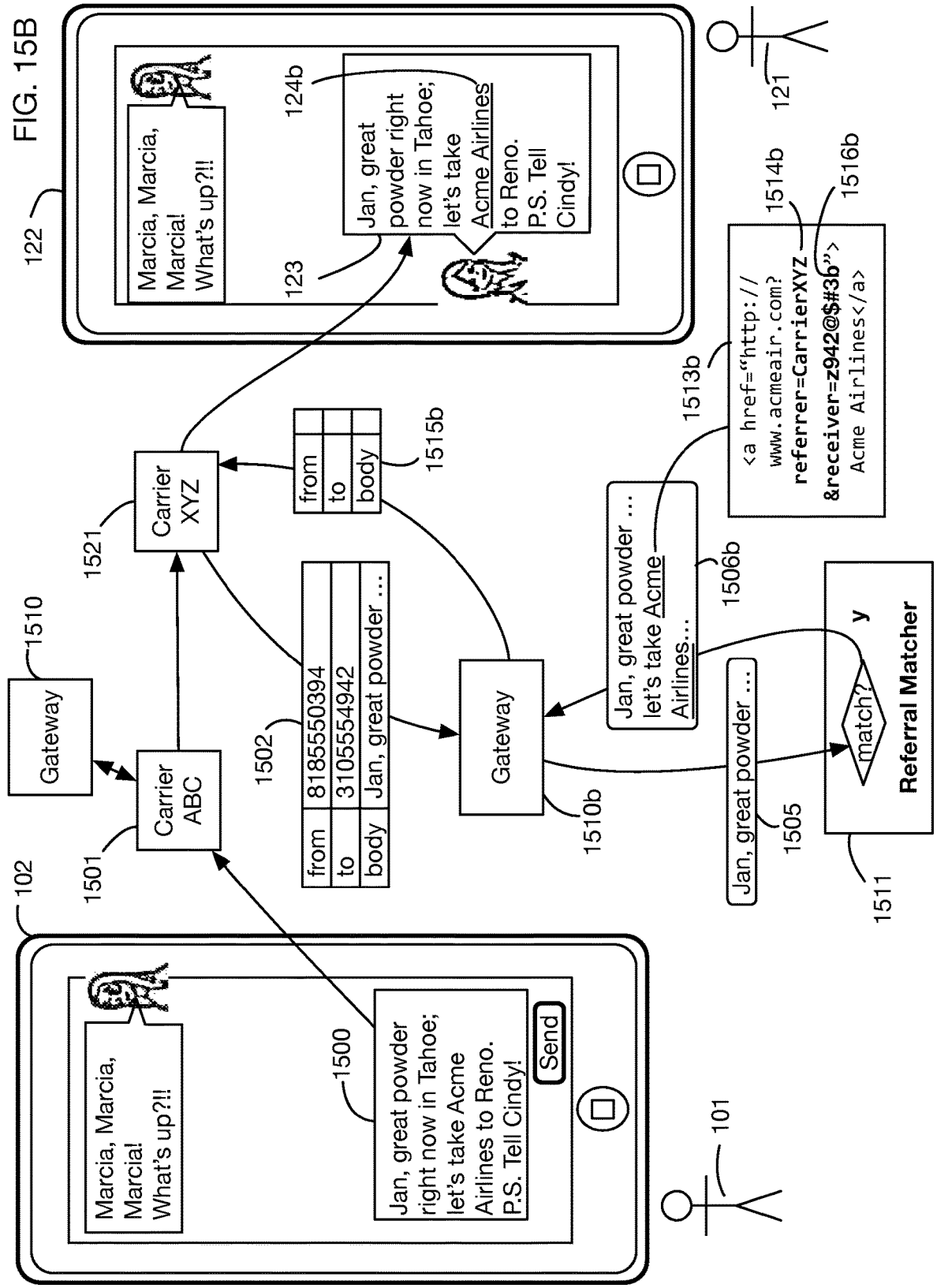

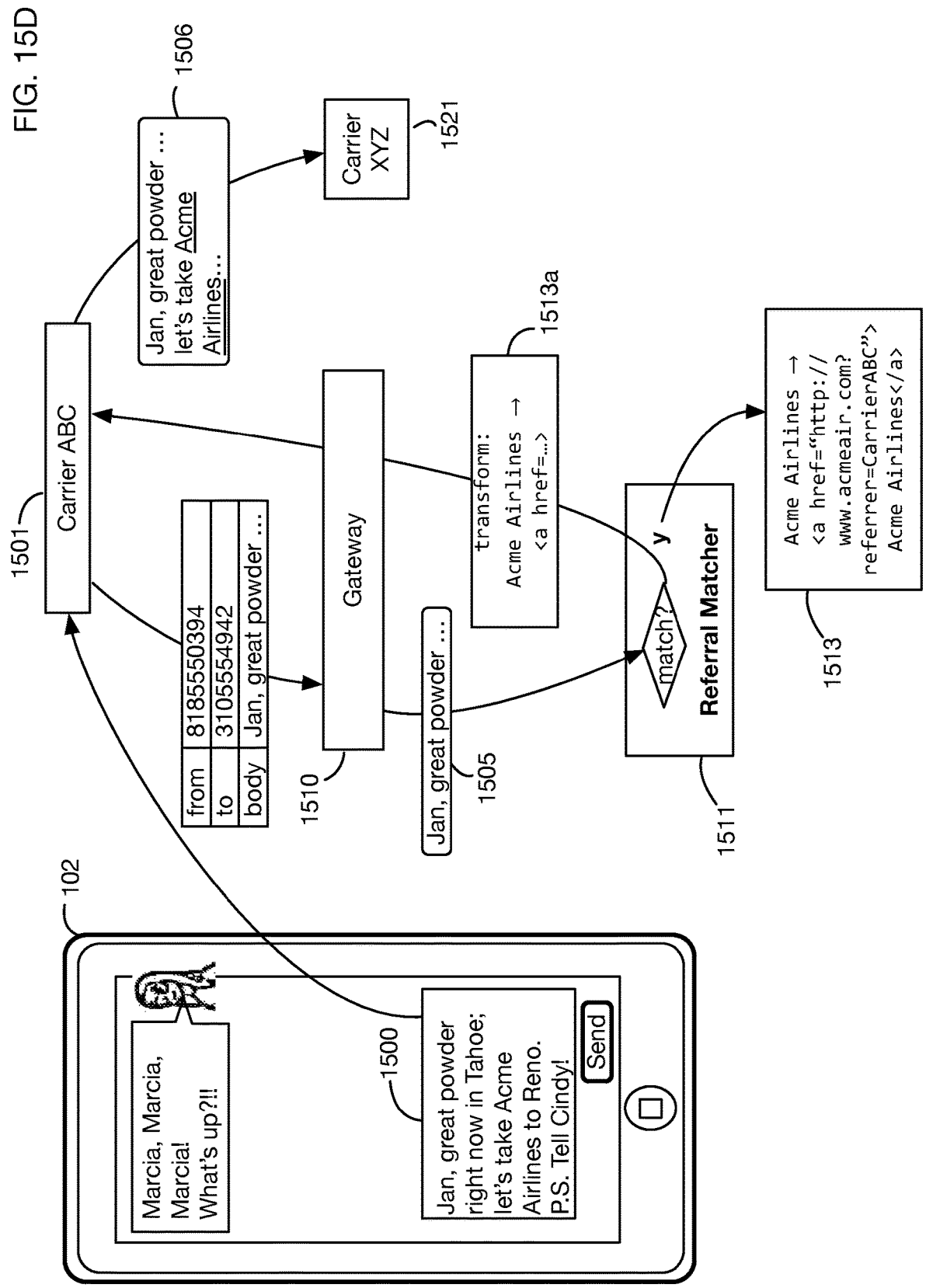

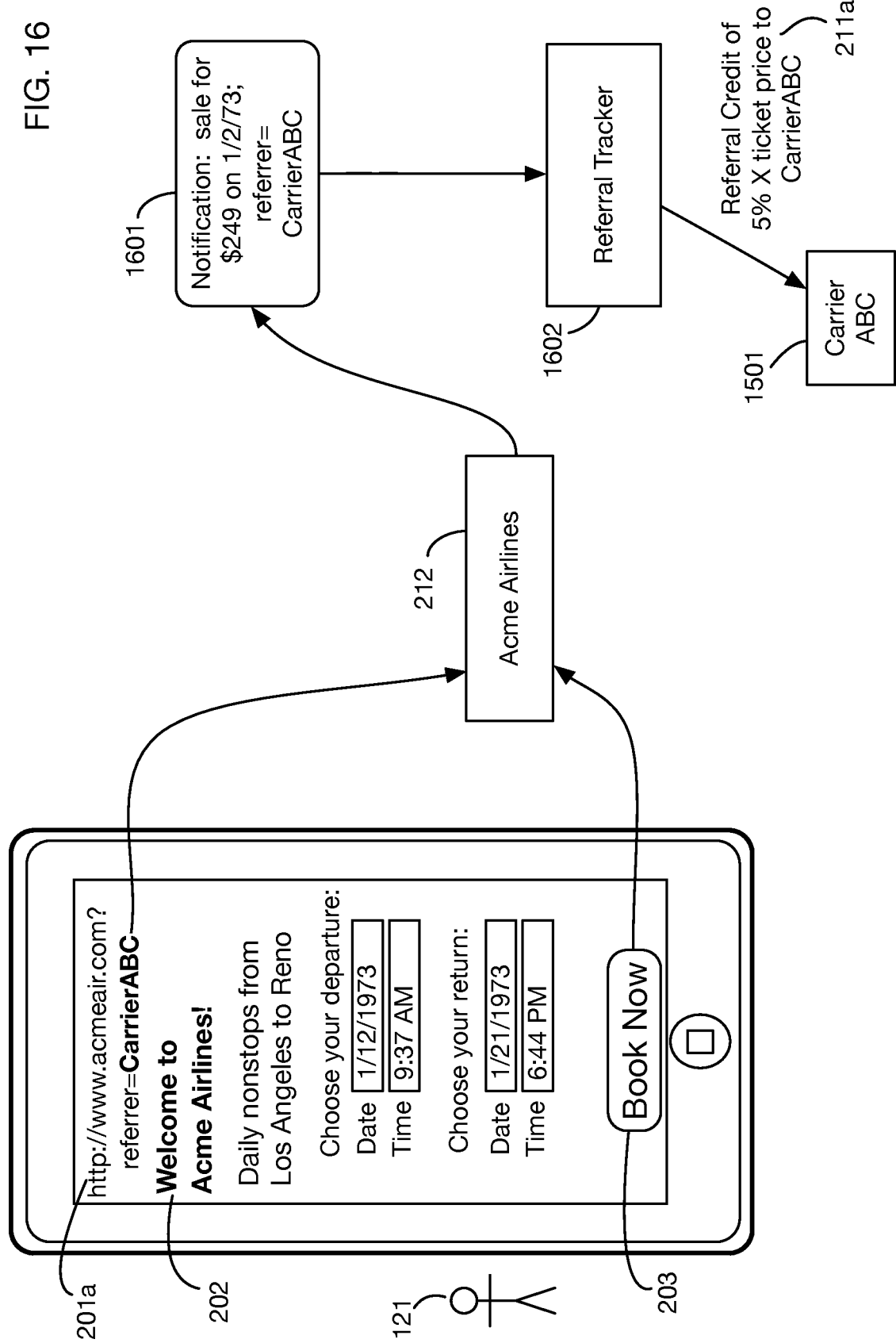

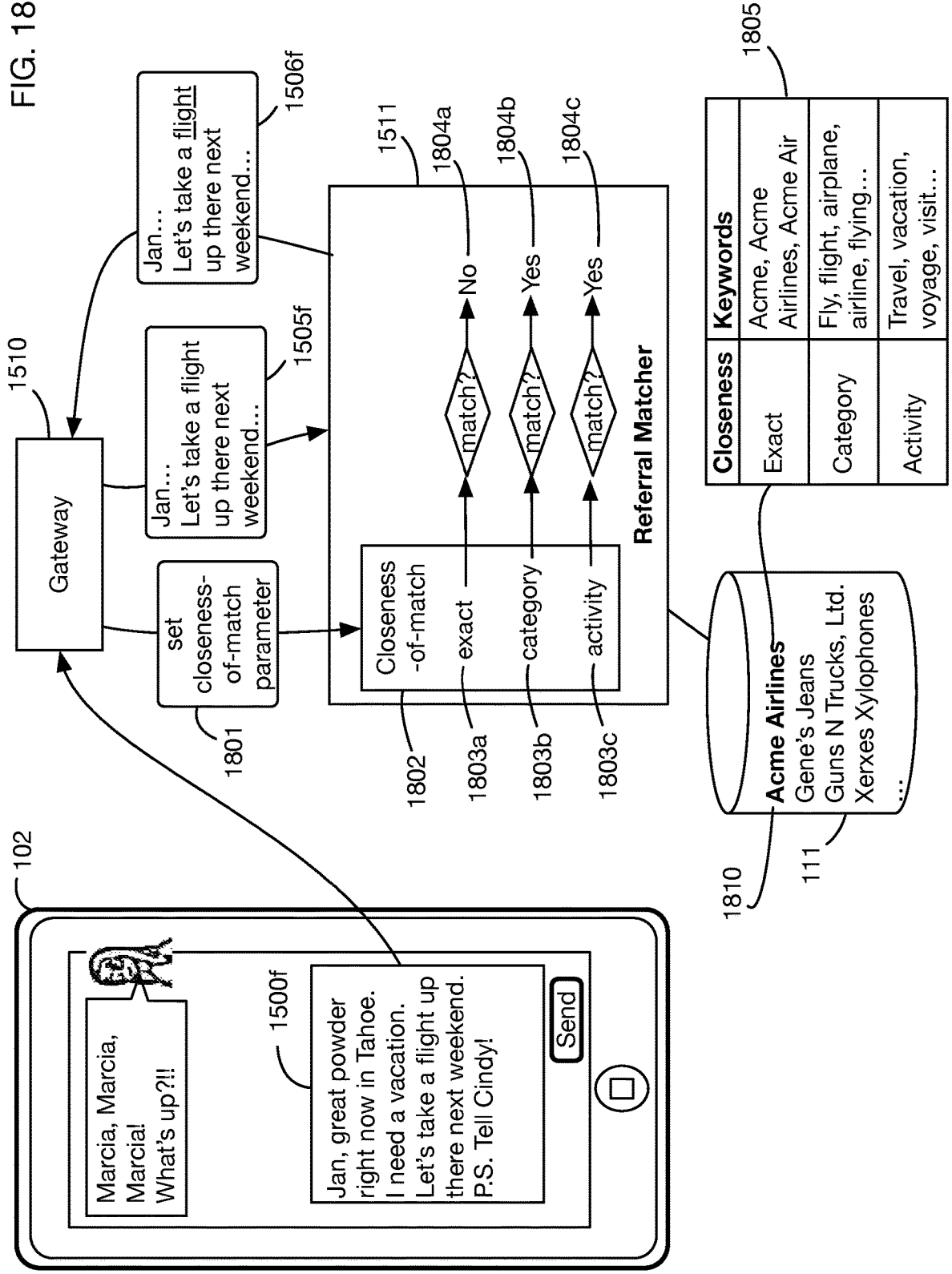

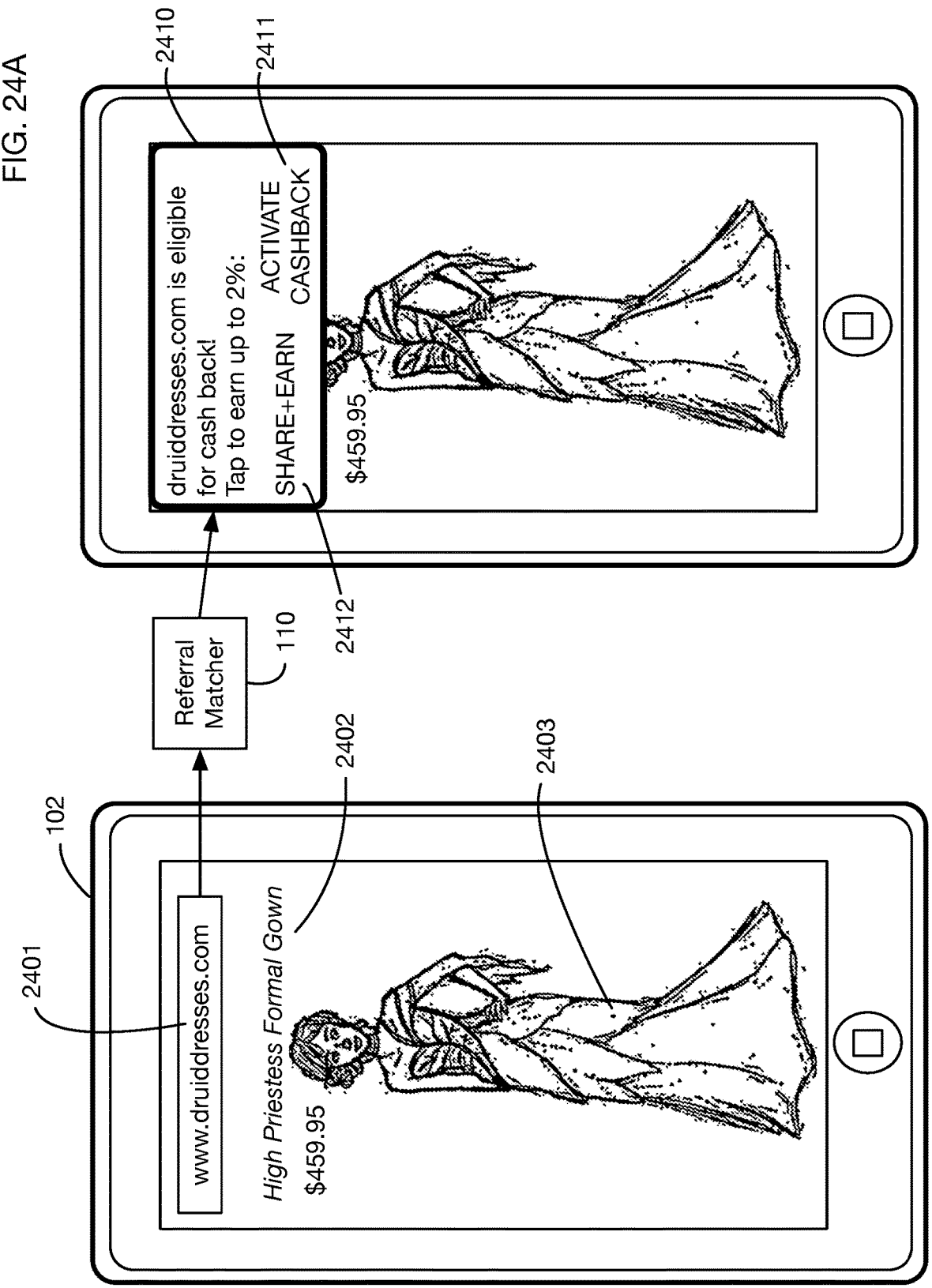

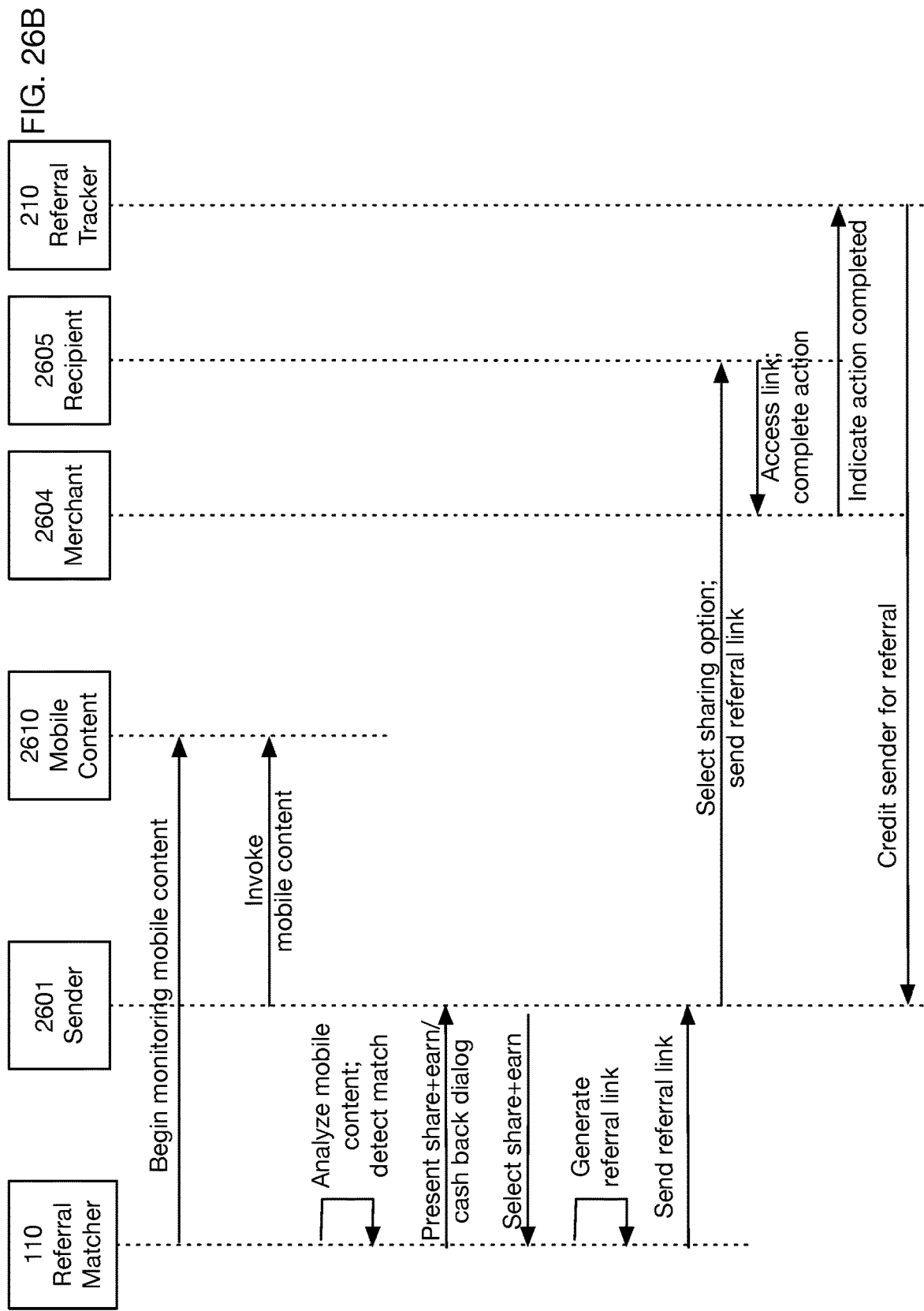

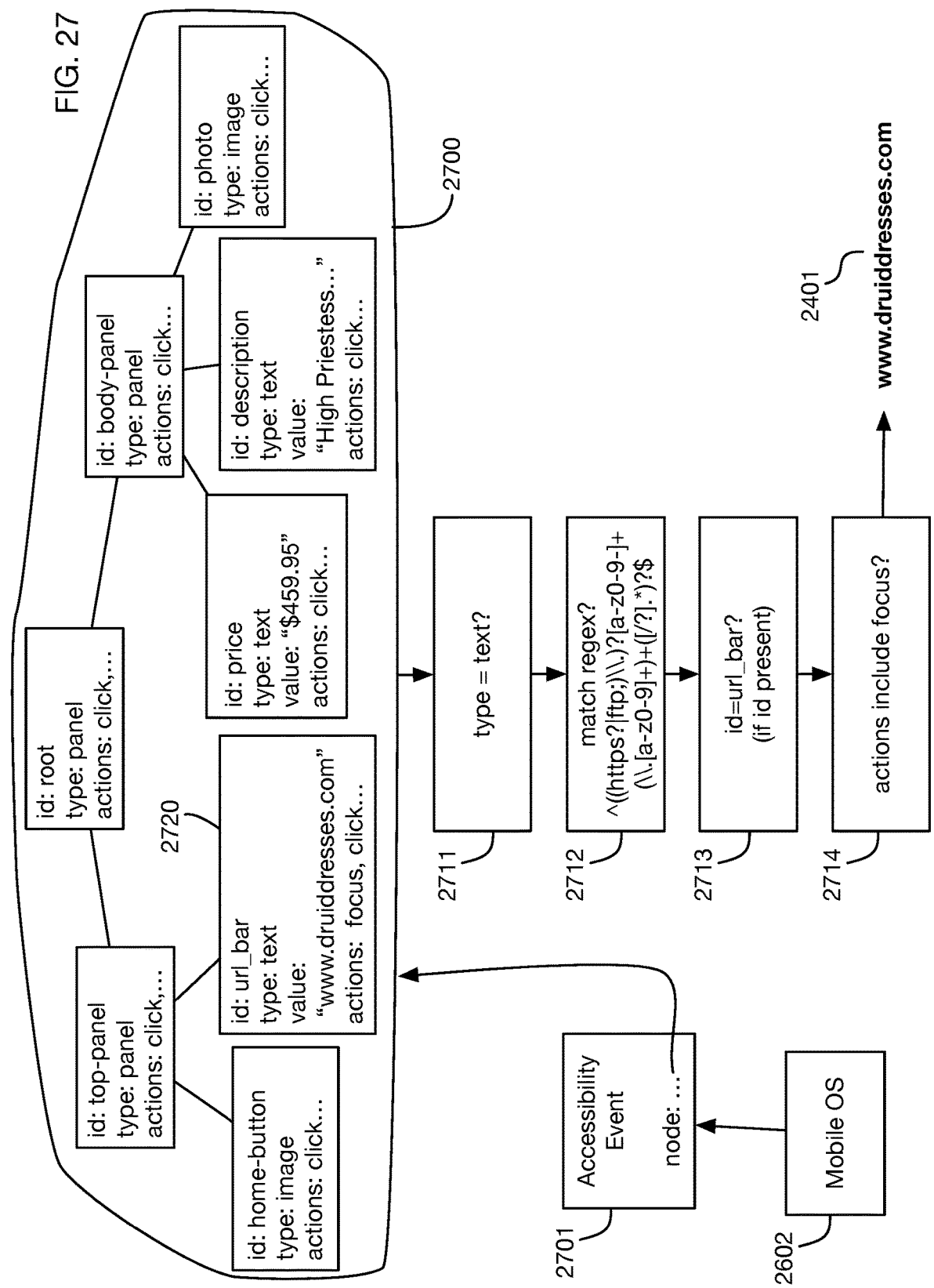

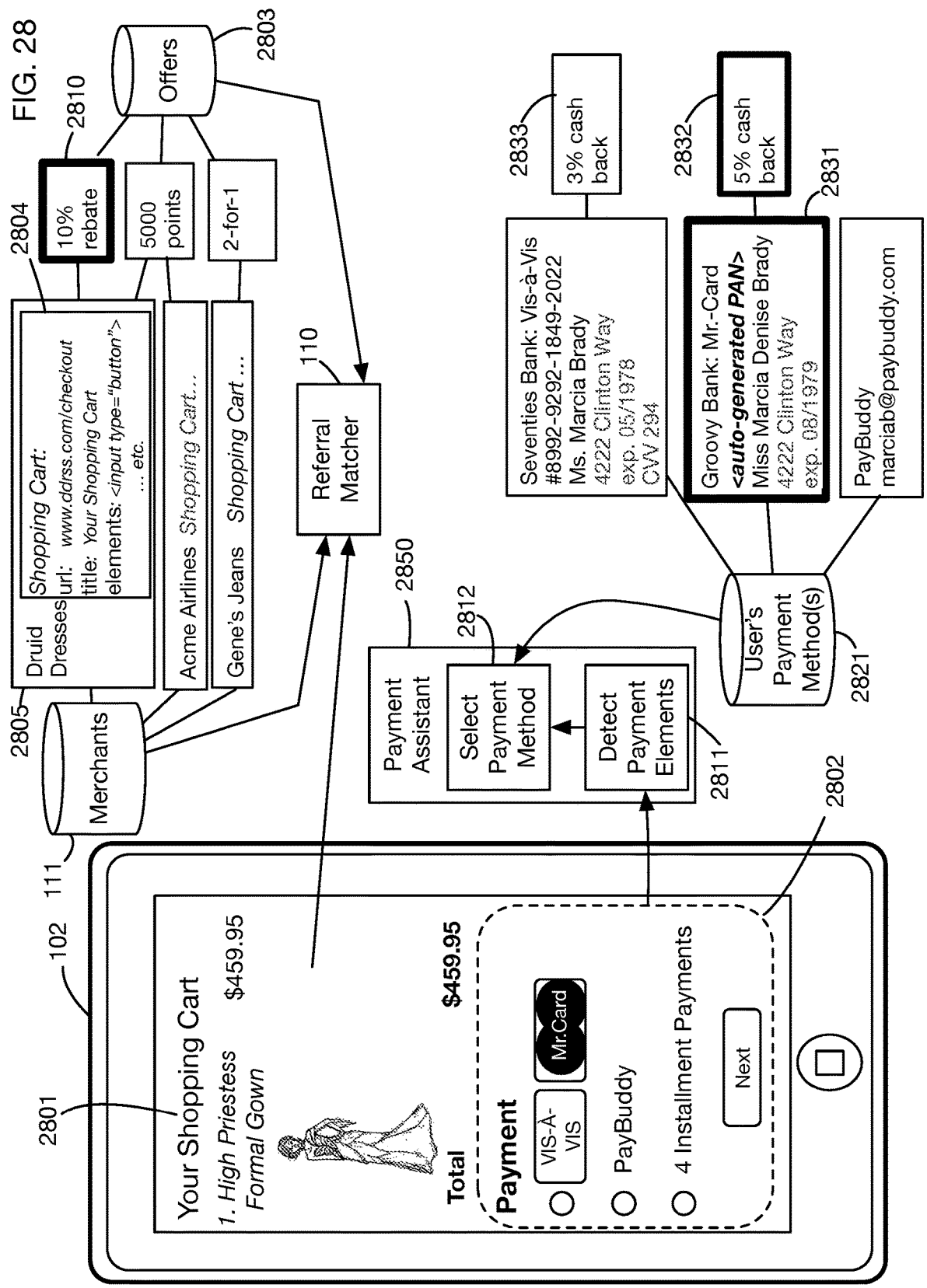

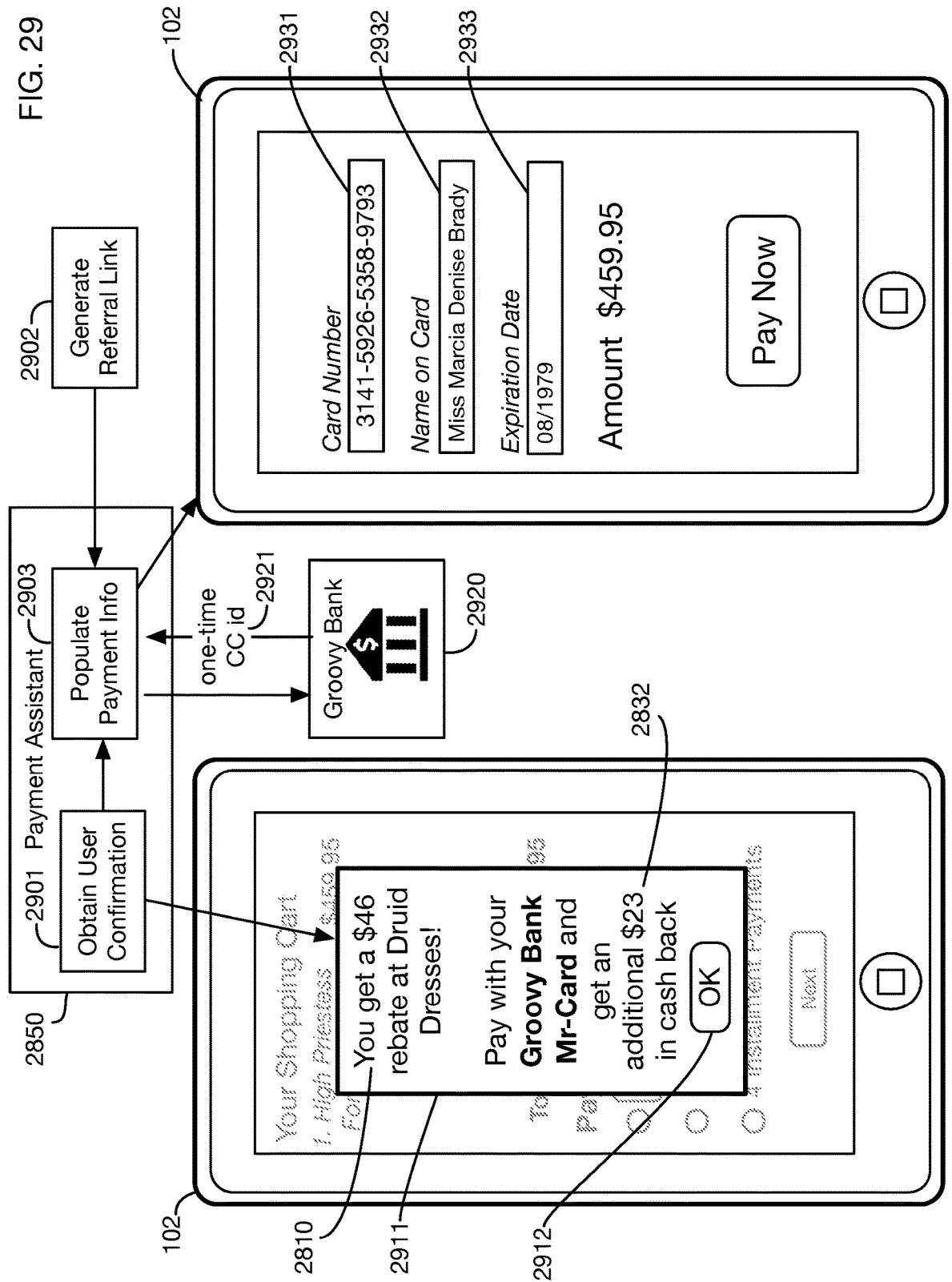

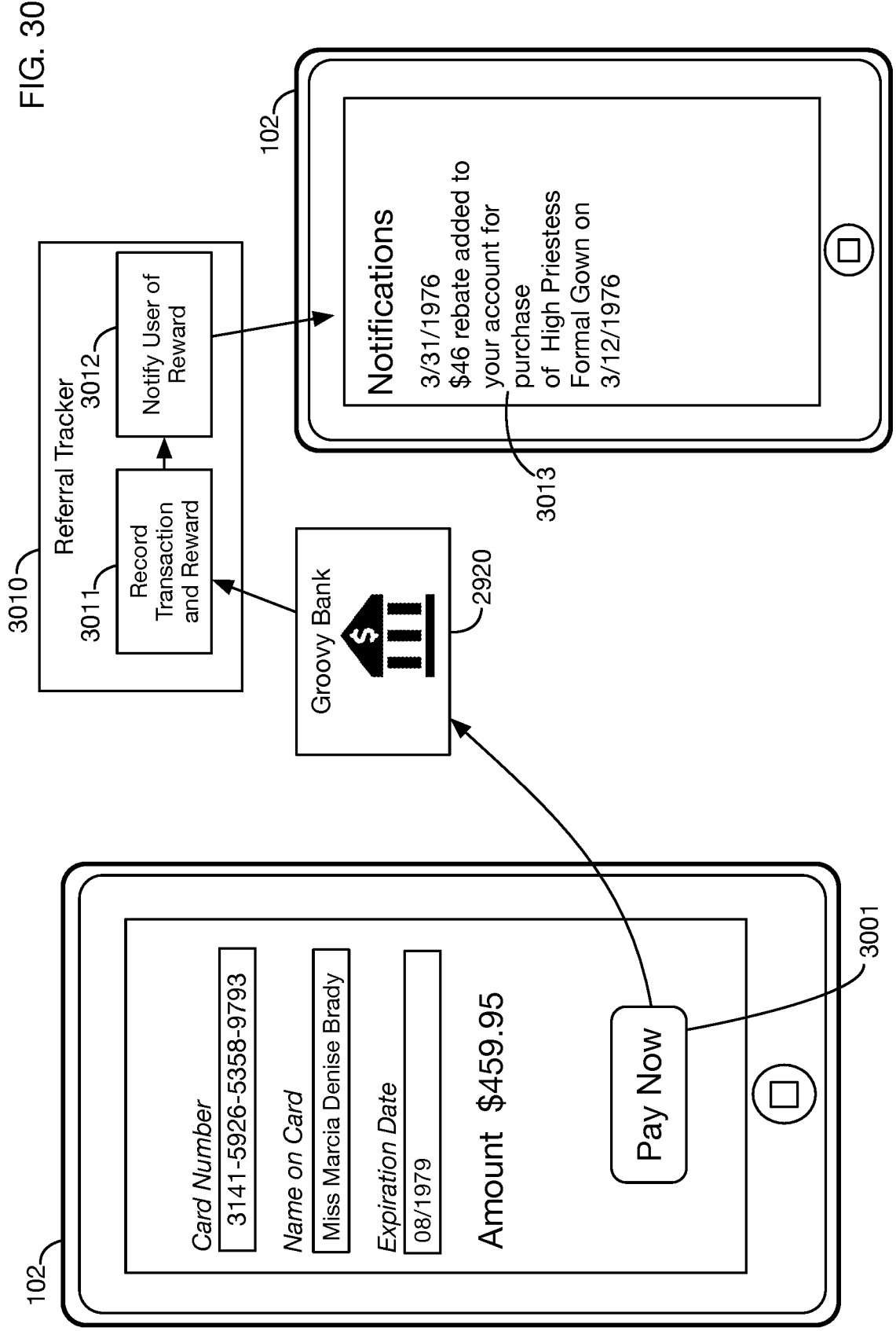

SYSTEM THAT ACTIVATES MONETIZATION AND APPLIES A PAYMENT METHOD

This application is a continuation-in-part of U.S. Utility patent application Ser. No. 16/984,306 filed 4 Aug. 2020, which is a continuation of U.S. Utility patent application Ser. No. 16/846,451, filed on 13 Apr. 2020, issued as U.S. Pat. No. 10,733,622, which is a continuation-in-part of U.S. Utility patent application Ser. No. 16/681,468 filed 12 Nov. 2019, issued as U.S. Pat. No. 10,643,230, which is a continuation-in-part of U.S. Utility patent application Ser. No. 16/520,209 filed 23 Jul. 2019, issued as U.S. Pat. No. 10,540,671, which is a continuation-in-part of U.S. Utility patent application Ser. No. 15/826,585 filed 29 Nov. 2017, issued as U.S. Pat. No. 10,402,845, which is a continuation of U.S. Utility patent application Ser. No. 15/706,637 filed 15 Sep. 2017, issued as U.S. Pat. No. 10,169,770, which is a continuation-in-part of U.S. Utility patent application Ser. No. 15/483,791 filed 10 Apr. 2017, issued as U.S. Pat. No. 10,229,427, the specifications of which are hereby incorporated herein by reference.

BACKGROUND OF THE INVENTION

Field of the Invention

One or more embodiments of the invention are related to the fields of data processing, electronic communication systems, digital advertising, referral reward systems for example as related to electronic commerce. More particularly, but not by way of limitation, one or more embodiments of the invention enable a system that activates monetization and applies a payment method, for example that utilizes at least one computer and at least one application specifically programmed to identify a reward available to a user and to apply a payment method based on contents of an application user interface.

Description of the Related Art

Several technology platforms exist for digital promotion of advertisers, brands, products, and services. However, these existing platforms fail to address digital word-of-mouth promotion, or peer-to-peer digital communications, where one consumer or user promotes or mentions a brand, product, merchant or service to one or more other users. Existing platforms include affiliate networks, social marketing, referral marketing, and influencer marketing. None of these existing platforms adequately address digital word-of-mouth promotion.

Affiliate networks are designed for professional content creators and digital publishers. These networks are not appropriate for digital word-of-mouth promotion, because consumers are generally unable or unwilling to participate in the potentially painstaking processes required to join an affiliate network, and to perform the steps involved in utilizing an affiliate network.

Social marketing platforms are typically limited to display of advertisements on social networks. As such these platforms are not actually "social" since they do not directly involve communications between consumers; instead ads simply appear adjacent to social interactions, sometimes utilizing optimization software, for example to make the ads contextually relevant to the social interaction.

Referral marketing platforms generally involve customized, one-off campaigns on behalf of an individual advertiser. These platforms are not built as a platform for digital word-of-mouth promotion across multiple products, services, or brands.

Influencer marketing platforms enlist influencers with large audiences for one-off campaigns. These platforms do not address true digital peer-to-peer word-of-mouth referrals among family and friends, for example.

There are no known platforms that provide practical and effective digital word-of-mouth referral capabilities in digital communications. There are no known platforms that are unobtrusive, automatic, simple, easy to use, intuitive, and that fit naturally within a peer-to-peer social dialogue. There are no known platforms that apply to essentially all prominent digital channels that people use to communicate with friends, family, and colleagues, such as social media, messaging applications, email, and SMS. There are no known platforms that easily enable people to embed trackable referral links within their digital communications with peers, provide rewards to the referrers, including cash-based incentives, and that provide a broad range of coverage of things the user recommends. There are no known platforms that integrate naturally within social dialogues and are helpful to the recipient, transparent, and non-promotional.

Some existing systems facilitate insertion of referral links into specific documents, such as blogs or web pages. These systems may for example be tools provided by affiliate networks, or plugins for web publishing tools such as WordPress®. A significant limitation of these systems is that they are coupled to specific applications or use cases. There are no known systems that integrate referral generation into general-purpose user input methods, such that the referral generation capability can be used across multiple applications or use cases.

There are also no known systems that provide a transparent method of detecting referrals within message content, inserting trackable referral links into communications with no action required on the part of the sending or receiving users, that protects the privacy of the sending and receiving users, and that rewards message intermediaries for inserting relevant referral links into messages.

There are also no known systems that analyze images to determine appropriate referral links associated with the images, and that track usage of these referral links to monetize the images.

There are existing systems that monitor a user's browsing session and present options to earn cashback or discounts when the user browses an eligible page or product. Examples include Amazon Assistant® and Swagbucks®. However, these systems do not support sharing of referral links with other users, and earning commissions or credits when these other users use the referral links to make purchases or perform other actions. There are also no known systems that automatically activate monetization when a user is about to purchase an item, and that also select and apply a payment method and enter payment information automatically to enable a purchase.

For at least the limitations described above there is a need for a system that activates monetization and applies a payment method.

BRIEF SUMMARY OF THE INVENTION

One or more embodiments described in the specification are related to a system that activates monetization and applies a payment method. Embodiments of the system may monitor the user interface content of an application such as a web browsing session to detect URLs or other content that can be referred to one or more recipients; the sender of the referral may receive a credit when a recipient uses the referral link. Embodiments of the invention may also analyze images to enable communication intermediaries or users to integrate referrals to participating merchants into communications; recipients of these referrals may digitally access the referred merchant, and the system may provide a credit to the referrer or a communications intermediary if a recipient completes a transaction with the referred merchant. Referral generation may be integrated into a mobile device operating system or application or may be integrated within a server or messaging gateway through which messages are conveyed, so that the referral capability may be used across multiple applications and for multiple use cases. A communications intermediary may be for example: a provider or operator of a communications channel or service; a provider or operator of a communications link or service anywhere in the path of a message between a sender or receiver; or a provider or operator of a messaging gateway or platform that may receive, store, forward, route, convey, direct, resend, transform, format, analyze, combine, filter, translate, edit, post, display, or otherwise handle any communication or message.

One or more embodiments of the invention include a database of one or more of participating merchants, a referral matcher that generates referrals to these merchants, and a referral tracker that tracks when a referral results in a transaction. The referral matcher may receive input from a referring user, for example as part of a communication generated by this referring user; it may then analyze this input to identify one or more products, services, merchants, brands, or promotions in the database that match the input. The referral matcher may then automatically generate a referral link and may insert this referral link into the communication. The referral matcher may automatically insert the referral link into the communication, or the referral matcher may prompt the referring user or receiving user to agree to the insertion of the referral link and may then insert the referral link into the communication. The referral link may also incorporate an identifier of the referring user or the communications intermediary, so that the referral may be tracked. A recipient, or receiving user, of the communication, may use the referral link to access a website or "site" or commerce site associated with the referred merchant. If the recipient performs a task, for example a transaction on this commerce site, the referral tracker generates a credit for the successful referral. This credit may be collected from the referred merchant. All, none or a portion of the credit may be remitted to or otherwise associated with the referring user or communications intermediary.

One or more embodiments of the system may analyze input associated with any type of digital communication, including for example, without limitation, a text message, an email message, a communication via a social media site, a posting on a message board, a communication via a messaging app, a Twitter® message, a Facebook® post, a Snapchat® message, a voice message, a voice signal that is converted to text, a video message, a picture message, a communication via Facebook®, a communication via social media, a communication via a shopping site, a communication via a message board, a posting to a product review service, a digital communication, a comment posted to a digital media service, and a communication via a messaging application.

In one or more embodiments, a communication from a referring user may include or may be generated by sharing of information via a share button or other sharing capability.

A share button may for example be a native share button in a web browser or mobile operating system (such as iOS® or Android®), or it may be a button or an icon on a website or on any other document or application.

In one or more embodiments, a referral tracker may generate a feedback message to the communications intermediary or referring user that indicates that a recipient has executed a transaction as a result of the referral. In addition to or instead of feedback, the referral may generate a credit to the communications intermediary or referring user, which may for example be a monetary payment or another type of reward. In one or more embodiments, the referral credit may be provided to a group of users. In one or more embodiments, the referral credit may be shared with the recipient as a result of executing the referred transaction. In one or more embodiments, the referral credit may be a donation to another organization, for example a non-profit or charitable organization, made for example on behalf of the referring user.

Input into a referral matcher may be obtained from any type of physical device, application, utility, or software program, or combination thereof, and it may be in any format. For example, in one or more embodiments the referral matcher may be coupled to a physical or virtual keyboard used by the referring user, and it may accept and analyze keystrokes obtained from this keyboard. In one or more embodiments, the referral matcher may be coupled to an image capture device, such as for example a camera on a mobile device; the referral matcher may analyze images to determine matching products, services, merchants, brands, or promotions. Images may be for example, without limitation, images of barcodes (linear and 2D codes such as QR codes), or images of a product. In one or more embodiments, the referral matcher may be coupled to an audio input device, such as for example a microphone on a mobile device; the referral matcher may perform voice recognition and analysis to determine matching products, services, merchants, brands, or promotions for example associated with the inferred reference in the communication. In one or more embodiments, the referral matcher may be coupled to software which analyzes content such as voice, images or video; the referral matcher may analyze this content in any manner to determine matching products, services, merchants, brands, or promotions for example associated with the inferred reference in the communication In one or more embodiments, the referral matcher may be coupled to a messaging service, communications platform, network, gateway, server or other application which conveys, transmits, routes, directs, receives, stores, forwards, resends, transforms, analyzes, combines, filters, translates, formats, edits, posts, displays, or otherwise handles messages or communications of any type or types. A message may contain for example, without limitation, any type or types of content such as any combination of text, image, voice, audio, video, animations, code, software, links, URLs, web site addresses, attachments. The referral matcher may perform analysis of content that is being transmitted to detect matching products, services, merchants, brands, or promotions for example associated with the inferred reference in the communication.

In one or more embodiments, the referral matcher may be coupled to a social media service, digital media service or messaging application, such as for example, without limitation, Facebook®, WhatsApp®, Twitter®, Yelp® or Snapchat®; the referral matcher may perform analysis of content that has been input to such an application to determine matching products, services, merchants, brands, or promotions for example associated with the inferred reference in the communication.

In one or more embodiments, the referral matcher may be coupled to the recipient's device, an application used by the recipient, a messaging gateway or network through which messages are conveyed to the recipient's device; the referral matcher may perform analysis of content that is conveyed to the recipient to determine matching products, services, merchants, brands, or promotions for example associated with the inferred reference in the communication.

In one or more embodiments, a referring user may be able to select text (or other items) in a communication, and initiate a search for listings in the merchant database matching the selection.

One or more embodiments may use language processing and analysis techniques to identify words, phrases, text strings, or other elements in the input that are associated with one or more products, services, merchants, brands, or promotions in the database. These techniques may include for example, without limitation, natural language processing, collaborative filtering, artificial intelligence, affect analysis, type-ahead, predictive analytics, machine learning, recommendation engine, and personalization engine. One or more embodiments may process and analyze any other types of content, such as images, video, audio, speech, links, code, URLs, website addresses, links to mobile applications, or animations, to identify items that are associated with one or more products, services, merchants, brands, or promotions in the database. For example, image processing may identify images of items that are associated with entries in the database or with categories of entries. As an illustration, images in a message may be processed by a neural network or other classifier to identify the types of items in the images; if a message contains images of a car, for instance, database entries corresponding to car sales or car rentals may be matched and one or more associated referral links may be inserted into the message.

If multiple merchants in a database are identified by the referral matcher as potential matches, based on the communication between the users, the system may ask the referring user to select from among the multiple matches. In one or more embodiments, the system may select a specific merchant automatically. Selection of a merchant may be based on any factor or factors on which merchants may be rated, scored, measured, or compared, including for example, without limitation, the size or amount of the referral credit associated with each merchant, the location of the merchant, the availability of inventory, speed of fulfillment of orders, ratings or reviews related to the merchant, or the price of the product or service offered by the merchant. The referring user and receiving user may both set preferences that for example invoke a strategy pattern to determine the merchant to provide a referral to, or to generate an ordered list of merchants. For example, the system may automatically select the merchant having the largest referral credit, or automatically select the merchant having the lowest price, quickest delivery time, etc. In one or more embodiments, the referral may be made based on the recipient's preferences, so that the recipient's favorite merchant's may be inserted into a list presented to the referring user and/or by the receiving user in one or more embodiments. In one or more embodiments, the referral may be made based on business rules determined by the communication intermediary. Other strategy instances may be utilized to correlate the preferences of the referring user with the preferences of the receiving user to find the most appropriate referral as well.

One or more embodiments may incorporate settings which enable the referring user or the receiving user to control the frequency and manner in which the referral matcher presents matching merchants and may prompt the referring user or receiving user to agree to the insertion of the referral link.

In one or more embodiments, a referral link may initially direct a recipient to an intermediate server or system; this intermediate server may then redirect the recipient to a target destination related to the referral. The intermediate server may perform additional processing to determine which target destination is appropriate or optimal for the referral. For example, without limitation, in one or more embodiments the referral matcher executing on a referring user's device or coupled with a network or messaging gateway may perform an initial match that simply identifies that a relevant product, service, brand, or merchant exists, or that selects a broad category or grouping of potentially matching products, services, merchants, brands, or promotions. The referral link associated with this initial match may direct the recipient to the intermediate server, which may then perform an additional matching step to select a specific merchant, site, page, or other destination to complete the referral. The redirection link generated to this final destination may contain the same or similar tracking information (such as an identity of the referring user or communication intermediary) so that the referrer or communication intermediary may obtain credit for a successful referral. The redirection link may direct the recipient for example to any or all of a web site, another server, another intermediate server, a web service, a specific web page, an application, a URL, or a URI. A potential benefit of this two-stage matching process using an intermediate server is that the database accessible to the referral matcher can be smaller, and does not need to be updated in real time. The processing for the initial match may also be faster and less resource intensive and may reduce the latency of the creation and transmission of the message. The matching and final selection process on the intermediate server may access more detailed information on products, service, or merchants, including potentially information that is updated in real time (such as merchant bids for referrals). This second stage of matching and selection may also utilize more computing resources available on a server or a network of servers.

One or more embodiments may provide or access a dashboard or other reporting system which enables the communication intermediary or referring user to access information about the referral links sent, and may include, without limitation, information regarding the amount of referral credit earned, the identity of the recipients which conducted transactions, the identity of the merchants with which transactions have occurred as a result of their referrals, and the communications platforms through which the referrals were sent.

One or more embodiments may present a referrer profile page which may be public facing, and which may display brand, product and service referrals with referral links. In one or more embodiments, this enables a more graphical interface for receiving users to select referrals that generate rewards for the referrer. In one or more embodiments, a communication may be generated that includes a link to a site that allows for graphical selection of a particular merchant for example by the receiving user.

One or more embodiments may include a mechanism which enables the referring user, while on a web page, to select the URL or other indicator of such web page, and create a referral link to that page which may include an identifier of the referring user, so that the referral may be tracked, and enable the referring user to insert this referral link into a digital communication.

In one or more embodiments, a referral link may be, may contain or may lead to a coupon for a product or service, instead of or in addition to a link to a site. The coupon may be for example in the form of a code, a printable document, a UPC code, a QR code, a promotional code, a ticket, an image, or another identifier. The recipient may use the coupon for example for either online or offline transactions; in an offline transaction, the recipient may for example transact with a via an interaction which does not get tracked via a link to a site.

In one or more embodiments, referral links may be added by a communication intermediary in a communication path between a sender and receiver. The intermediary may receive a communication from the sender to a receiver. The communication may contain any or all of an identifier of the sender, an identifier of the receiver, and a communication body. The intermediary may transmit the communication or any portion thereof to a computer that executes a referral matcher. For example, the referral matcher may execute on a network gateway or on a server as a web service. The referral matcher may be coupled to the communication intermediary (and associated messaging gateway) associated with the sender, the recipient or both. The referral matcher may analyze the communication to determine whether there are any matches to listings in the referral database. When a match is found, the referral matcher may transform the communication to insert a referral link to a site or other resource associated with the matched item from the database. The link may also contain an embedded referral tracking code that identifies the referrer, which may be any combination of the sender, the receiver, or the intermediary. The transformed communication may be returned to the communication intermediary, which transmits it along the communication path to the receiver. If a receiver uses the link and completes an associated task (such as a purchase), a referral tracker may receive a notification of the transaction with the embedded referral tracking code, and credit the referrer for the transaction.

In one or more embodiments, when a match is found, the referral matcher may convey to the communication intermediary instructions as to how to transform the communication to insert a referral link to a site or other resource associated with the matched item from the database and embed a referral tracking code that identifies the referrer, which may be any combination of the sender, the receiver, or the intermediary. The communication intermediary may then execute the instructions and transmit the transformed communication along the communication path to the receiver.

A communication intermediary may be for example, without limitation, one or more of a communications carrier, a wireless provider, a cellular provider, a network provider, an internet service provider, a social media platform, a messaging service, a telephone service provider, a broadband service provider, a Wi-Fi provider, an email service, a text message service, a mobile application, a software application, a chat service, an application which conveys, transmits, receives, routes, forwards, stores, directs, edits, filters, or formats communications, or a gateway between any types of devices, networks, routers, or nodes. A communication may be or may contain for example, without limitation, one or more of a message, a text message, an email message, a voice message, a video message, a website link, a link to a mobile application, a picture message, a transcribed message, a communication via social media, a communication via a shopping site, a communication via a message board, a posting to a product review service, an encrypted message, a digital communication, a comment posted to a digital media service, and a communication via a messaging application. In one or more embodiments, the receiver of a message may use a referral link by performing one or more of a tap, click, gesture, response, user interface interaction and verbal command. The associated task may be one or more of a click, view, visit, transaction, purchase, reservation, subscription, sign-up, submission, software installation, download, inquiry, content consumption, survey completion, and participation in a digital interaction.

In one or more embodiments, the referral link may link for example, without limitation, to one or more of a website, a software application, an e-commerce service, a merchant shopping cart, a mobile application, a computer application, a store, a redirector, a link-tracking service, an affiliate network, a video player, a coupon or coupon code, a promotion or promotion code, a discount code, a transaction code, a mapping service and a URL. The listings in the referral database may be for example, without limitation, one or more of a product, a service, a brand, a merchant, a name of a merchant, a name of a web site, a name of a product, a name of a service, a location, a review, a rating, a product number, a model number, a description, a picture, an image, a diagram, a barcode, a UPC number, an RF code, an activity, a keyword, a phrase, a product category, an SKU, an instruction, a suggestion, a solution, an information source, a person, an organization, and a professional. The database may be for example, without limitation, one or more of a file, library, catalog, directory, open graph, real-time web search, cached web search result and data feed.

In one or more embodiments, the processing performed by the referral matcher may determine whether content such as a word, phrase, text string, URL, web site link, web site address, link to a mobile application, domain name, image, audio or video component, or code in the communication body corresponds to a listing in the referral database; if so, the link may replace or be inserted around that matching content. In one or more embodiments, processing may also perform sentiment analysis to determine the sentiment in the communication towards the matched item.

In one or more embodiments, the referral matcher may have a configurable closeness-of-match parameter that determines how closely the communication must correspond to a database item in order to generate a referral link.

In one or more embodiments, processing may also determine whether a communication indicates a subcategory associated with a matched item. Subcategories associated with database listings may include for example, without limitation, one or more of a size, a style, a model, a type, a sub-brand, a feature, a name, a category, a quality, a stock keeping unit, a characteristic, a color, a date, a time, a location, and a quantity. If subcategory data is identified in a communication, the referral link may include this data, for example by linking to a specific web page or by incorporating URL parameters in the link.

In one or more embodiments, a referral credit may be provided to one or more of the communication intermediary, the sender and the recipient. The sender's and recipient's identity may be encoded to protect privacy before it is passed to the referral matcher.

In one or more embodiments, either or both of the sender or receiver of a message may be able to send a message to opt-out of having referral links added to communications. For senders or receivers who opt out, the referral matcher may not add links to messages for those users. One or both of the sender or receiver may be able to send a message to modify communications preferences that affect when, how, or how frequently referral links are added, how they are used, or how they are displayed.

In one or more embodiments, when a referral matcher identifies more than one possible site that corresponds to a listing that is a match in a communication body, it may select a site based on a performance metric, such as for example, without limitation, the amount of referral credit associated with the site, a price associated with the site, a degree of similarity between the site and the communication, a transaction conversion rate associated with the site, a defined set of business logic associated with the site, how closely characteristics of the sender or receiver correspond to the site, proximity of the site to the sender or receiver's location, a location associated with the site, a speed of fulfillment associated with the site, a review score, a popularity score, or a rating score associated with the site.

In one or more embodiments, the referral link may link to an intermediate server, and the intermediate server may select a final destination when a message recipient clicks on or otherwise interacts with a referral link, and may then redirect the recipient to that final destination. To select a destination from multiple possible destinations, destinations may be compared on a performance metric such as the metrics described above.

In one or more embodiments, matching against a referral database may be performed for any image contained in a message or otherwise shared or transmitted from a sender to a receiver. Processing of an image to determine whether a positive match exists may include detecting components in the image and determining a type of each component, analyzing each component, and synthesizing component analyses to form a descriptor of the image. The descriptor may then be compared to the listings in a referral database. In one or more embodiments, an optional validation of a tentative match may be performed. (This validation step may not be performed in one or more embodiments or embodiments, or it may be performed only in certain situations.) Validation may include retrieving a second image associated with the matched item, and comparing this second image to the original image to form a confidence score. When and if validation is performed, a referral link may be generated for the image if the confidence score exceeds a threshold. Any of the steps for image analysis, matching, and referral link generation and presentation may be performed on the sender's device, the receiver's device, a device used by the sender to encrypt all or a portion of a communication, a device used by the receiver to decrypt all or a portion of a communication, any communication intermediary in the communication path between the sender and receiver, or any combination thereof.

One or more embodiments may obtain or accept content from an application user interface, and may match this content against the referral database to generate a referral link. For example, without limitation, in one or more embodiments the application may be a web browser, and the content from the web browsing session may be one or more of the URL of the page a user is browsing, text, image, code, icon and logo. Content may or may not be visible to the user. Content may be analyzed using for example, without limitation, one or more of machine learning, text parsing, image analysis, audio analysis, artificial intelligence, keyword matching and natural language processing. If there are multiple matches, a user may indicate which match to utilize, or a match may be selected automatically based for example on previously defined user preferences. The system may insert the referral link into a communication from the browser user to one or more recipients. If a recipient takes an action associated with the referral link (such as a purchase), the referral tracker may attribute this action to the referring user and record a transaction (such as credit) for the referring user.

In one or more embodiments, the referral matcher may obtain content by receiving events from the operating system when the user interface of the application changes. The application may be for example a mobile application. The operating system may be for example a mobile device operating system, and the events may be generated by accessibility services of the operating system. Content analysis may include processing of these events to obtain view elements of the user interface, including potentially hidden but machine-readable elements. These view elements may be compared to the listings in the referral database. View elements may include for example, without limitation, one or more of URL, text, image, icon, logo, code, SKU, product identifier, application identifier, merchant identifier. For example, for a web browser application, the view elements may include the URL of the address bar of the browser. Events may be filtered to locate view elements with text that matches a pattern for a URL. They may be further filtered for view elements with an identifier that matches an expected identifier of the browser address bar.

When the referral matcher finds a match between application user interface content and an entry in the referral database, it may present a share and earn option to the user. When the user selects this option, the referral manager may present a sharing menu to the user with one or more sharing methods to share the referral link, such as email, text message, and social media sites or services. It may also present a cash back option to the user that generates the referral link and redirects the application to that link, thereby effectively letting the user use the referral link himself or herself.

One or more embodiments of the invention may enable a system that activates monetization and applies a payment method. The system may have a payment methods database that includes one or more payment methods associated with a user. Each payment method may include one or more of a credit card, a debit card, a gift card, a digital wallet, a funds transfer service, a debt financing product, an installment payment service, a bank account. Each payment method may also include user checkout information that may include one or more of a name, a user identifier, an address, a billing address, a shipping address, a phone number, an email address, a password, an expiration date, a security code. The system may have a merchant database with listings that include one or more of a product, a service, a brand, a merchant, a name of a merchant, a name of a web site, a name of a product, a name of a service, a location, a review, a rating, a product number, a model number, a description, a picture, an image, a diagram, a barcode, a UPC number, an RF code, an activity, a keyword, a phrase, a product category, an SKU, an instruction, a suggestion, a solution, an information source, a person, an organization, a professional. Each listing may also have one or more shopping cart descriptors, each of which includes one or more of a URL, a web page element, a page title, a header, a calculation, an input field, a control, a text element, an image element. The system may have an offers database that includes one or more monetization offers. Each monetization offer may be associated with one or more listings in the merchant database. Each monetization offer may include for example one or more of a coupon, a cashback rate, a discount, a promotion, a savings, a reward, a bonus, a payment, a commission. The system may have a computer or server that executes specific instructions to implement a referral matcher, a payment assistant, and a referral tracker. The referral matcher and payment assistant may be coupled to an application used by the user. The referral matcher may determine when the application is performing a shopping activity associated with a listing in the merchant database, and it may detect a monetization offer in the offers database that is associated with this listing; it may then generate a referral link or referral code based on the monetization offer. The payment assistant may enter or offer to enter information into the application associated with a payment method in the payment methods database; this information may include the user checkout information associated with the payment method. The payment assistant may also update the application to include or reference the referral link or referral code when the application makes a payment associated with the listing. The referral tracker may record a transaction associated with the monetization offer associated with the referral link or referral code when the application makes a payment associated with the listing.

In one or more embodiments the referral link or referral code may include an identity of one or more of the user, the listing, a merchant, an intermediary.

In one or more embodiments the payment assistant may obtain a single use payment identifier linked to the payment method, and it may enter this single use payment identifier into the application.

In one or more embodiments the payment assistant may also present the payment method to the user and prompt the user to confirm selection of this payment method.

In one or more embodiments the referral tracker may also notify one or more of the user, the listing, the merchant, and the intermediary of the transaction associated with the monetization offer. It may notify any or all of the user, the listing, the merchant, and the intermediary when one or more of the coupon, the cashback rate, the discount, the promotion, the savings, the reward, the bonus, the payment, and the commission has been activated. It may notify any or all of the user, the listing, the merchant, and the intermediary when one or more of the coupon, the cashback rate, the discount, the promotion, the savings, the reward, the bonus, the payment, and the commission has been earned.

In one or more embodiments the referral tracker may also share a portion of the monetization offer with one or more of the user, the listing, the merchant, and the intermediary.

BRIEF DESCRIPTION OF THE DRAWINGS

The above and other aspects, features and advantages of the invention will be more apparent from the following more particular description thereof, presented in conjunction with the following drawings wherein:

FIG. 2 continues the example of FIG. 1, showing the recipient receiving and using the referral, and the system crediting the referrer for the successful referral.

FIG. 15B shows another variation of the embodiment of FIG. 15, where the gateway that invokes the referral matcher is associated with the receiver's communications carrier rather than with the sender's communications carrier.

FIG. 15D shows another variation of the embodiment of FIG. 15, where the referral matcher generates transformation instructions that are executed by the communications intermediary to modify a message to insert a referral link.

FIG. 16 continues the example of FIG. 15 to illustrate crediting the referring communication intermediary when the recipient clicks the link and makes a purchase.

FIG. 18 shows an illustrative embodiment that provides a configurable degree of closeness of match for the referral matcher.

FIG. 24A shows an illustrative embodiment of the invention that monitors a web browsing session on a mobile device, and that offers a user an option to share a web page URL when it detects a match to the referral database.

FIG. 26B shows a generalized sequence diagram for a system that analyzes content from a mobile application and that generates referrals from matches to this content.

FIG. 27 shows an illustrative process for extracting a web page URL from user interface events received from a mobile operating system.

FIG. 28 shows an embodiment of the invention that detects when a user interface of an application requests payment information, and that selects a payment method from a database of payment options and a reward associated with the item the user is purchasing.

FIG. 29 continues the example of FIG. 28 to illustrate how the system populates payment information based on the payment method selected by the system and confirmed by the user.

FIG. 30 continues the example of FIGS. 28 and 29 to illustrate how the system tracks the referral for a reward when the user makes payment using the payment method selected in FIG. 28 and the payment information populated in FIG. 29.

DETAILED DESCRIPTION OF THE INVENTION

A system that activates monetization and applies a payment method will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
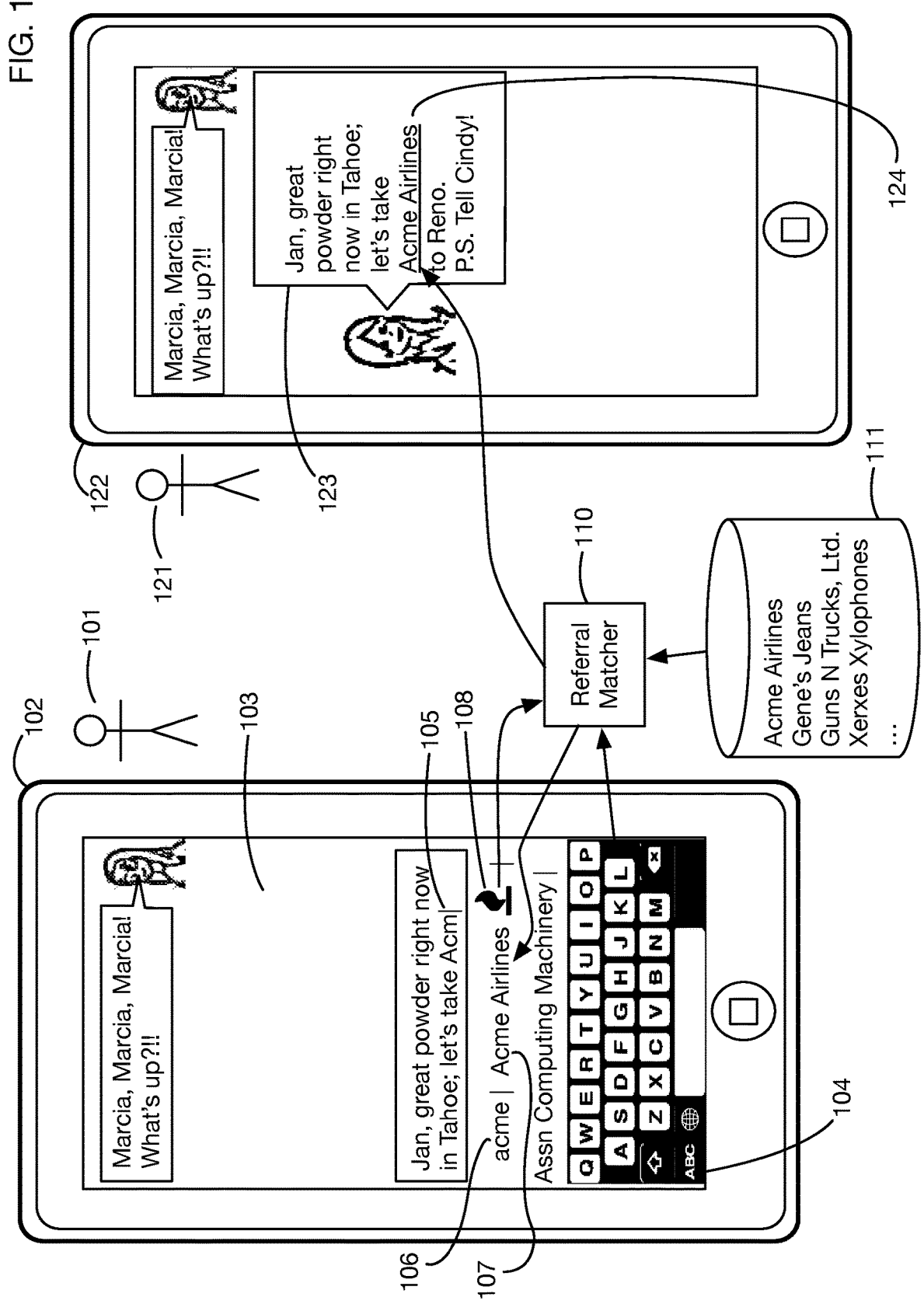
FIG. 1 shows an example of a user using an embodiment of a messaging gateway monetization system that accepts input from a referring user and automatically determines or otherwise infers merchants associated with products and/or services to refer based on the input, i.e., to match referrals with the input, and insert the referral into a message to a recipient that contains a trackable product or service referral.

FIG. 1 shows an illustrative embodiment of the invention, illustrating the generation of a referral for example as part of a peer-to-peer communication. (FIG. 2, described below, continues this example to show how a referral is processed by the system when used by a recipient.) User 101, the referring user, uses mobile device 102 to generate a communication to one or more other users. In this example, user 101 composes a text message to user 121. One or more embodiments may integrate referrals into any type of communication and independent of the application used, including but not limited to text messages, emails, SMSs, voice messages, picture messages, video messages, chat messages, Twitter® messages, Instagram® messages, messages sent via messaging platforms including for example without limitation WhatsApp®, Snapchat® or Facebook® Messenger, and postings on any websites or services including for example, without limitation, social media sites such as Facebook®, Tumblr®, Google+®, YouTube®, Vine®, Pinterest®, Flickr®, or LinkedIn®. In one or more embodiments users may use any type or types of devices to send or receive communications and to generate, receive, or use referrals, including but not limited to a mobile device such as device 102. For example, without limitation, users may use mobile devices, cell phones, smartphones, tablets, laptop computers, notebook computers, desktop computers, server computers, smart speakers, smart watches, wearable devices, communication devices built into vehicles, smart glasses, augmented reality devices, content management systems, virtual reality devices, or networks of any of these devices. Users generating referrals may use the same devices or different devices from those used by users receiving and using referrals.

A referring user and a receiving user may each be any person, system, organization, group of persons, robot, application, business, or agency that communicate in any manner over any medium. For example, without limitation, a referring user may be an individual, a professional content creator, an editor, an author, or a business. A user may be acting on his or her own behalf, or on behalf of a business, an organization, or an agency. Recipients of a communication from a referring user may be peers, family, friends, known or unknown persons or groups, readers, business contacts, or followers of a feed or blog. Recipients may be individuals or they may be groups or audiences of any size and composition. Although the term receiving user is used in the singular in certain scenarios herein, receiving user means one or more users that receive a communication from the referring user.

In the example shown in FIG. 1, user 101 is typing a message with the cursor 105 midway through a word. The user types the message using a virtual keyboard 104 as utilized in one or more embodiments on the mobile device or electronic device 102. In this embodiment, the system, which includes virtual keyboard 104 accepts the input, here text characters and transmits the text characters to a referral matcher 110. Referral matcher 110 receives input from the virtual keyboard 104, and may suggest potential referrals based on the keystrokes received from the keyboard. The referral matcher may execute directly on the mobile device 102, or it may execute on another device (such as a server or a cloud or Internet accessible service) remote from the mobile device 102, or any combination thereof. The referral matcher 110 accesses a database 111. The database may contain for example, without limitation, products, services, merchants, brands, promotions, locations, places of business, stores, events, persons, performers, or any related characteristics. In one or more embodiments, a computer or server that executes the specific instructions to implement the referral matcher may also host the database or in other embodiments, the database may be remote to the computer that hosts the database. In one or more embodiments, the referral matcher may access any number of data sources to identify potential referrals. These data sources may be local to the mobile device (or other device) 102, or remote from the mobile device (for example, on a server accessible via the Internet or via any other network connection). Database 111 may contain any information that may be used to locate or create a referral, or to select from or prioritize among multiple matching merchants, such as for example, without limitation, the name or names of a merchant, the name or names of a web site, the name or names of products or services, brand names, the location of merchants, reviews or ratings of products, services, or merchants, product numbers, SKU numbers, model numbers, descriptions, pictures, images, diagrams, barcodes, UPC numbers, RF codes, the amount a merchant pays for referrals, information on any promotions, or any data derived from or related to any of this information, including any generic categories that may infer one or more merchants, for example airline or flight or fly to infer a particular merchant that provides air travel services.

Database 111 may for example include information about and characteristics of merchants, such as merchant names, ratings, reviews, conversion rates, locations, and hours. A merchant may be for example, without limitation, a company, organization, individual, or other entity that makes, sells, or distributes products or services available for a user to purchase, consume, or enjoy. A merchant may be for example, without limitation, a retailer, a service provider, an e-commerce service, a sales agent, a salesperson, a manufacturer, or a distributor. A merchant may be associated with an intermediary. Database 111 may for example include information about one or more intermediaries. An intermediary may be for example, without limitation, an agency, a marketing firm, an affiliate network, a referral marketing provider, or any other individual or entity that represents a merchant and to which a link may be directed or through which a link may be redirected. Database 111 may for example include information about products and services, such as the products and services provided by a merchant or an intermediary. This information may include for example, without limitation, product names, descriptions, alternate references (for example "flights to Denver"), pricing, and inventory availability. Products and services may be for example, without limitation, any good that a user can purchase, enjoy, or consume; these may be physical products, virtual products (such as digital content, movies, music, or other formats), or services. Database 111 may for example include information on one or more brands, such as for example, without limitation, a trade name of a product, service, manufacturer, marketer, or retailer. Database 111 may for example include information on one or more promotions, such as for example, without limitation, information regarding discounts, special sales, cash-back offers, and new user rewards, which a merchant may offer relating to sales of its products and services.

In the example of FIG. 1, referral matcher 110 analyzes keystrokes from virtual keyboard 104 and compares these keystrokes to the names and other information in database 111, and determines that item 107 is a potential match. In a simple example, "Acm" may be compared to any items in database 111 that being with "Acm" such as "Acme", "Acme Airlines" or that is associated with an acronym for text in the database, i.e., "ACM" that standards for "Association of Computing Machinery". In other embodiments, words such as "flight" may be associated in database 111 with all merchants that are airlines. Any schema may be utilized to provide potential matches and contain any number of associations for each merchant, product or service to compare with. It therefore provides this item as a suggested completion for the virtual keyboard input. The virtual keyboard application may also provide other suggested completions such as completion 106, which may not correspond to a referral. Suggested referrals may be identified for example using an icon such as icon 108. If the user 101 selects the suggested referral 107, which may be performed in one or more embodiments with a single tap on the suggested referral, a referral link 124 with this referral may be generated and placed into the message 123. In other embodiments, the link may be automatically inserted based on preferences or any strategy pattern employed by the system. After the user completes and sends the message, user 121 receives the message on device 122. The message 123 includes the referral link 124 generated by the referral matcher 110.

In the example shown in FIG. 1, the virtual keyboard application linked to the referral matcher 110 is used as input for a text messaging program. This same virtual keyboard application may be used universally with any other applications or services on mobile device 102, providing the same referral matching capabilities for these other applications or services without requiring altering each and every different communication application to including the trackable referral generation capability of embodiments of the invention. This flexibility illustrates a benefit of the system in providing a potentially general-purpose referral capability that may be used across multiple applications and services. For example, without limitation, the same keyboard 104 with referral icon 108 and referral matcher 110 may be used for an email application, a web browser, a chat application, a blogging application, a publishing application, a word processing application, or any other application used by user 101. In any of these applications, the referral matcher may analyze input from the keyboard and suggest potential referrals to be embedded in communications. This universal ability to generate trackable referrals regardless of the application in use in a peer-to-peer setting is unknown in the art and makes referral generation and tracking pain free and extremely easy to use for referring users.

In one or more embodiments, the referral matcher may be incorporated into an "app extension," including but not limited to a keyboard extension. This app extension may for example provide enhanced or alternate capabilities for user input features. For example, for a keyboard extension, the system may provide enhancements or replacements for keyboard features such as auto-correction, spell-checking, auto-completion (of words or phrases, using for example predictive text analysis), and databases of words and phrases such as a lexicon, dictionary, or thesaurus. In one or more embodiments, the referral matcher may be integrated within or coupled to an "app extension," including but not limited to a keyboard extension, such as for example Swiftkey®, iOS®, Swype® or Gboard®; the referral matcher may perform analysis of content that is input to such an app extension to determine matching products, services, or merchants, brands, or promotions for example associated with the inferred reference in the communication. For example, for a keyboard extension, the referral matcher may provide an alternate or complementary dictionary or lexicon for auto-completion, auto-correction, predictive text or spell-checking. In this example, the referral matcher may analyze input from a referring user, it may then analyze this input to identify one or more products, services, merchants, brands, or promotions in the database that match the input. The referral matcher may then automatically generate a referral link and may insert this referral link into the communication. The referral matcher may automatically insert the referral link into the communication, or the referral matcher may prompt the referring user to agree to the insertion of the referral link and may then insert the referral link into the communication.

Figure 1A:
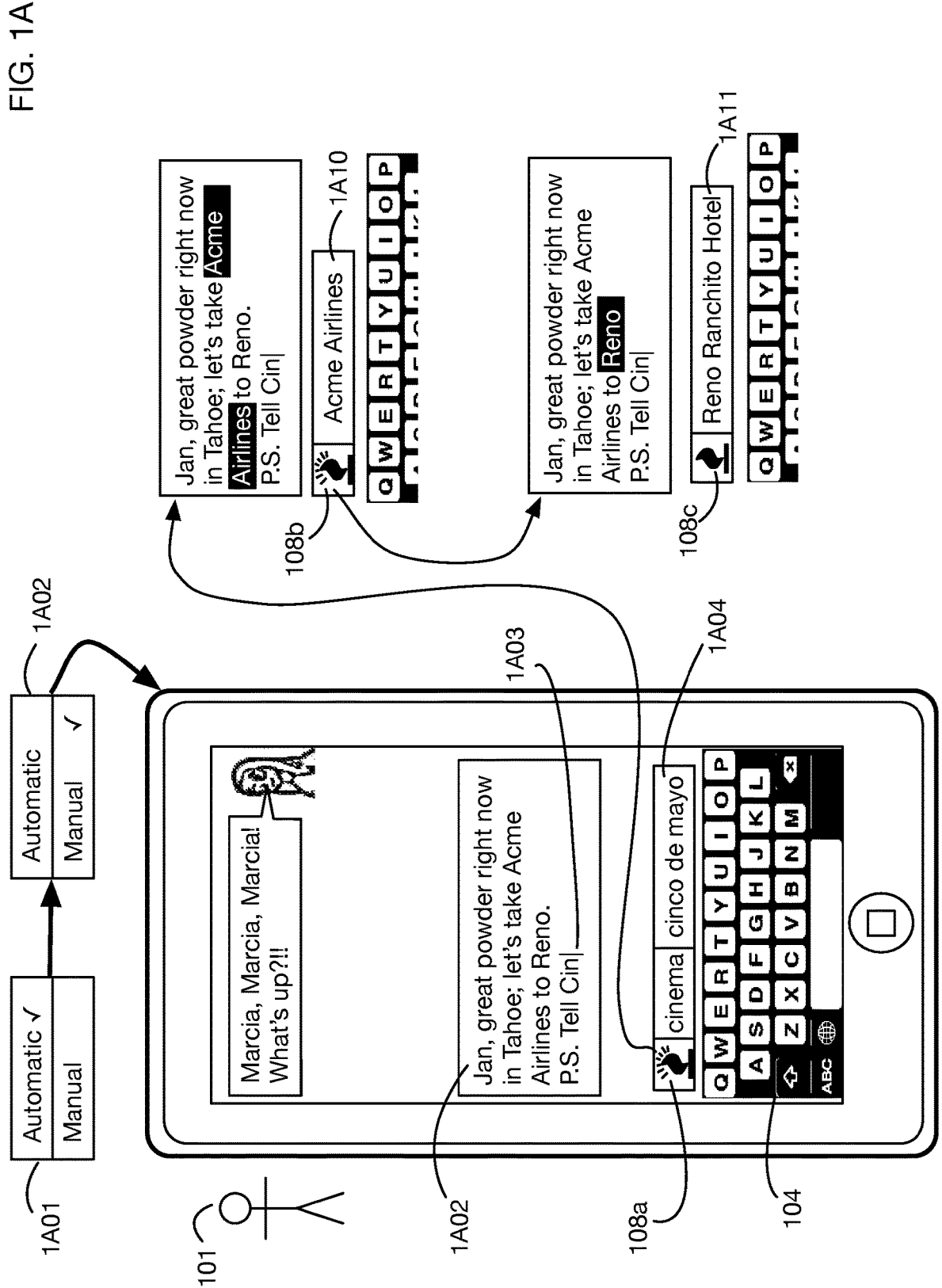
FIG. 1A shows a variation of the example of FIG. 1, where the referral matching system operates in a manual mode that requires user action before showing suggested referrals.

The scenario illustrated in FIG. 1 is an example of the system working in "auto mode," where referral matches are automatically presented to the user as they are discovered by the referral matcher. One or more embodiments may also support a "manual mode," where the matcher 110 for example may work in the background but may not automatically show suggestions to the user 101. Instead, in manual mode, the keyboard or another element of the system may provide an indication or cue to indicate to the user 101 that there is a potential match. FIG. 1A illustrates an example of an embodiment operating in manual mode. User 101 configures the system to switch from automatic mode 1A01 to manual mode 1A01a. (This configuration may be performed for example using a settings screen or any other method of modifying the configuration of the referral system or the keyboard.) As the user uses virtual keyboard 104 to type input 1A02 as part of a message, the referral matcher may operate in the background to locate potential referrals related to the message, but it may not display these referral matches unless and until the user requests to see them. Text completion suggestions such as 1A04 may not contain referral suggestions initially; instead they may be simple text completions for the current word 1A03, rather than referral lookups. However, the referral matcher may provide an indication that it has located one or more matching referrals, in this example by changing the appearance of icon 108a (compared to the original icon 108 in FIG. 1). For example, without limitation, icon 108a may flash, blink, change color, change size, change shape, or otherwise change any aspect of its appearance as a notification of potential referrals. This changed icon signals to the user that potential referrals are available for review. In manual mode, the user 101 may for example single tap the icon 108a to indicate that the user wants to see the potential referral or referrals. In this illustrative example, the referral matcher locates two potential referrals, one for an airline and one for a hotel, by scanning and analyzing the input 1A02. A first tap on icon 108a shows the first potential referral 1A10 in the word completion area of the virtual keyboard. The user may for example tap on this referral 1A10 to insert it into the message 1A02. In this case, the appearance of icon 108b shows that there are more potential referrals. If the user taps icon 108b again, a second referral 1A11 is displayed. Again, the user may tap this suggestion 1A11 to insert the referral into the message 1A03. Icon 108c returns to its "normal" state (as in FIG. 1), indicating that there are no more potential referrals that have been located in this message text. This example is illustrative; one or more embodiments may use any type of user interface to present referral match suggestions to a user either automatically or in response to user actions. For example, a user interface may show all possible referral matches to a user simultaneously, instead of cycling through them as illustrated in FIG. 1A. One or more embodiments may also provide options for a user to select among several referrals, which may for instance correspond to different product categories. For example, the word "china" in a message may refer to the product category porcelain, or the country (which may suggest referrals related to travel); in one or more embodiments, the system may prompt the user to select between these options (although in some cases, embodiments of the system automatically determine the appropriate product category by analyzing the message context or historical data regarding the user's inputs).

One or more embodiments of the invention may analyze the user's input and manipulate the input to transform or augment references to items into any type of reference or trackable link. For example, the system may replace or augment an explicit item reference or an implicit item reference with one or more of: a hyperlinked version of the same content, a URL immediately after the matching content, a footnote-style reference to the item, or with any other format that contains a trackable link or similar reference. In each case, the system may replace or augment the contents of the message while keeping the original meaning of the content intact. In one or more embodiments, replacing or augmenting of message contents may be done automatically, either as the message is generated or prior to transmitting the message. In one or more embodiments, the system may offer to optimize the user's communication before it is sent, potentially at the user's explicit request. This optimizing of the user's communication may for example augment the communication such that a reference to an item includes characteristics that include tracking and attribution (such as the user ID and the item in the database).

FIG. 2 continues the example of FIG. 1. User 121 first receives message 123 containing referral link 124, as described above. The referral link may for example contain a link to a web site or site or an e-commerce site corresponding to the referred merchant, product, or service. One or more embodiments may use any type or types of links or references, including for example, without limitation, a hyperlink, a URL, a shortened URL, a full URL, an image, a sound, a video, a short code, or a hashtag. In the example shown in FIG. 2 the link is a hyperlink for illustration. In one or more embodiments, this hyperlink may link to an intermediate web site or server, for example, which may be used for tracking or accounting, and which may then forward the user to the appropriate e-commerce site. In the example of FIG. 2, receiving user 121 selects referral link 124, which takes the user to the website 202 (or to a similar service or application). User 121 may activate the referral link 124 via any method, including for example, without limitation, a click, a tap, a verbal command, a gesture, or any other action or prompt. The referral link 124 includes URL 201 that has the address of the e-commerce site (or to another server that then forwards to this e-commerce site), along with a parameter that identifies the referring user. This URL format is illustrative; one or more embodiments may embed any desired information into a referral link in any desired format. For example, without limitation, URL 201 may encode or include any combination of one or more of an identifier that identifies the sending user, the characteristics of the content that the user input, the matching item from the database, a merchant to which the recipient is directed, the context within which the content was input, and the application that the user used to input the content.

URL 201 may be formatted in any desired manner, using any desired encoding scheme or schemes to embed the desired information. For example, the system may include within the database a set of URL formatting rules or templates which may identify the technical requirements for URLs or encoded information for each merchant, product, service, brand, promotion, intermediary or type of reference made by the user. When the system creates a link, the system may perform a lookup within the URL formatting rules to determine and execute the appropriate URL structure to successfully send the recipient to the correct site or coupon with functioning tracking and attribution. The URL may be constructed to send the recipient to a deep-link within the merchant site which corresponds with the reference made by the user and which may include, for example and without limitation, a product detail page, search result or a category page. The URL may be constructed to map the user's input to an item and merchant URL prefix so that the merchant can receive the intent of the user. For example, the user may input "strappy sandals at BigMegaStore" and the system would generate a URL with a link to the merchant site (such as www.bigmegastore.com) and a reference to "strappy sandals" within the URL, for example via a search term.

User 121 may then interact with site 202 to purchase goods or services or perform other transactions. When the user completes a transaction, for example using button 203, referral tracker 210 receives this information and credits the referring user with the successful referral. In one or more embodiments, information relating to completed transactions may be obtained from one or more third parties, including for example the merchant, an affiliate network, a credit card processor, or other system. For example, the website 202 may transmit a message to a referral tracker server with the URL 201 (so that the original referrer can be identified); this message may also include any additional details of the transaction. The referral tracker 210 may determine the amount and type of referral credit 211, based for example on the amount of the transaction and on specific arrangements with the e-commerce merchant for referrals. The referral tracker may then collect this credit from the referring merchant 212, and transmit this credit to the original referring user 101 (possibly net of a fee to the referral system provider). In one or more embodiments, the computer or server that executes referral matcher 110 may also execute or otherwise host referral tracker 210. In other embodiments, a distributed architecture may be utilized and multiple computers may implement the referral matcher 110 and referral tracker 210. Any cookie based technique or any other technique may be utilized to provide referral tracking so that for example a receiving user may use a link or otherwise purchase a product or service at a later date and still be tracked as taking an action because of the referral, so that the referral tracker may credit the referring user.

In one or more embodiments, any or all of the functions of the referral tracker 210 may be provided by third-party systems or services. For example, without limitation, these third-party systems or services may provide some or all aspects of tracking, attribution, payment processing, calculation of referral credits earned, or reconciliation.

In the example illustrated in FIG. 2, link 124 leads directly to a merchant site at URL 201. A site referred to via a link may be for example, without limitation, a website, a mobile application, a desktop application, a server, an automated communications platform, a call center, or a salesperson (for example via telephone, online chat, text communication, or any other form of communication). In one or more embodiments, a link may route through an intermediate server, which may perform functions such as for example, without limitation: determining which merchant or merchants provide the item; prioritizing which merchant site the system should direct the recipient to; identifying a promotion or coupon for a product, service, brand, or merchant; and prioritizing which merchant coupon to make available to the recipient. In one or more embodiments, when a recipient activates a link the system may generate and present to the recipient a coupon. The coupon may be for example in the form of a code, a printable document, a UPC code, a QR code, a ticket, an image, or another identifier. The recipient may use the coupon for example for offline transactions, in which the recipient transacts with a merchant (physically, verbally, or digitally) via an interaction which does not get tracked via a link to a site. The system may present the coupon in any desired format, including for example in a printable document, a virtual document, or in an audio or video format.

One or more embodiments may provide a referral credit for any type of action or event that results from a referral, including but not limited to a purchase transaction as shown in FIG. 2. For example, without limitation, a referral credit may be provided for a completed transaction by a recipient, for a recipient clicking on a link, for a recipient consuming any product or service, or for a recipient taking an action after clicking on a link, such as signing up for or joining a program or service, requesting information, enrolling, applying, registering, subscribing, or installing or downloading an application. Any type of transaction may be tracked and credited, including offline transactions that may for example include a purchase at a physical store, consumption of products or services offline (for example at a restaurant, a physical therapy site, or a live entertainment site). Transactions may include for example, without limitation, purchases, clicks, downloads, submittals, installs, sales inquiries, views, rentals, one-time purchases, recurring purchases, and subscriptions.

When a user completes a creditable transaction, a merchant associated with the transaction may owe a fee. The fee may be in any form including for example, without limitation, money, credit, points, discounts, cash-back, or membership status. The merchant (or their agent or intermediary) may remit the fee or fees to the system. The system may then remit all or a portion of the remitted fees to the user, to the recipient, or to another designee that the user or recipient may designate (such as a charity, organization, or individual). Remitting may occur via any mode, depending on the nature of the fee, and may include for example, without limitation, ACH, EFT, wire transfer, a check, a digital wallet, Bitcoin or other digital currency, crediting a credit or debit card or gift card, remittance via online payment providers such as PayPal® and Venmo®, crediting points to a loyalty program, and providing a discount code for future purchases.

Figure 3:
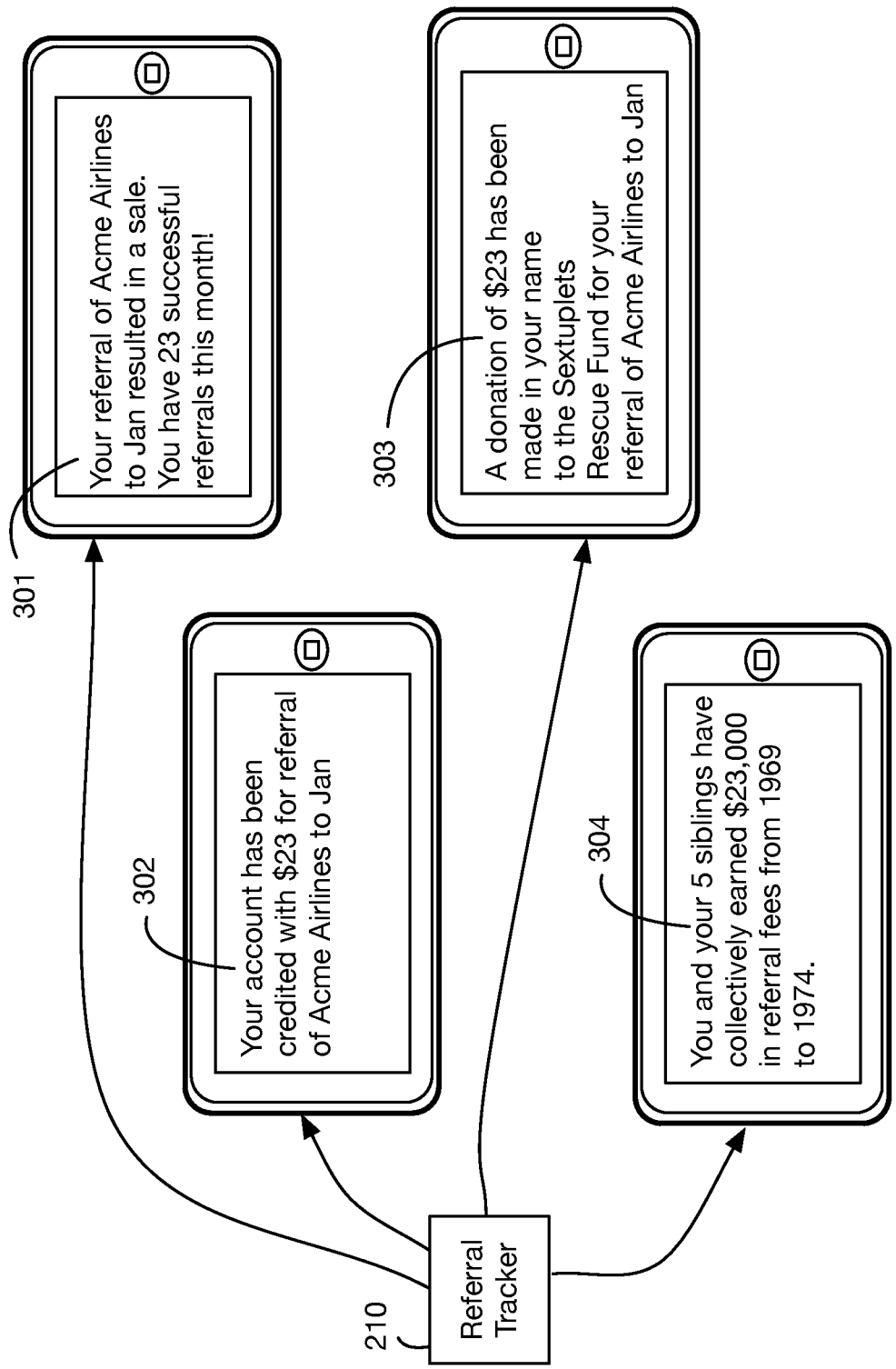
FIG. 3 shows illustrative options of the types of credits and notifications the referral system may provide to the referrer.

In one or more embodiments, a referral credit may be provided to any person, persons, groups, or organizations, including but not limited to the original referrer. A referral credit may be monetary, or it may take any other form such as an award, a gift of goods or services, a credit against previous expenditures, or a credit for future expenditures or usage. FIG. 3 illustrates several options for referral credits; these options are illustrative and are not limiting. Referral tracker 210 may issue a monetary credit 302 to the original referrer. It may generate a feedback message 301 to the referrer, which may for example inform the referrer when a referral has been used by a recipient; feedback messages may also provide the referrer with aggregate information on all activity resulting from the referrer's referrals. Feedback messages may include information such as the time of a recipient's transaction, the recipient's transaction amount, the referral fee amount earned, the rate of links sent to conversions (i.e., a quality score for a user), and a settlement status change. One or more embodiments may also provide an account profile or account summary view accessible to the referring user, such as a user dashboard, where the user may view information such as details of referrals, resulting clicks, transaction, credits, payments, products, services, or merchants referred, conversion rates for referrals, analysis and suggestions which aid in optimizing future referrals, and preference settings. A user dashboard may also provide mechanisms to control the modes in which fees are remitted or stored, such as for example by physical check, ACH, international wire, local bank transfer, cash pickup, PayPal®, Venmo®, pre-paid debit card, or gift card. Referral tracker 210 may generate a referral credit 303 in the form of a donation to an organization, for example which may or may not be made in the name of the referrer or may otherwise be associated with the referrer. In one or more embodiments referrals may be tracked on a group basis; for example, referral tracker 210 may generate aggregate referral credits 304 to a group (or on behalf of a group) based on activity resulting from referrals by any or all members of the group. In one or more embodiments, a referral credit may also be shared between a referring user and the receiving user (such as referring user 101 and receiving user 121 in FIG. 1.)

In one or more embodiments, the system may enable a user to create (or may automatically create) an interface (a "user page") that aggregates content and links that a user has input into an application via the system. The user may be able to curate the links on the user page and may be able to make the user page available or point recipients to their user page (for example via sharing of a URL or via any other digital communication). If a recipient activates a link on a user page, the link may lead to a merchant site or generate a coupon with which the recipient may transact and generate a fee for the user (as described above).

In one or more embodiments, the system may provide a merchant dashboard that may for example include settings, bidding controls, reporting, and other features that enable a merchant to manage its interactions with the system and with users of the system, and to manage promotional programs.

In one or more embodiments, the system may enable a referrer to refer a new user to use the system or to use an application into which the system is integrated. The referrer may be an individual, company, organization, application, or other entity. The tracking code or other aspect of the system may encode a user ID to enable tracking of links generated by user content, so that when a user who uses the system as the result of a referral from a referrer earns a fee, the referrer may earn a portion of such fees, and the system may automatically remit the referral fee to the referrer. Referrers who refer new users to the system may therefore earn a portion of the resulting fees generated by these new users.

Figure 4:
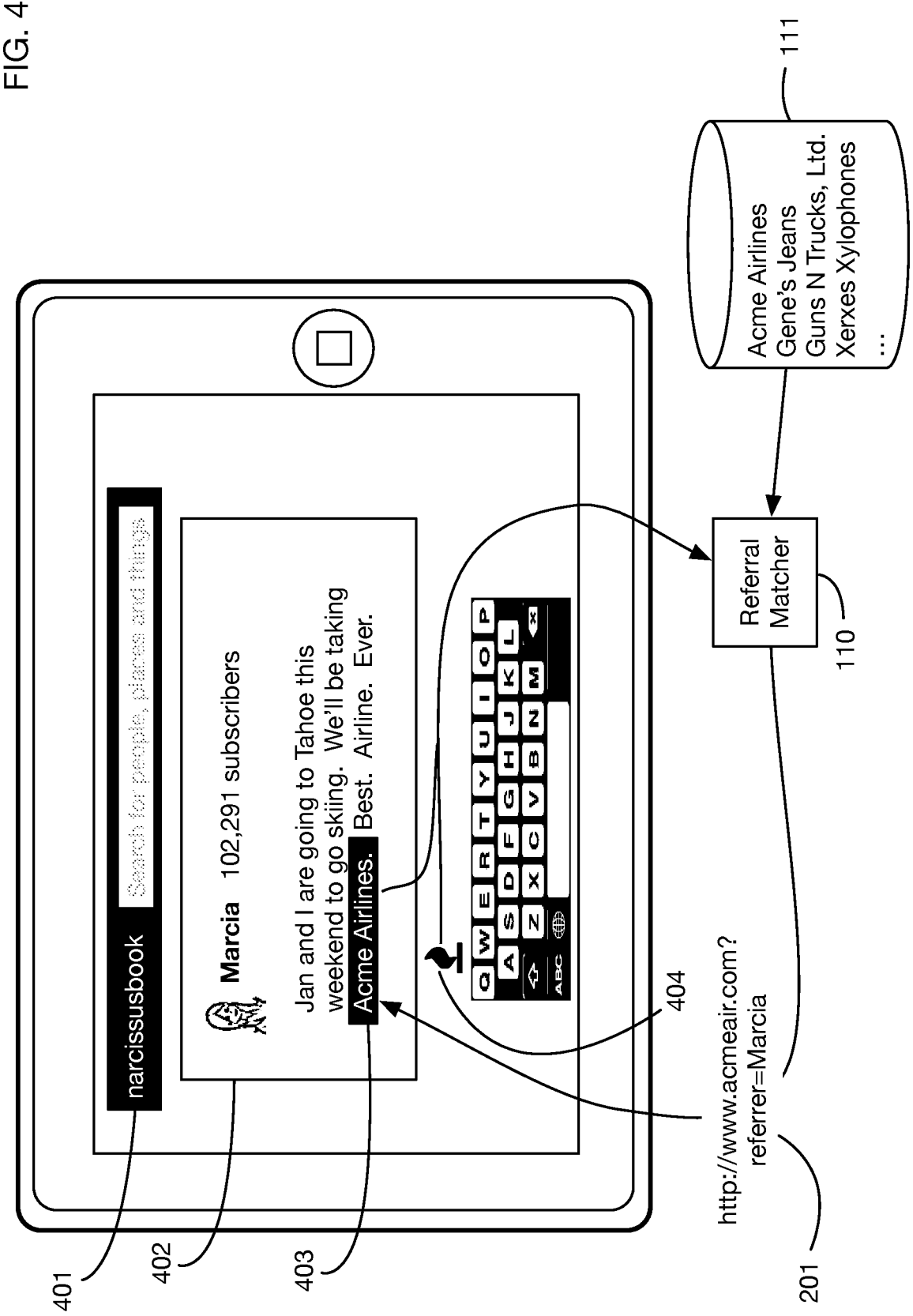
FIG. 4 illustrates an embodiment that allows a user to select text in a social media posting, and search for referrals matching the selected text.

FIG. 4 illustrates an embodiment that allows a user to select text or other items and to initiate a search for potentially matching products, services, or merchants for referrals. In this example, the user is communicating via a posting 402 on a social media site 401. Any other user who reads the posting may receive this communication, and may thereby receive and use referrals embedded in the posting. The user types the posting and selects text 403, and then initiates a search for matching referrals by pressing icon 404, which may for example be integrated into a virtual keyboard or otherwise made available to the application used for creating or reviewing the posting. The referral matcher 110 matches the selected text 403 to the merchant database 111, and generates a referral link 201 that is inserted into the posting 402. The display name of the referral link may remain the same, such as remaining the selected text 403; one or more embodiments may modify the display name of the referral link in any desired manner, for example as necessary to comply with policies or technical requirements of the communications channel being used. In one or more embodiments, a user may be able to select and match any information, including for example, without limitation, text, documents, files, web pages, URLs, images, or message threads, and may be able to initiate a search by the referral matcher against any of this information.

In one or more embodiments, the referral matcher may perform a search for matches continuously in the background, and it may display the results of these background searches when the user explicitly indicates that he or she wants to see the matches. For example, the user may tap an icon such as icon 404 in FIG. 4 in order to see matching referrals. Referral matches may be determined based on user selected text (as shown in FIG. 4), or based on automatically detected relevant content (as shown in FIG. 1), or on any combination thereof. In an "auto mode," matching referrals may be shown to the user automatically as they are located, as shown in FIG. 1. In a "manual mode," matching referrals may be shown on request. In one or more embodiments, a user may be able to view multiple matching referrals on request, for example by successively tapping on an icon to see the next match in the list. As an illustration, for message 402 in FIG. 4, if the system is in manual mode, a first tap on icon 404 may present a suggestion of Acme Airlines, while a second tap on icon 404 may present a suggestion of a hotel in Tahoe.

Figure 5:
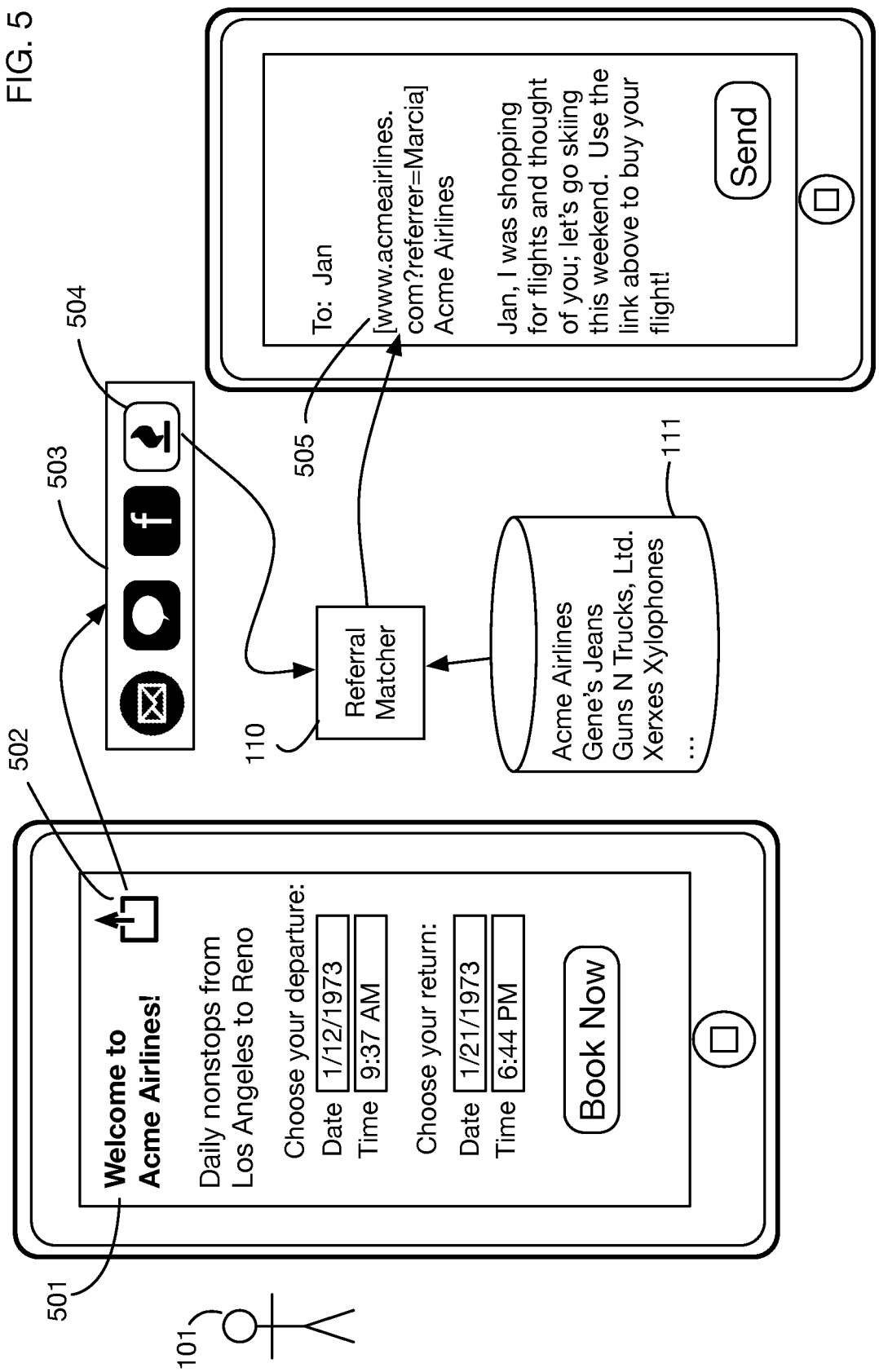
FIG. 5 illustrates an embodiment that generates a referral using a share button.

FIG. 5 illustrates an embodiment that allows a user to generate a referral link using a share button or a similar sharing capability. User 101 is browsing website 501, for example while making or planning a purchase. The user decides to share the website, and possibly also share specifics of the user's browsing (such as potential purchases), by pressing the share button 502. This share button may for example present a sharing menu 503 to the user, which offers multiple ways to share the current context. In one or more embodiments, the system may provide a referral sharing option 504 as an option in this sharing menu. When the user presses the referral button 504, the referral matcher 110 may examine the current context that is being shared, and may determine whether any items from database 111 match this context. If a match is found, it may for example be inserted as a referral link 505 into a message, which the user may then complete and send to any desired recipient or recipients. In one or more embodiments, matching of the context to potential referrals and generation of referral links may be combined with sharing via any other method, such as via a text, email, messaging app, or a social media site.

In one or more embodiments, sharing of a website URL or other information may be done first via a sharing button, and then the option to convert this link to a referral link may be presented in the messaging application that shares the link. For example, if user 101 selects the email icon from sharing menu 503, an email application may appear allowing the user to compose a message with the link to site 501. In this email application, the user may have an option to convert this website link to a referral link, for example by pressing a referral icon such as icon 504 that may appear in the email application, or, in the event that the application launches a virtual keyboard, by pressing a keyboard icon.

In one or more embodiments, sharing of a referral related to a website may be performed directly using a button or icon that generates a referral link to that website, or to a similar site related to the website. For example, without limitation, any website may incorporate a "refer" button or icon. When a user presses or otherwise accesses this button or icon, a referral link may be created for a merchant related to the website, where the referral link also identifies the user making the referral. This referral button or icon may be analogous for example to a Pinterest™ pin button, but instead of "pinning" a link to the website, the referral button or icon generates a referral link to the web site that will generate a referral credit to the referring user when and if another user accesses the referral link and completes a transaction.

Figure 6:
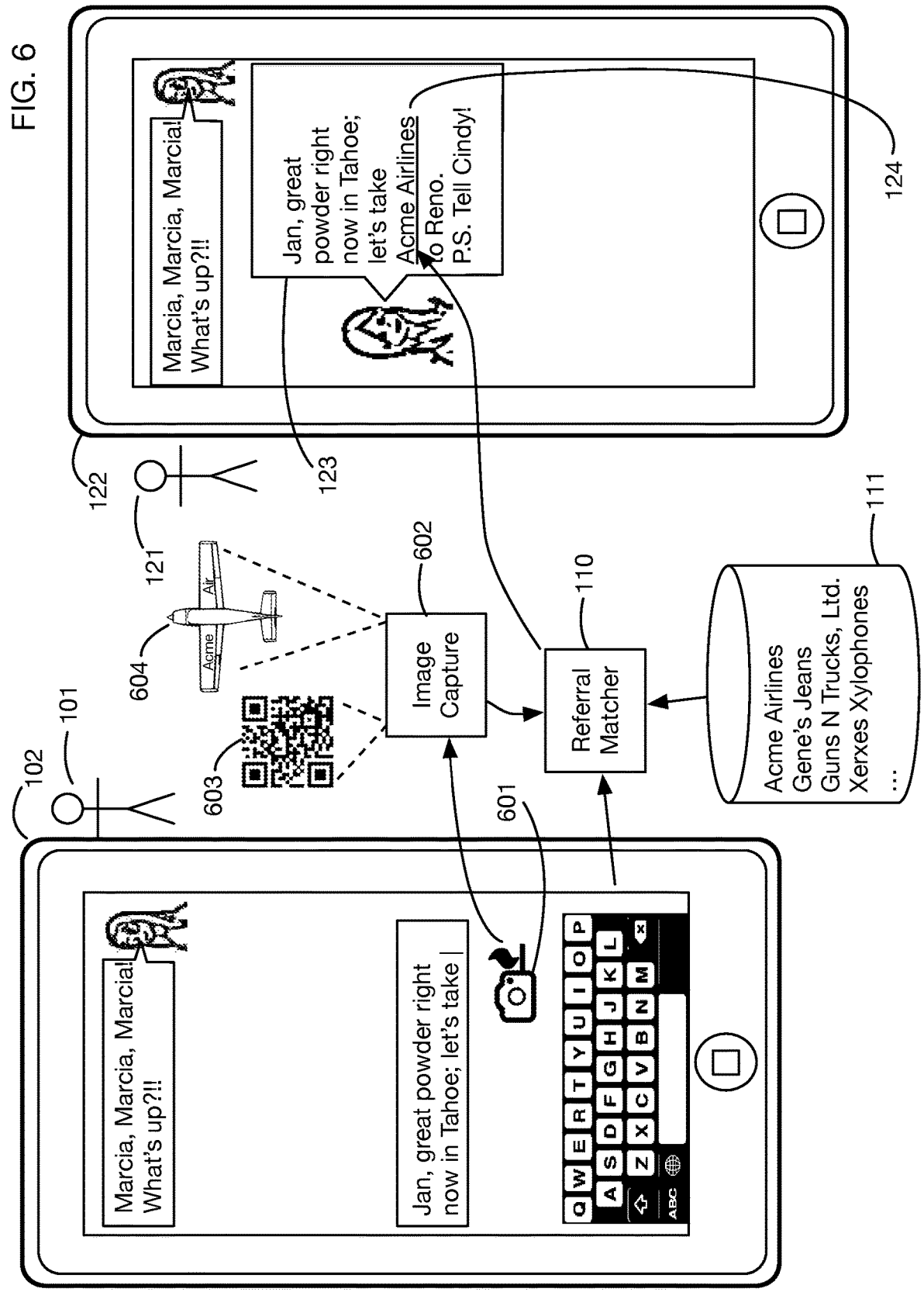
FIG. 6 illustrates an embodiment that matches an image captured by a camera (such as a barcode or an image of a product) and that generates a referral based on this image.

FIG. 6 illustrates an embodiment that supports input of an image into a referral matching process. The system may match any image or any data derived from an image with the items in a merchant database to obtain potential referrals that match the image. The image may be for example, without limitation, a barcode (either a 1D barcode or a 2D barcode such as a QR code), an image containing a product name or product identifier, a picture of a product, or one or more frames from a video containing a product. In the example shown in FIG. 6, user 101 uses mobile device 102 to compose a message to a recipient. The user wants to insert a referral link to a product, and therefore presses image capture button 601 to initiate image capture 602, for example via a camera integrated into device 102 or accessible via device 102. This image may be for example, without limitation, a QR code 603 that identifies the product, service, or merchant being referred, or a picture 604 of the product, service, or merchant. The image capture 602 provides the captured image or images to the referral matcher 110, which compares the captured image or images to information in the merchant database 111. Comparison and matching of images may in one or more embodiments use external databases or services, such as for example a lookup service for barcodes or an external database of product images. If a match is located, the referral matcher may generate a referral link 124 and insert this link into the message 123 transmitted to the message recipient 121. In one or more embodiments, a barcode or QR code application may execute on electronic device 102 and the information obtained from the barcode or QR code may be utilized to index into database 111 to determine a corresponding merchant. In other embodiments, any image processing based application that can recognize objects may be utilized to determine a product or product category that is utilized to search database 111 for.

In one or more embodiments of the invention, any type of input may be provided to the referral matcher, including but not limited to text input and image input. For example, without limitation, input into the referral matcher may include sounds of any type or voice commands, and the referral matcher may for example use voice recognition or any type of audio processing to recognize the input and compare it to items in the merchant database. Input may also include data captured by any type of sensor, scanner, or reader. For example, one or more embodiments may allow a user to use an RFID reader to read an RFID tag that identifies a potential referral.

Figure 7:
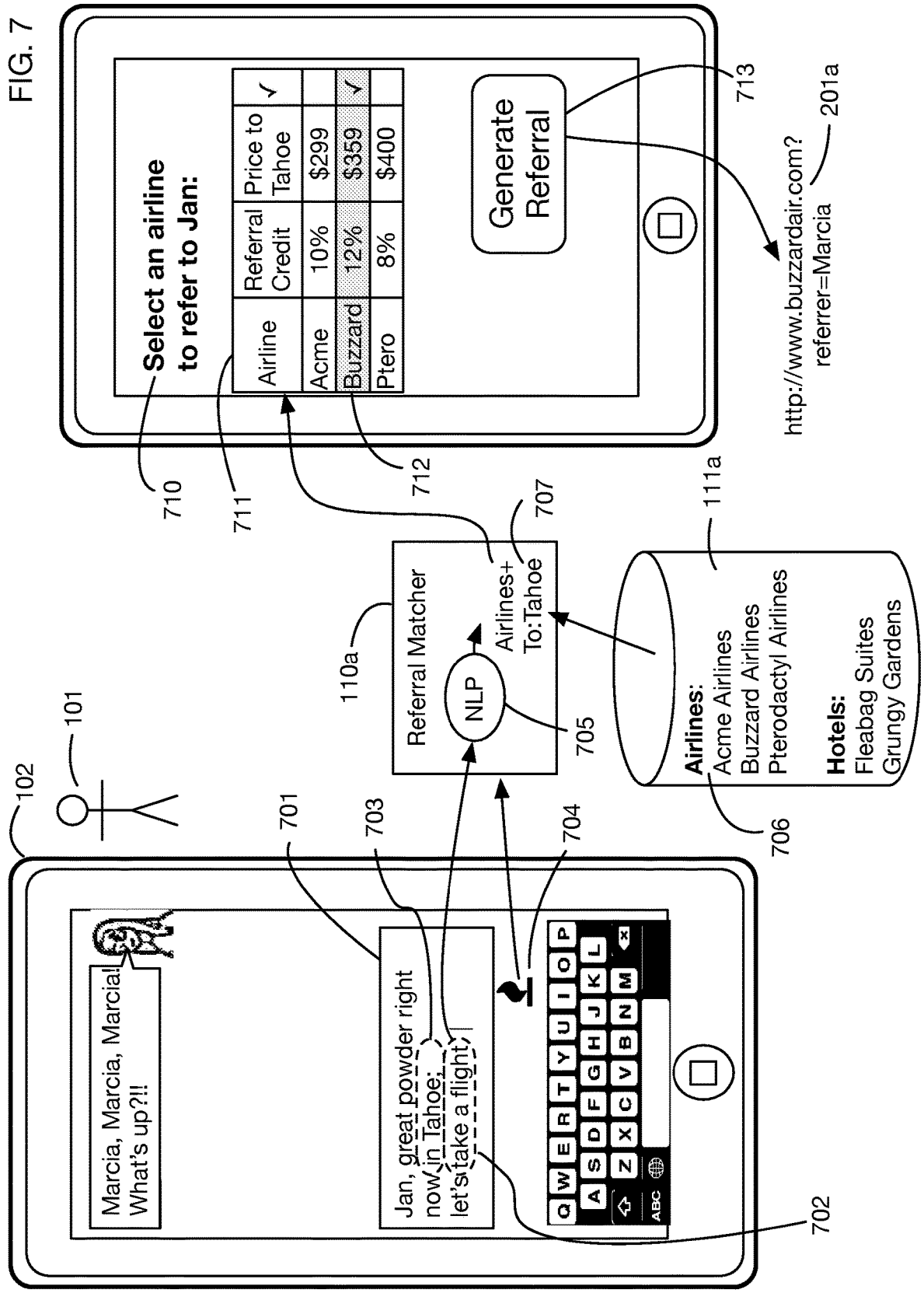
FIG. 7 illustrates an embodiment that uses natural language processing to identify words in a communication that may infer or otherwise match one or more merchants, and that presents a choice of matching merchants to the user.

In one or more embodiments, the referral matcher may use language processing and analysis techniques to understand the user's input and to determine matching merchants. These techniques may include for example, without limitation, artificial intelligence, natural language processing, collaborative filtering, type-ahead, predictive analytics, machine learning, recommendation engine, personalization engine, or any combinations thereof. FIG. 7 illustrates an embodiment where the referral matcher 110a has a natural language processor (NLP) 705 integrated into or accessible to the referral matcher. The user's input 701 is provided to the natural language processor 705, either automatically as the user types or in response to the user pressing a referral button such as 704. In this illustrative example, the NLP subsystem 705 recognizes the phrase 702 as relating to airline travel, and therefore searches the merchant database 111a for airlines. FIG. 7 also illustrates that in one or more embodiments the merchant database may be categorized, indexed, or organized in any desired manner to facilitate referral matching; for example, database 111a has airline merchants 706 identified as a particular product group. In this example, the natural language processor also detects that phrase 703 in the user's input 701 indicates the user's likely destination for air travel. Therefore, the NLP subsystem 705 determines that the user is discussing context 707, which includes both the product category (airlines) and the likely destination. All contextual information from analysis of the user's input may be used to select one or more matching referrals. Virtual keyboard 104 may be utilized with the microphone instead of directly manually typing as per FIG. 1 and also FIG. 7 for example.

Continuing the example shown in FIG. 7, in this case the referral matcher 110a determines that there are multiple possible merchants that match the user's input. When multiple merchants match the input, the system may either automatically make a selection of a merchant to refer, or it may ask the user to make a selection. (One or more embodiments may use combinations of these methods.) FIG. 7 illustrates an embodiment that asks the user to select which merchant to refer. Once the referral matcher has determined matching merchants, the system presents screen 710 to the user and asks the user to select one of the matching merchants. (This screen 710 is illustrative; one or more embodiments may present matching options to a user in any desired format and sequence.) In one or more embodiments, the referral matcher may provide additional information to assist in making the selection. For example, in FIG. 7 the selection screen 710 contains table 711 that shows the matching merchants along with the referral credits offered by each merchant. Table 711 also shows the price from each merchant for travel to the destination 707 determined by NLP subsystem 705. This example illustrates how the complete context 707 determined by the NLP subsystem may be used to determine an appropriate or potential referral, or to assist the user in making a selection from multiple matches. The user may select a particular merchant from table 711 and generate a referral link 201a using button 713. Other user interface options may include for example tapping a selected merchant in the table to generate a referral to that merchant, or tapping a button or icon to prompt the matcher to prompt the matcher to display a list of alternate matching merchants, or in some cases alternative product categories when the input has matches in multiple categories (such as a book title that has also been made into a movie and a board game).

Although FIG. 7 illustrates an example where the user makes a selection of a referral, in one or more embodiments the system may automatically select a referral based for example on the referral credit, the price of the product or service offered, or on any other factors. One or more embodiments may include a bidding system whereby merchants bid for referrals, for example by offering referral credit rates or other rewards. In one or more embodiments, the bidding system may be dynamic, in that referral credit information may be obtained for each transaction, for example whenever a referral matcher or a user is making a selection among merchants to generate a referral.

One or more embodiments may include a merchant bidding system through which participating merchants may compete with other participating merchants to be positioned higher in the prioritization of referrals. A merchant may include, without limitation, a retailer, e-commerce provider, service provider, advertiser, aggregator, broker, agency, promoter, or a party acting on their own behalf or on behalf of another party. Any of the following techniques may be utilized. Embodiments of the system may provide merchants with a self-service system for placing bids. Merchants may bid on a variety of matching characteristics including, without limitation, brand, product, service, keyword, phrase, product category, SKU or other product coding. Merchants may bid based on bidding strategies including, without limitation, referral fee percentage, fixed amount of reward, bounty for leads, price per click, bounty for installation of application or software, or another action performed by a recipient who has utilized a referral link to the merchant. Embodiments of the system may include a bidding platform that may provide the merchant with multiple modes of bidding including, without limitation, manual mode (with which, for example, merchant sets a specific bid price for a specific product referral) or automatic mode (with which, for example, merchant designates a daily budget and time period and the system adjusts the referral fee bid automatically to deliver the most referrals possible within the merchant's designated budget and time period). The merchant may specify bid pricing or referral limits based upon specific characteristics of the sender or recipient(s) including, without limitation, the sender or recipient's geography or, demographics, sender or recipient transaction history, input type used by sender, device type used by sender or recipient, communication channel through which the referral link was sent, or any combination thereof. The merchant may set limits on bids placed and may set time period for which the limits apply. Limits may include (without limitation) maximum amount of referral credits paid (for example a daily budget), maximum number of referrals received or other limits. Embodiments of the system may enable the merchant to set dynamically priced bids, such that the bid amount adjusts, which may be automatic, depending upon factors such as, without limitation, time of day, level of demand, inventory availability, climate changes, competitive pricing dynamics relating to other merchants, specificity or other characteristic of the sender's input which generated the referral, number or rate of referrals already received or paid by the merchant, or other characteristics of sender or recipient such as any of those mentioned above (e.g., geography, user demographics, communication channel utilized, etc.). Embodiments of the system may provide merchants with a dashboard which may provide, without limitation, account settings, preference settings, payment setting, reporting, data and analysis, bidding controls, account management services and communication tools. Embodiments of the system may implement any of these techniques for example at least at FIG. 11, step 1112.

Figure 8:
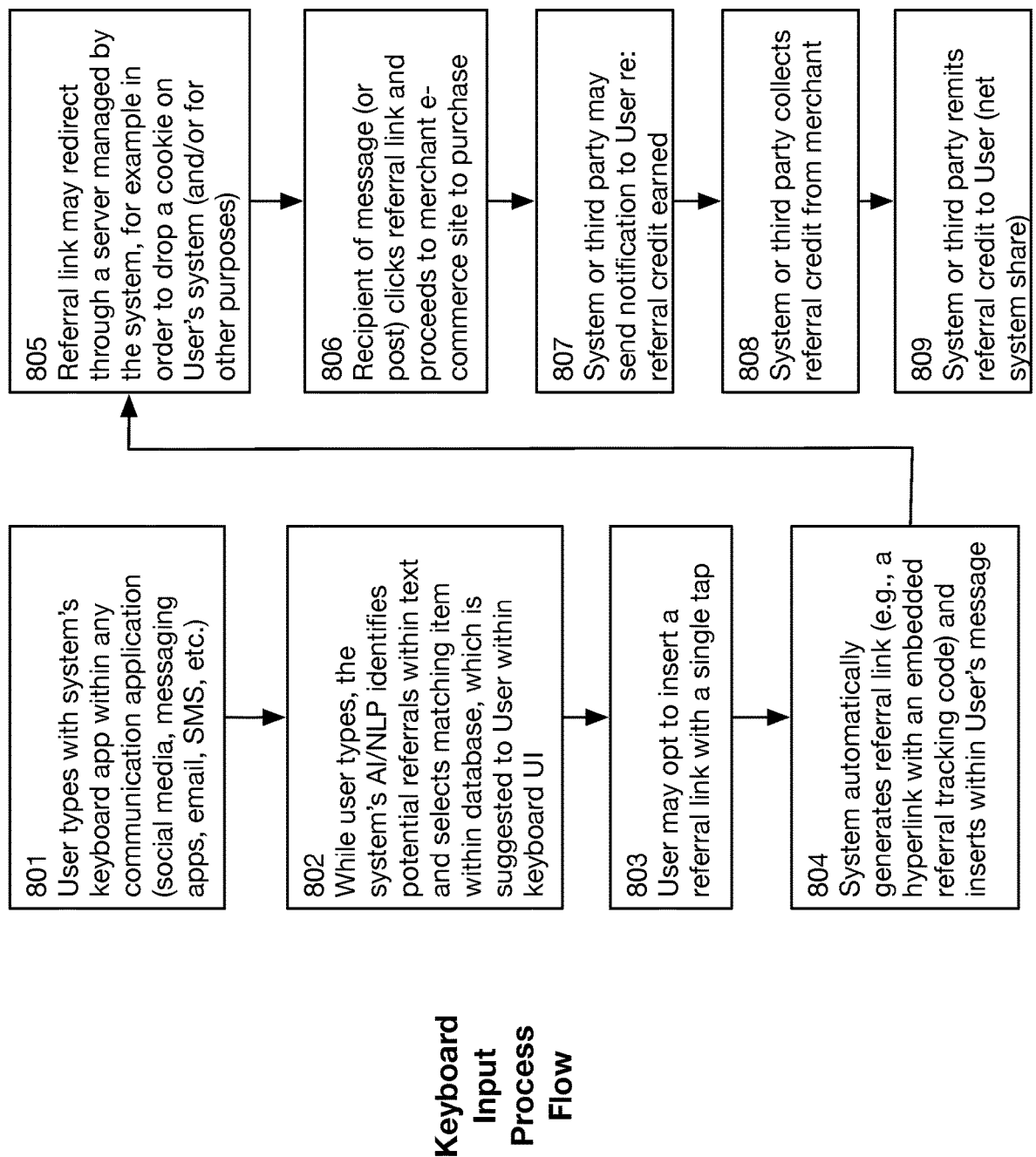
FIG. 8 shows an illustrative process flow for an embodiment of a peer-to-peer trackable referral system, where the input used for the referral lookup is obtained from a keyboard.

FIG. 8 shows an illustrative process flow for selected steps in the referral process, for a scenario and embodiment in which input is obtained from the user via a keyboard. These steps are illustrative; one or more embodiments may execute different steps, additional steps, or may execute any of the steps shown in FIG. 8 in a different order or in parallel. In step 801, the system accepts input as the user provides the input via keystrokes using a virtual keyboard connected to a communications app. In one or more embodiments, the virtual keyboard may contain or be linked to a referral matcher for example over any type of local or remote communications channel; this referral-aware keyboard may for example be usable with any application that accepts keyboard input, (which again may include spoken words via the microphone). By integrating the referral matcher with the keyboard, one or more embodiments enables universal general-purpose referral generation capability for any communication initiated by the user.

In step 802, the referral matcher may use artificial intelligence, natural language processing, or similar techniques to parse and understand the user's input. It may then select a matching item in the database, and suggest this referral to the user. A matching item may be any type of information for which a referral or recommendation may be relevant, including for example, without limitation, a product, a service, a brand, a merchant, an activity, an instruction, a suggestion, a solution, an information source, a person, and organization, a professional, or any combination thereof. The suggestion may be integrated into the keyboard app, for example as a suggested word completion. At step 803, the system may accept input from the user that may then tap on the suggested referral to accept it, which triggers step 804 that creates and inserts a referral link into the communication. The referral link may for example contain a hyperlink to a merchant (or to an intermediary), along with a tracking code that identifies the referring user.

Once the message containing the referral link is transmitted to the recipient, the system may execute additional steps such as steps 805 through 809, for example when and if the recipient uses the referral link to access a merchant site or to make a purchase. In step 805, if the recipient accesses the referral link, the link may in one or more embodiments initially pass through an intermediate server, prior to redirecting the recipient to the merchant's site. This server may for example track the referral, and it may place tracking information such as cookies on the recipient's device. A cookie may for example have a duration that last for multiple days, thereby providing credit to the referrer if the recipient transacts at another time other than the initial click of the link. The cookie may also provide credit if the recipient subsequently goes directly to the merchant site without using the referral link. In cases where the recipient's device does not accept cookies (many mobile phones do not), one or more embodiments may use other techniques such as device UID and IP address to associate a recipient's subsequent transactions with the original referral link. In one or more embodiments, the referral link may lead the recipient to a site or user interface control that may link to one or more merchants, rather than to an intermediate server that automatically forwards to a merchant site. For example, without limitation, the referral link may lead the recipient to a jump page, an interstitial web page, a pop-up, or an overlay. This link destination may show a range of information related to the referral link, including for example product descriptions, product or merchant locations, a list of matching merchants from which the recipient can select, images, videos, or any other information related to the referral.

In step 806, the system accepts input from the recipient who proceeds to the merchant's site using the referral link.

If the recipient makes a purchase or other transaction on this site, the system's referral tracker records the transaction. In step 807, a notification may be sent to the referring user by the system. In step 808, the referral tracker collects a referral credit from the merchant, which is then remitted in step 809 to the referring user. In one or more embodiments, some or all of the steps of tracking, attribution, collection, and payment may be performed by third-party services or systems.

Figure 8A:
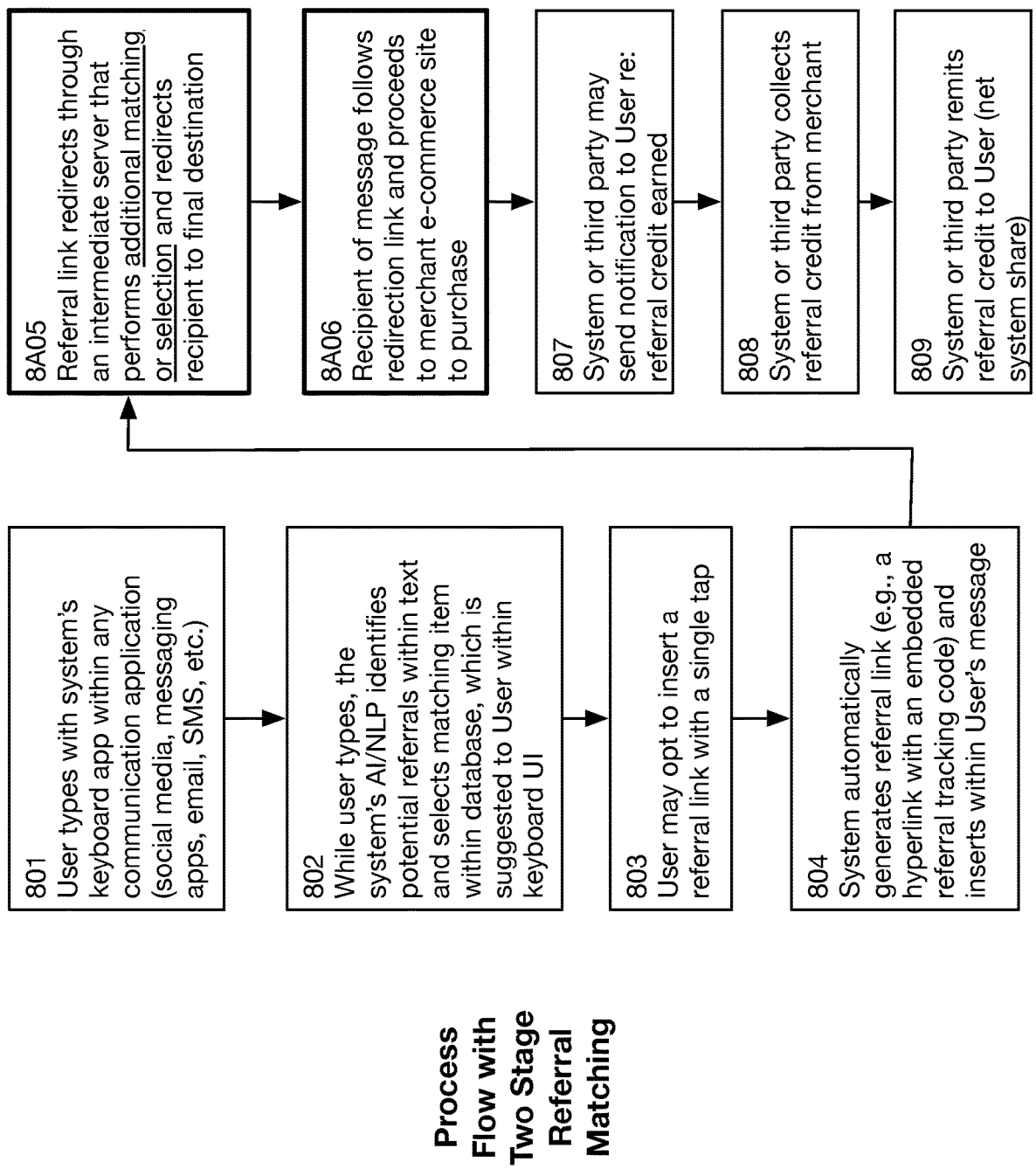
FIG. 8A shows a variation of the process flow of FIG. 8, where a referral link directs a recipient to an intermediate server that makes a final selection of a referral destination, and redirects the recipient to that destination.

In one or more embodiments, determining a destination (such as an e-commerce site or a product page) for a referral may be performed in two (or more) stages. FIG. 8A shows an illustrative process flow for an embodiment that uses two-stage matching to direct a recipient to a referral destination. Initially in step 802, as in FIG. 8, the referral matcher determines a match for the user's input, and in step 804 the system generates a link with the match information. However, in one or more embodiments the initial match in step 802 may not identify a final referral destination, but may instead identify only general information such as the existence of a matching product, service, or merchant, or a general category or group of products, services, or merchants that may match the user's input. For example, the initial referral matching step may identify that a user communication mentions a flight, but it may not identify a particular airline to fulfill this flight. In these situations, the initial referral link generated in step 804 may direct the recipient to an intermediate server that performs additional processing and matching in step 8A05 to select a final destination for the referral; the intermediate server may then redirect the recipient of the referral link to this final destination. When the recipient is redirected, the recipient arrives in step 8A06 at a final referral destination (such as an e-commerce site), where the recipient can perform actions that result in a referral credit to the referring user (as described above with respect to FIG. 8). The final destination may be for example, without limitation, a web site, web page, application, URL, URI, web service, or more generally any physical or virtual destination or service that completes the referral.

A potential benefit of the process flow illustrated in FIG. 8A is that the initial referral matching step 802 can be relatively "lightweight" and may for example require only a relatively small database of products, services, and merchants. Moreover, this database for the initial matching may not need to be updated in real time to reflect dynamic information that may determine the best match for a referral. Because the final matching stage 8A05 is performed on the intermediate server, it can access a more complete and up-to-date database of information, including for example dynamically updated bids from merchants on referrals. It may also access more powerful computing resources to execute computationally intensive algorithms. The intermediate server can use any desired strategy or prioritization algorithms to determine which merchant to send a recipient to. For example, without limitation, the intermediate server may rank merchants by any or all of price, availability, user ratings or reviews, level of inventory, proximity to a user, speed of fulfillment, or size of referral credit offered to the referring user.

FIG. 8A illustrates a two-stage referral matching process flow. One or more embodiments may generalize this process to perform referral matching in any desired number of stages, using any desired number of servers and databases to process information and determine a final destination associated with a referral link.

Figure 9:
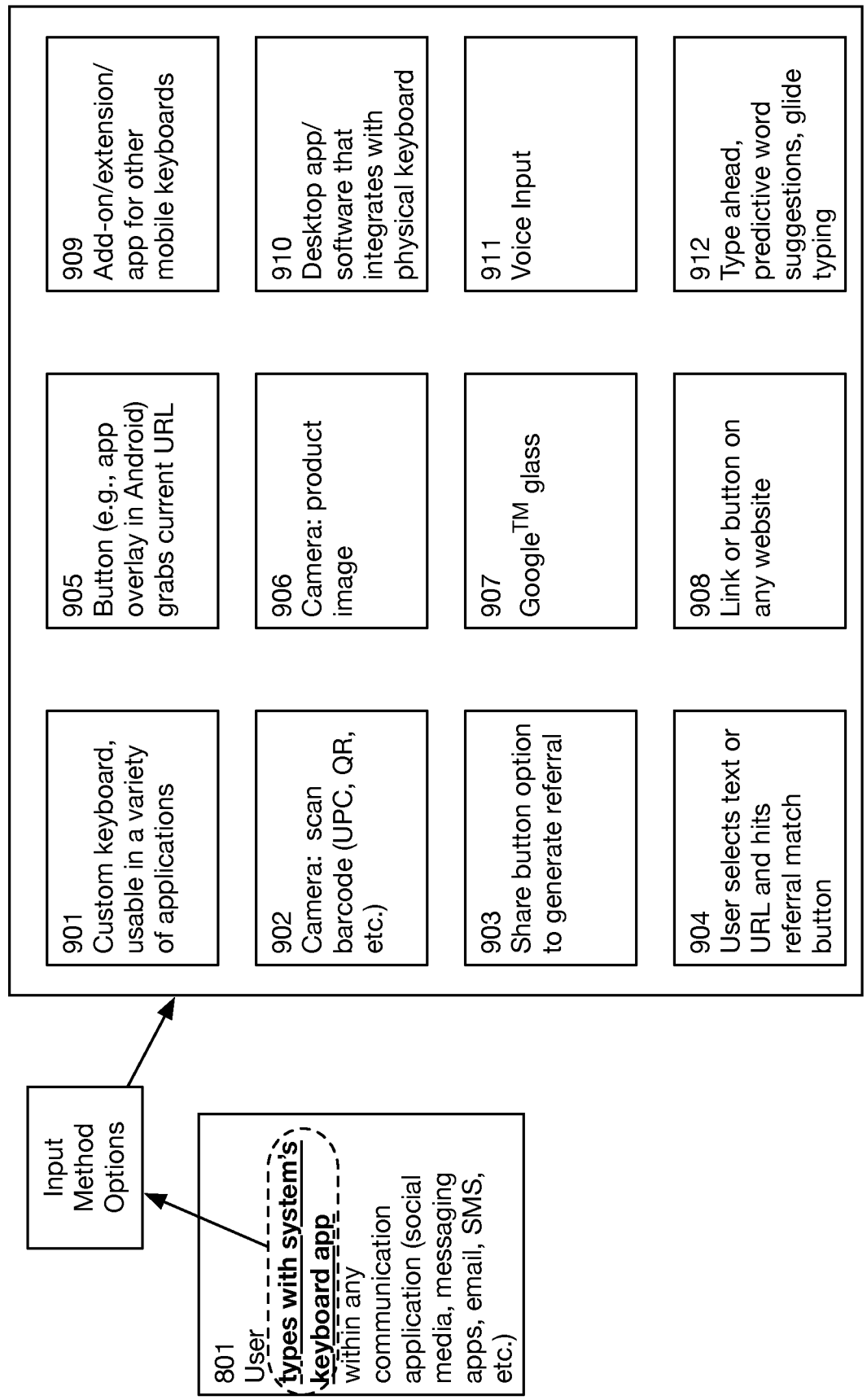
FIG. 9 shows illustrative alternative embodiments for obtaining input that may be used to generate a referral.

The process flow shown in FIG. 8 uses keyboard input as illustrative input into the referral process. As described above, other forms of input may be accepted by one or more embodiments. FIG. 9 illustrates several other input method options that may be supported by one or more embodiments of the referral system. In addition to keyboard input option 901 (as shown in FIG. 8), input may be obtained from a camera scanning any type of code, e.g., barcode 902, from a share button option 903, from a user selection of text or a URL 904, from a button 905 that grabs a current URL, from a camera scanning a product image 906, from images or audio obtained from Google™ glasses 907, from a link or button placed on any website 908, from add-ons or extensions for other keyboards 909, from an application that integrates with a physical keyboard 910, from voice input 911, or from type ahead, predictive word suggestions, or glide typing applications 912. These input methods are illustrative; one or more embodiments may obtain input of any type, in any format, from any device, service, subsystem, or application.

As a first illustrative example, which corresponds to keyboard input option 901, the system may be integrated into a mobile device virtual or soft keyboard input method or service. The system may monitor input content from this soft keyboard and interpret through analysis when the user has referenced an item. When the user completes the input of a reference to an item (or to an entire communication with references in it), the system can offer to optimize the user's communication before it is sent. The system may do this automatically or at the user's specific request.

As a second illustrative example, which corresponds to voice input option 911, the system may be integrated into a mobile device or a smart speaker application. The system may for example monitor words as the user speaks them and perform analysis of the content to identify references to items. Before the user sends the communication, the user may have the system optimize the communication. This optimization may be done automatically or upon the user's explicit request. When the system optimizes the communication, it augments the communication such that the reference to an item includes characteristics that include tracking and attribution (such as the user ID and the item in the database).

As a third illustrative example, which corresponds to camera input option 906, the system may be integrated into a camera within a mobile device. When a user uses a mobile device camera the system may analyze the image in order to determine whether the image matches an item in the database. If the image matches an item in the database, the system may prompt the user to share the image in a digital communication and the system may transform or augment the image to include a link or to make the image clickable (with a link embedded therein), either automatically or with a prompt from the user.

In one or more embodiments, a referral matcher or any related module of the system may analyze any type of existing content or new content that is input by a user into any application, in order to monetize a communication between the user and one or more recipients. The referral matcher may be built into an application or may connect to any application via any technical interface, such as for example, without limitation, a local SDK, a remote API, a set of user interface components, or a back-end system to integrate any other interface or interfaces. An application to which the system connects may be any software, system, device, application, or technology that enables a user to input content or to share content with a recipient. Applications may for example provide communications via any digital platform, such as, without limitation, peer-to-peer communications, social media, services, messaging applications, e-commerce services, digital media, digital content, images, videos, audio, product reviews, chat rooms, or published content. Applications may incorporate or integrate with devices or services such as for example, without limitation, a physical keyboard, a virtual keyboard, a mobile device or application or software, an image capture device or software, an audio/video capture device or software, a kiosk, a scanner, an RFID reader, a microphone, a vehicle, a smart speaker, smart glasses, an augmented reality device or software, a virtual reality device or software, an automated personal assistant, a smartphone, a computer, a server, a tablet, a notebook, a laptop, and any software or hardware embedded within any such device or service or subsystem.

Content accepted by, analyzed by, or transformed by the system may include content of any type or types, in any format of formats, including for example, without limitation, text, data, code, information, images, voice, video, and RFID.

A user providing input to the system may be for example, without limitation, any individual, content creator, group, company, organization, system, subsystem, bot, app, application, server, or service. The system may assign a unique user ID to each user. A user may interact directly with the system or may interact (either knowingly or unknowingly) via an integration of the system into an application that the user is using, or via a plug-in for an application or service that the user uses. A recipient may be for example, without limitation, one or more individuals, companies, organizations, or entities that hear, view, read or otherwise receive the content that is input by a user or one or more links generated by the system. In one or more embodiments, a user and a recipient may be the same individual or entity.

In one or more embodiments, the system may analyze the content of a communication using any desired methods or technologies, including for example, without limitation, natural language processing, artificial intelligence, or image recognition. This analysis may for example determine explicit references to items in the database, or implicit intent or context from which items in the database may be inferred.

As an alternative to the input method options illustrated in FIG. 9, which may for example connect the referral matcher locally with a communications application, one or more embodiments may allow a user to "fetch" a link from a remote service. For example, a user may create content and send this content to a remote service, via for example a text, email, in-app communication, Facebook® post, or instant message. The system may provide or integrate with this remote service, and may analyze the content received to identify matches to items. The system may then convert matching content to links and insert the reformatted content with these links directly into a digital communication as specified by the user or the system may send the reformatted content with these links back to the user. The user may then insert the reformatted content including the links into digital communications. For example, as a variation of the scenario illustrated in FIG. 7, a user may create a message with the content "Flight to Tahoe" and send it (via email for example) to a remote matching service. The matching service may then generate the link 201 (in FIG. 7) and insert the link into a digital communication or send the link back to the user, who can then insert the link into any desired message. When a recipient receives the link, it functions similarly to links generated via virtual keyboards or other input methods.

Figure 10:
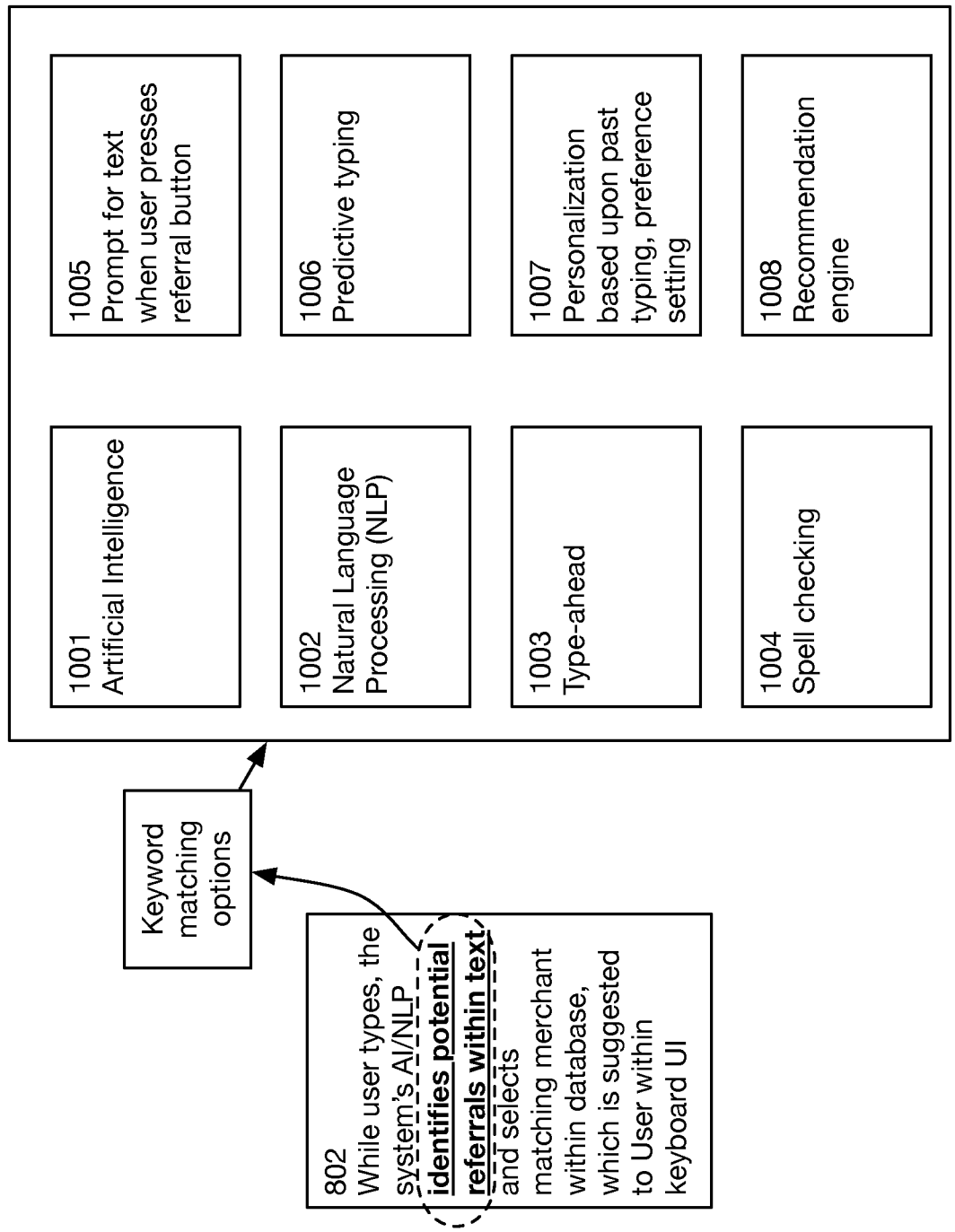
FIG. 10 shows illustrative alternative embodiments for identifying potential referrals.

FIG. 10 shows illustrative options for keyword matching or similar functionality that may be used to identify potential referrals within the user's text input or other input. Matching options may include for example artificial intelligence 1001, natural language processing 1002, type-ahead 1003, spell-checking 1004, prompts for text when the user presses a referral button or icon 1005, predictive typing 1006, personalization based on past typing or preferences 1007, and processing using a recommendation engine 1008. Additional options may include for example, without limitation, collaborative filtering, affect analysis, predictive analytics, and machine learning.

When multiple potential matches or referrals are identified, one or more embodiments may employ business strategies and algorithms to prioritize among the alternatives, thereby determining which merchant, merchant site, or coupon to present to the recipient. This prioritization may for example analyze any factor or factors, such as for example, without limitation: sender characteristics, such as the sender's item preferences (either explicitly provided or implicitly derived) and the sender's message intent or sentiment (determined for example via NLP or hashtag analysis); recipient characteristics, such as the local time zone, location, and previous behavior including item preferences (explicitly provided or implicitly derived); item characteristics, such as price, availability, discount amount, brand reputation, and product delivery speed; merchant characteristics, such as conversion rate, payout amount, and reputation analysis; and bidding platform characteristics, such as payout amount and settlement period.

Figure 11:
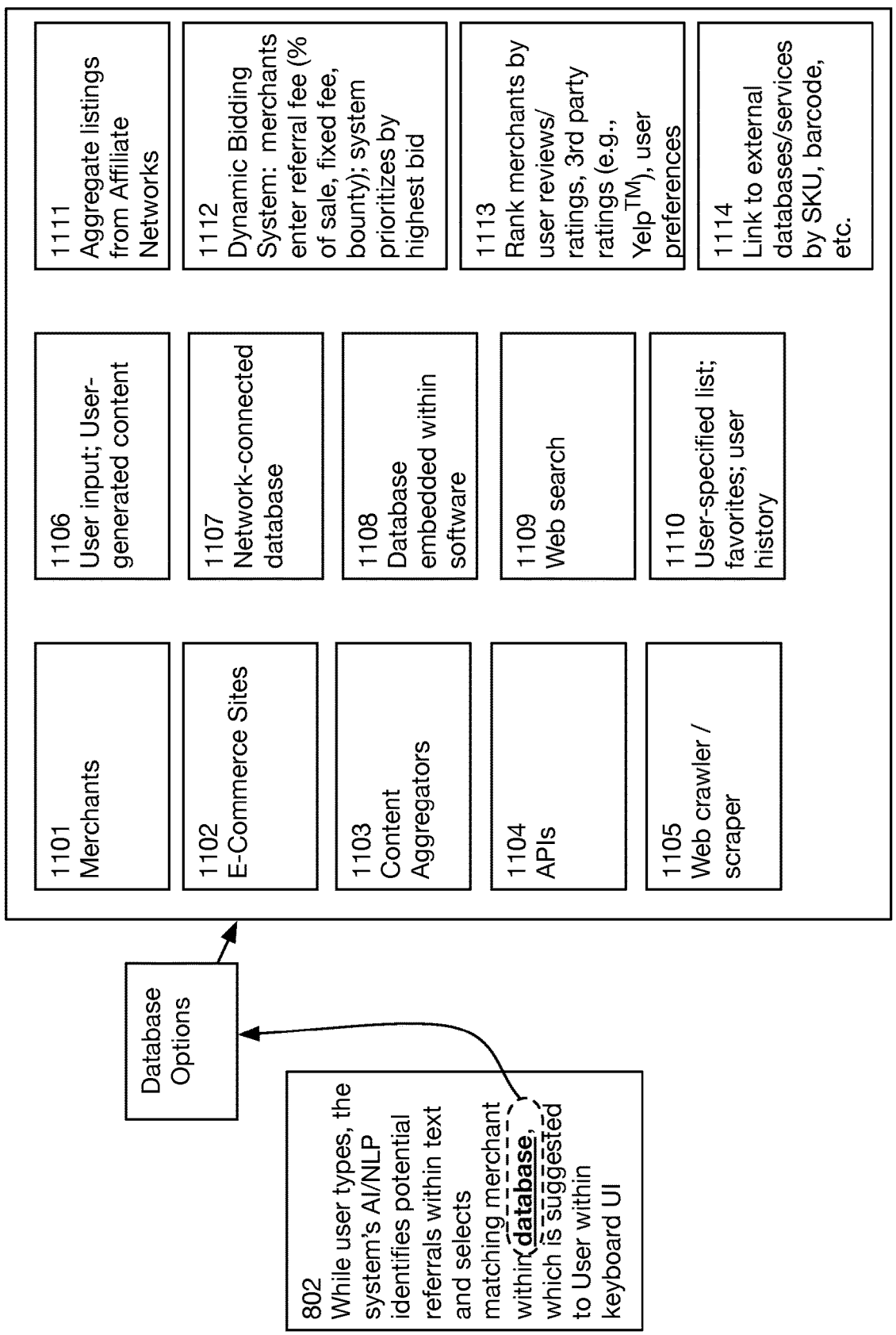
FIG. 11 shows illustrative alternative embodiments for information sources that may be used for a database of merchants for potential referrals.

FIG. 11 shows illustrative options for data sources that may provide data for a merchant database. A merchant database may contain information on merchants and on any products or services offered by merchants or by any sellers. The system may aggregate items into the database using any of several methods, including for example, without limitation, automated fetching of content made available by merchants or other intermediaries, manual input by system administrators or users, direct self-service input by merchants, input via a bidding platform, automatic creation of new items obtained by scanning and analyzing user input, and dynamic search of the web or other databases for matching items or brands that are not currently in the database. Data may be obtained directly from merchants 1101 and e-commerce sites 1102, or indirectly from content aggregators 1103. Content retrieved from merchants or intermediaries may include for example, without limitation, product catalogs, SKUs, image files, merchant affiliations with networks or other intermediaries, promotion units (including banner ads) for merchants or specific products, and URLs with deep-links to product detail pages for example. Data may be obtained via APIs 1104 or by using web crawlers/scrapers 1105. Data may be obtained from user-input and user-generated content 1106, from a user-specified list, user favorites, or user history 1110. Databases may be network-connected 1107, embedded within the software 1108, or reachable via web search 1109. Data may be obtained from aggregate listings from affiliate networks 1111. Data may be obtained from a dynamic bidding system 1112, where merchants for example may bid by specifying a referral fee. Data in the database may be ranked in any desired manner, for example by user reviews/ratings, third party ratings, or user preferences 1113. Data may be obtained from external databases or services indexed for example by SKUs, barcodes, or any other identifier of a product, service, or merchant. The system may use artificial intelligence or other methods to identify, within user input, content such as keywords, terms describing items, or new products and services; the system may then automatically (or via a prompt to a system administrator) create items in the database that match the newly identified items. These examples are illustrative; one or more embodiments may obtain data on merchants, products, services, referral fees, merchant locations, the availability of inventory, ratings or reviews related to merchants, products, or services, prices, or any attributes of these items from any desired data source, in any desired format.

Figure 12:
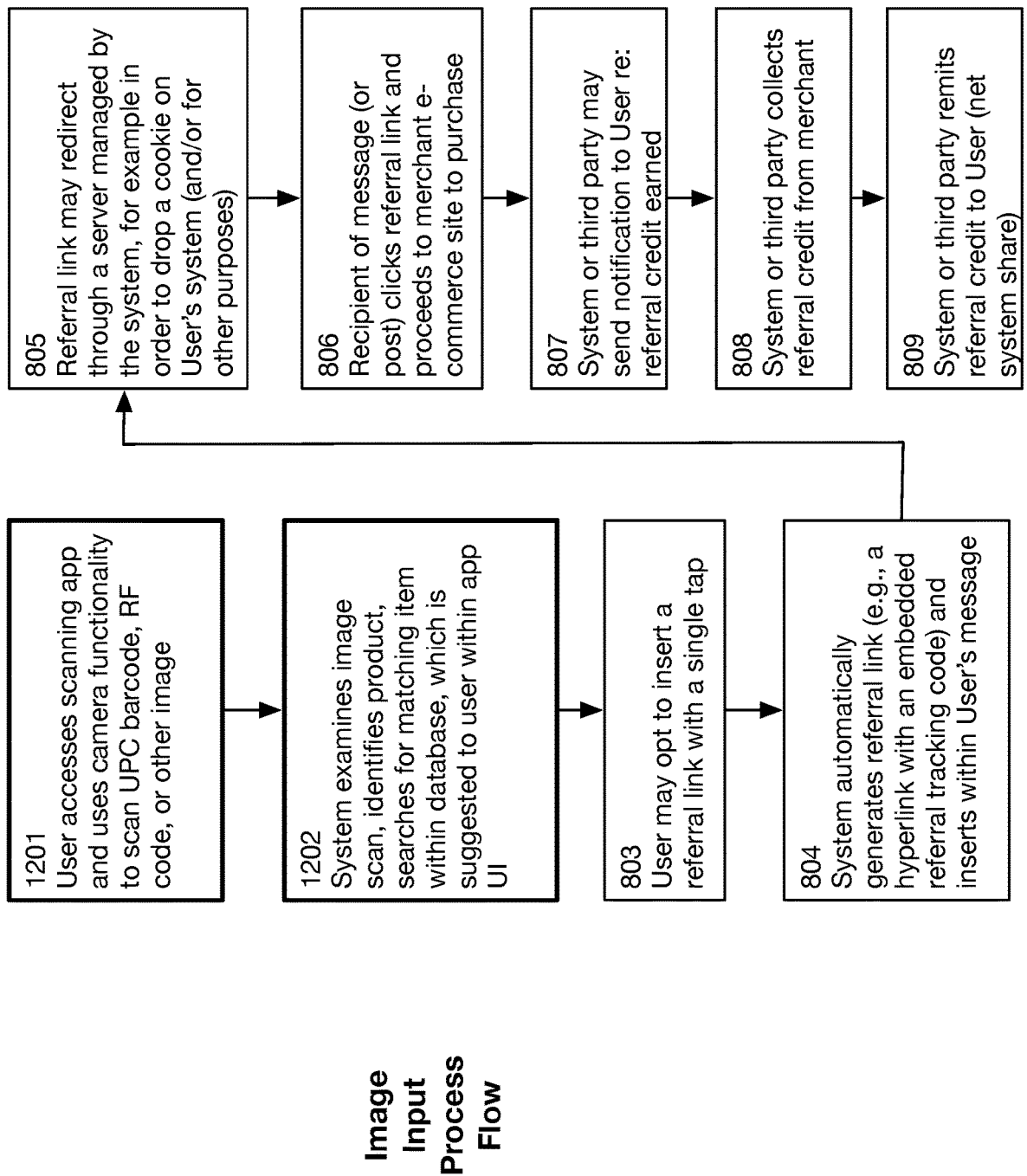
FIG. 12 shows a variation of the process flow of FIG. 8, where input for a referral is received from an image instead of from a keyboard.

FIG. 12 illustrates a variation of the flowchart of FIG. 8, where input is obtained from an image rather than from a keyboard. In step 1201, the user captures an image such as a barcode, QR code, or a product image, for example using a camera integrated into or reachable via a user's device, or by selecting a previously captured or otherwise accessible image on the user's device or accessible via a network connection. In step 1202, the referral matcher analyzes the image to determine which products, services, or merchants match the image, and it may suggest this referral to the user. The remaining steps in this process flow may be similar to those described with respect to FIG. 8.

Figure 13:
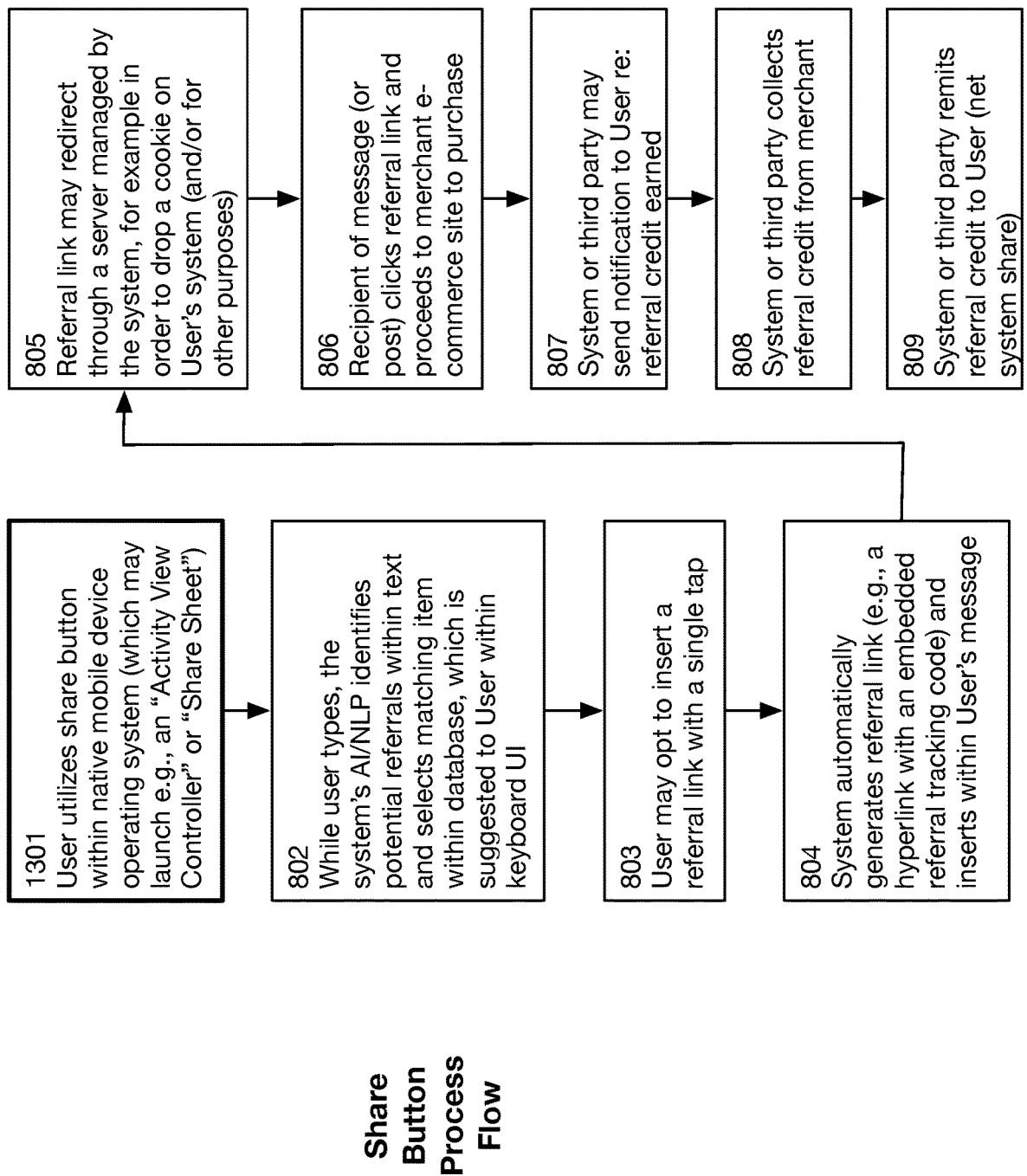
FIG. 13 shows a variation of the process flow of FIG. 8, where a referral is initiated via a share button.

FIG. 13 illustrates a variation of the flowchart of FIG. 8, where input is obtained via a share button instead of or in addition to from a keyboard. In step 1301, the user uses a share button to share an item; the share button may for example launch a "share sheet" with sharing options that depend on the item being shared. The shared content is then analyzed in step 802, and additional steps in the process flow may be similar to those described with respect to FIG. 8.

Figure 14:
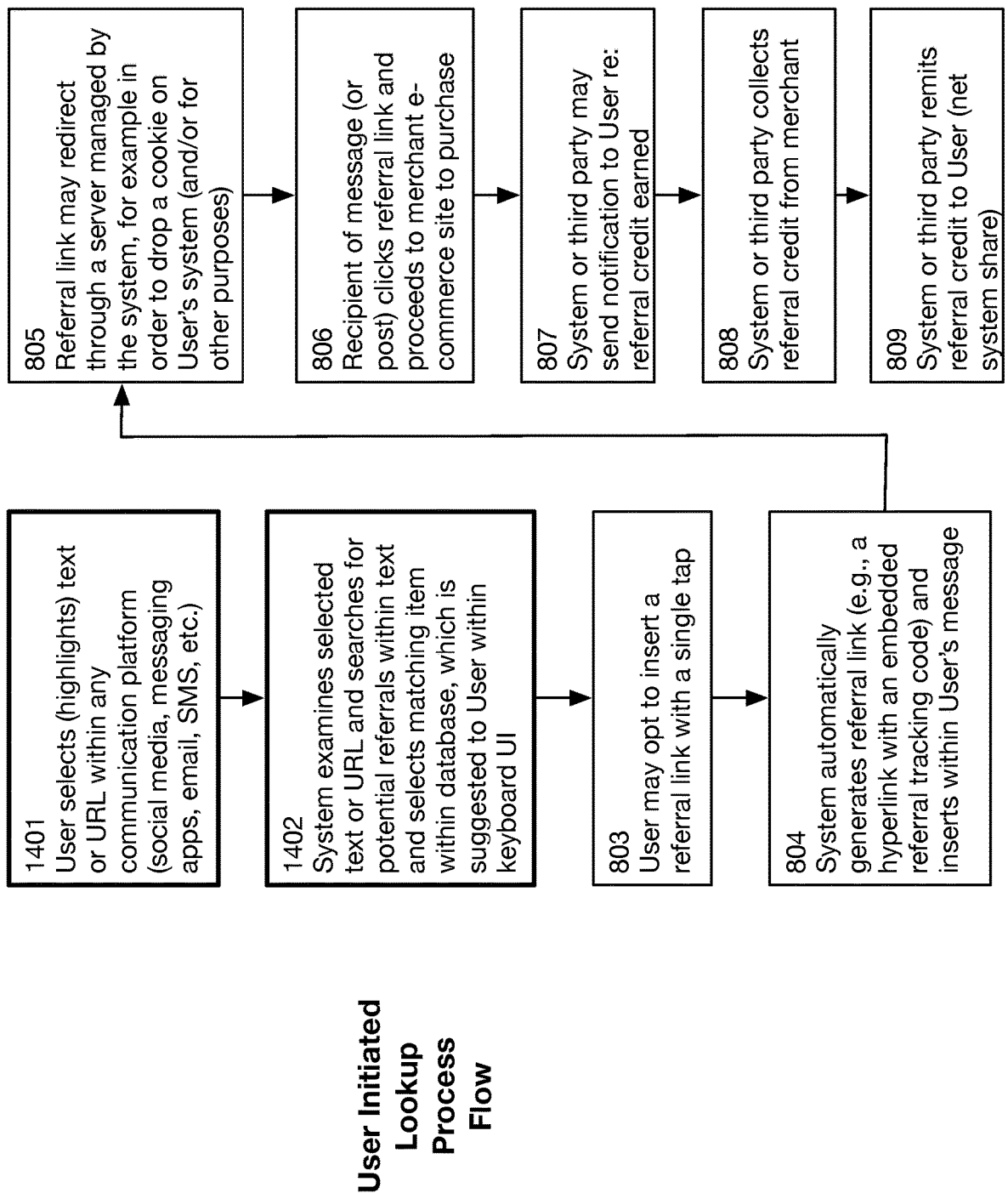
FIG. 14 shows a variation of the process flow of FIG. 8, where a referral is initiated when a user selects text or a URL and searches for matching potential referrals.

FIG. 14 illustrates a variation of the flowchart of FIG. 8, where input is obtained from a user selection instead of from keystrokes of a keyboard as the user types. In step 1401, the user selects text, a URL, or any other item, within any application. In step 1402, the referral matcher analyzes the selected information to identify one or more matching products, services, or merchants in the database; it may then present the match or matches to the user as a suggestion, for example as part of a keyboard app. In another variation, the matcher may work continuously in the background to match the user's input, and may respond with suggestions only when the user requests the matching referrals. The remaining steps in this process flow may be similar to those described with respect to FIG. 8.

For the system features and capabilities described above, one or more embodiments may perform functions that analyze system performance and optimize the system for improved performance over time. For example, optimizations may be performed to improve utilization, utility, or value of the system for users, recipients, merchants, or administrators. Illustrative optimizations may include for example the following processes. The system may use artificial intelligence or other techniques to observe user input content and to identify new items that should be added to the database. The system may aggregate and analyze data regarding user, recipient and merchant use of the system in order to: improve performance of links; increase fees earned; optimize which site or coupon is selected; and maximize conversion rates (such as the fraction of recipient links that are activated or that result in transactions). The system may aggregate and analyze data regarding the frequency of match between content and database items (for example by evaluating ratios such as the number of item matches per word of content or the number of item matches per communication sent); matching algorithms may be adjusted to increase (or decrease) these frequencies. The system may test links (periodically or continuously) to ensure that the URL formatting rules are functioning as intended, and in the event of a malfunction may alert an administrator or fix the malfunction automatically. The system may also incorporate trust and safety procedures and subsystems to monitor, flag, and prohibit fraudulent use of the system, in order to protect the interests of merchants, users, recipients, and administrators.

In one or more embodiments, any combination of the functions performed by the system may utilize technology, software, resources, and services of third-party service providers.

In one or more embodiments, a referral link may be inserted by a communication intermediary that conveys, transmits, routes, directs, receives, stores, forwards, resends, transforms, analyzes, combines, filters, translates, formats, edits, posts, displays, or otherwise handles a message or other communication from a sender to a receiver. The communication intermediary may be any link, service, provider, application, server, or gateway that handles the message or any part of the message at any point in the path from the sender to the receiver. The intermediary may be for example a message gateway associated with the sender, or a message gateway associated with the receiver, or a message gateway associated with both. In some applications, the sending user may not need to take any action for the referral link to be added to a message. The communication intermediary may be responsible for analyzing the message and adding a referral link if appropriate, and the intermediary may in some situations receive credit for a completed referral, either instead of or in addition to the sending user. In some scenarios, no software, app, or utility need be installed at all on the sending user's device or the receiving user's device, and analysis of the message and adding of a referral link may all occur after the communication has left the sender's device and before the communication is delivered to the recipient's device. This approach may simplify management of the referral process, since referral matching and referral tracking may be done centrally at one or a few communications intermediaries, rather than on thousands or millions of user devices. In one or more embodiments, software operating on the sending user's or recipient's device may communicate with the intermediary to select and add a referral link; the sender and recipient may or may not be involved in this process.

Figure 15:
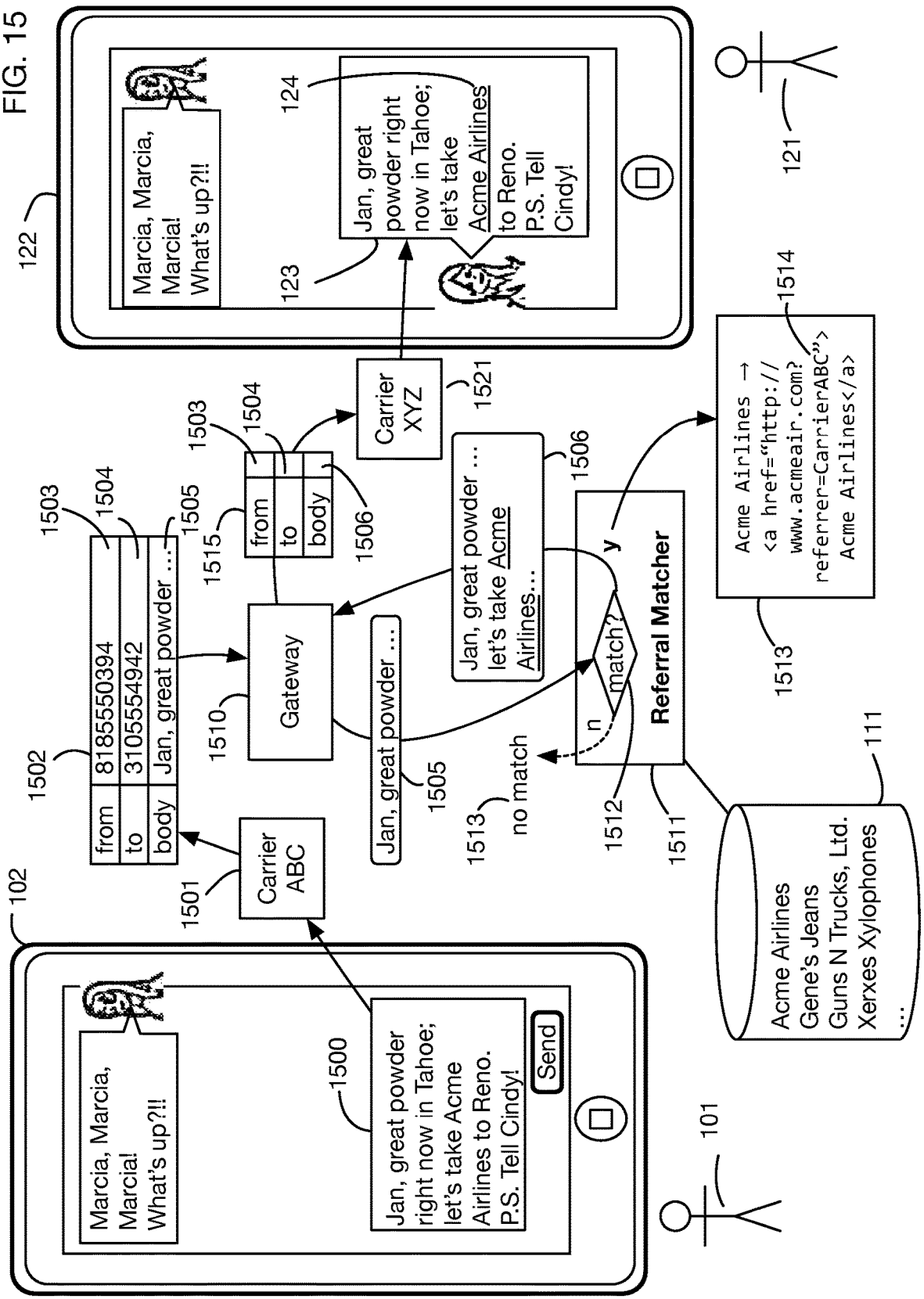
FIG. 15 shows an illustrative system with a referral matcher that operates at a gateway, rather than on the sender's device, and that identifies a communication intermediary as the referrer.

FIG. 15 shows an illustrative embodiment that integrates referral matching into the message flow through one or more communications intermediaries. In this example, user 101 constructs a communication 1500, which in this case is a text message, using mobile device 102. In this example, mobile device 102 has no software or application installed that intercepts characters or text of message 1500; instead the user constructs the entire message 1500 and sends it over normal communications channels. Communications carrier 1501 receives the communication 1500 from the device 102. Carrier 1501 may be any type of channel, organization, or infrastructure that conveys, transmits, receives, routes, forwards, stores, directs, edits, filters, formats, or manages any type or types of communications. For example, without limitation, carrier 1501 may be a network provider, a wireless provider, a cellular provider, an internet service provider, a social media platform, a messaging service, a telephone service provider, a broadband service provider, a Wi-Fi provider, an email service, a text message service, a mobile application, a software application, a chat service, an application that conveys, transmits, routes, or formats communications, or a gateway between any types of devices, networks, routers, or nodes. Message 1502 may be any type or types of communication, including for example, without limitation, a text message, an email message, a voice message, a video message, a website link, a link to a mobile application, a picture message, a transcribed message, a communication via social media, a communication via a shopping site, a communication via a message board, a posting to a product review service, an encrypted message, a digital communication, a comment posted to a digital media service, and a communication via any messaging application. Carrier 1501 transmits the message 1502 to a gateway 1510, which may for example process the message before forwarding it to the message receiver. The message 1502 may contain an identifier 1503 of the sender, an identifier 1504 of the receiver, and the message body 1505. The sender identifier and receiver identifier may be for example, without limitation, phone numbers, email addresses, social media identities, device IDs or any other identifying information. Messages may contain any other metadata, such as timestamps, priorities, or formats. The communication body 1505 may contain any type or types of content, including for example, without limitation, text, image, voice, audio, video, code, software, links, URLs, website addresses, and attachments.

In the illustrative embodiment of FIG. 15, gateway 1510 transmits the body 1505 of the message to referral matcher 1511. The referral matcher 1511 may execute on a computer that is coupled to or that hosts the gateway 1510. The gateway and the referral matcher may execute on the same computer device, or on different computer devices connected by a network or any other type of link. In one or more embodiments the referral matcher may execute on a computer that is coupled to both the gateway and the sender's device, or to both the gateway and the receiver's device; the gateway, referral matcher, and sender and receiver devices may interact in any manner to identify referral links and transform messages. The communications intermediary that processes messages to identify and insert referrals may be any combination of services executing on any combination of systems, including for example the sending and receiving devices and any intermediate nodes in a communication path between the sender and receiver. A computer that executes the referral matcher, the gateway, or both, may be any processing device or devices, including for example, without limitation, a desktop computer, a laptop computer, a notebook computer, a server, an embedded processor, a GPU, a tablet, a phone, a wearable processing device, a network switch or router, or a network of any of these devices. In this embodiment, only the message body 1505 is transmitted to the referral matcher 1511. The sender identifier 1503 and the receiver identifier 1504 are not transmitted to the referral matcher 1511. This limited information flow to the referral matcher protects the privacy and security of the sender and receiver. Personally identifying information or sensitive personal information of the sender and receiver may be protected in that this information is not transmitted to or accessible by the referral matcher. In one or more embodiments the gateway 1510 or the carrier 1501 may filter out other information as desired before transmitting the message body 1505 to the referral matcher. For example, the gateway 1510 may filter out person names (such as "Jan" and "Cindy"), information such as bank account numbers or social security numbers, or any other data that may be viewed as personal or sensitive.

Referral matcher 1511 then analyzes the message body 1505 to determine whether any words, phrases, text strings, or other content of the body match any of the listings in database 111. This process may for example be similar to the matching processes described above. The referral matcher may for example perform language processing of the message body to compare the content of the message body to the database listings. This language processing may for example use any techniques of natural language processing, machine learning, artificial intelligence, or pattern recognition. Words may be stemmed to simplify comparison to the entries in database 111. If the referral matcher finds a match in search 1512, it may then insert a link 1513 to a site or resource associated with the database entry. This process may be similar to the link insertion described above. However, in the embodiment shown in FIG. 15, the referrer in the link may be for example the carrier 1501 or any other message intermediary or gateway, instead of the sender 1503. The link may be for example a hyperlink 1513 that surrounds the word or phrase in the message body that matches a listing in the database, or any other format such as for example an icon or image adjacent to the matching content. The hyperlink 1513 may link to a site or other resource associated with the merchant, product, service, or other item in the database that matches the message body. For example, without limitation, the link 1513 may be to one or more of a website, a software application, an e-commerce service, a merchant shopping cart, a mobile application, a computer application, a store, a redirector, a link-tracking service, an affiliate network, a video player, a coupon or coupon code, a promotion or promotion code, a discount code, a transaction code, a mapping service, and a URL. In one or more embodiments the link may be to an intermediate server that redirects to the final destination, as described above. The hyperlink 1513 may have an embedded referral code 1514 that identifies one or more referring entities, such as the carrier 1501 or the gateway 1510.

The referral matcher 1511 inserts link 1513 into the message body, and returns the transformed message body 1506 with the link to the gateway 1510. The gateway 1510 may then add the sender and receiver identifiers, and any other metadata, to the transformed message body 1506, resulting and forward the transformed message 1515 to the receiver or receivers. The message may pass through other intermediaries such as carrier 1521, which may be the same as or different from the intermediary 1501 that originally carried the message from the sender's device. The receiver 121 then views the message 123 with link 124 on device 122, as described above.

The matching process 1512 of the referral matcher 1511 may not identify a match between a message body and the database 111. In this situation the referral matcher may return a no-match result 1513 to the gateway, which indicates that the gateway should forward the original message to the receiver.

Figure 15A:
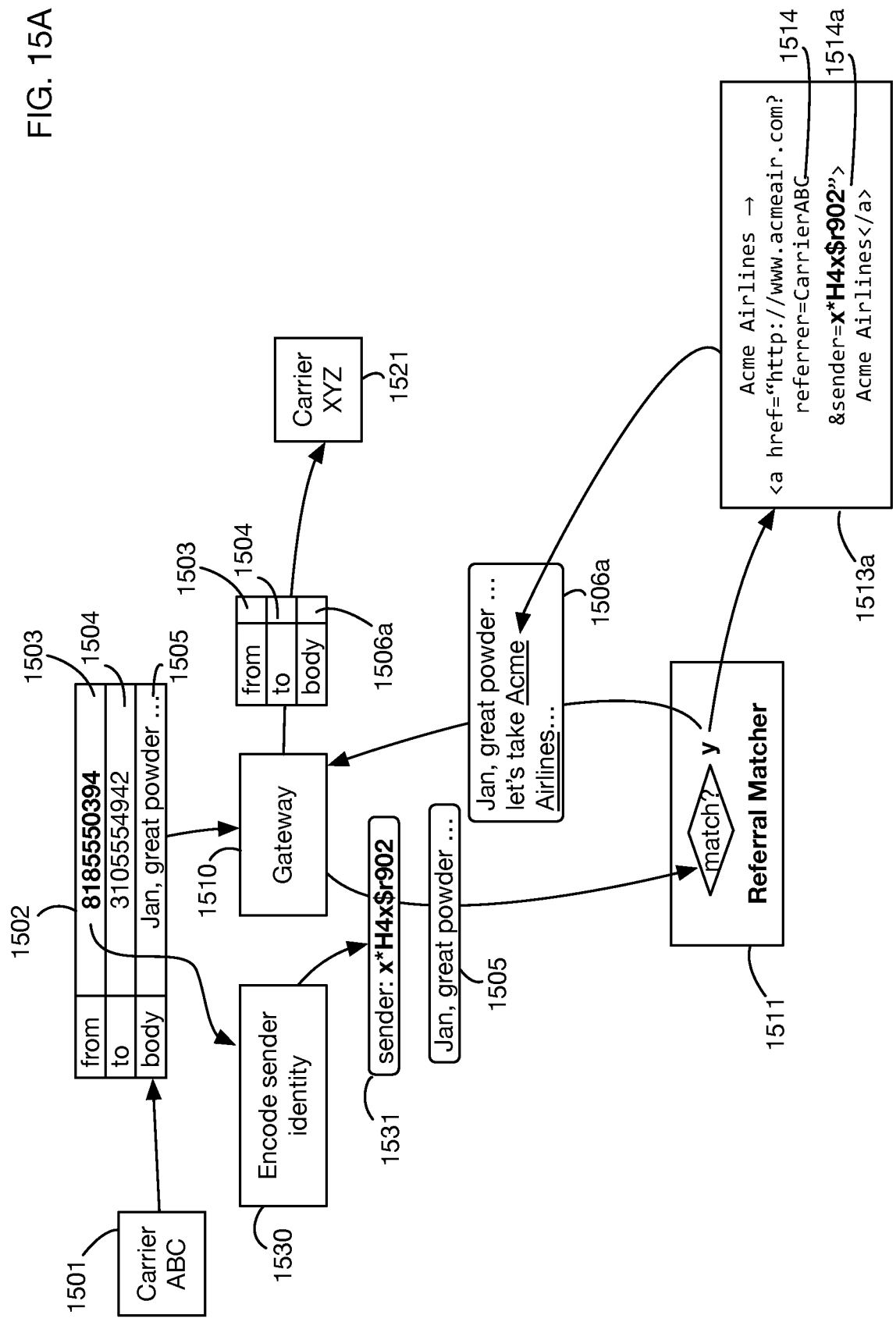
FIG. 15A shows a variation of the embodiment of FIG. 15, where both the sender and the intermediary are identified as referrers.

In one or more embodiments, a referral link may include both the identity of a communication intermediary and an identity of the sender. This situation is illustrated in FIG. 15A. As in FIG. 15, message 1502 is transmitted to gateway 1510, which forwards message body 1505 to referral matcher 1512. In this embodiment, the sender identifier 1503 is encoded in process 1530, and an encoded sender identity 1531 is also passed to the referral matcher. The referral matcher 1511 then inserts an embedded referral tracking code 1514 for the carrier (or other intermediary) and another referral tracking code 1514a with the encoded sender identity. Because the sender identity is encoded, the privacy and personal information of the sender is preserved; however, the sender may be credited for the referral using the encoded identifier. One or more embodiments may put any desired information into one or more embedded referral tracking codes that are integrated into a referral link; this information may identify either directly or anonymously via encoded data any party involved in the creation or transmission of a communication.

In one or more embodiments, a communications intermediary that processes a message may be associated with the receiver of a message rather than, or in addition to, the sender. This scenario is illustrated in FIG. 15B, which is a variation on the embodiment shown in FIG. 15A. Message 1500 is transmitted through two communications intermediaries: first through carrier 1501 that is associated with the sender, and then through carrier 1521 that is associated with the receiver. Other communications intermediaries may exist between carriers 1501 and 1521. Messaging gateway 1510 is linked to carrier 1501; however, unlike the scenario in FIG. 15, this gateway 1510 does not transform the message to insert a referral link. Instead the message is forwarded to carrier 1521 and a second message gateway 1510b that is associated with the receiver's carrier 1521. The receiver gateway 1510b forwards the body 1505 of the message to the referral matcher, which inserts the referral link and returns the transformed message body 1506b to the gateway 1510b. The transformed message 1515b is then sent to the receiver's device 122. In this scenario, the referral link 124b may be associated with the receiving gateway 1510b or the receiving communications carrier 1521, for example.

In one or more embodiments, the referral link may contain the identity of the receiver, instead of or in addition to the identity of the communications intermediary associated with the receiver, or in addition to identities of any other intermediaries or of the sender. This receiver identity may be encoded, similarly to the encoding of the sender identity illustrated in FIG. 15A. In the example shown in FIG. 15B, the transformed link 124b in message body 1506b may for example contain the identity 1514b of the communications intermediary 1521, and the encoded identity 1516b of the receiver 121 or of the receiving device 1222. Referral links may in general contain identities (unencoded or encoded) of any of the parties or systems involved in a communication, including the sender, receiver, carriers, gateways, and other systems involved in message transmission, storage, transformation, or delivery.

Figure 15C:
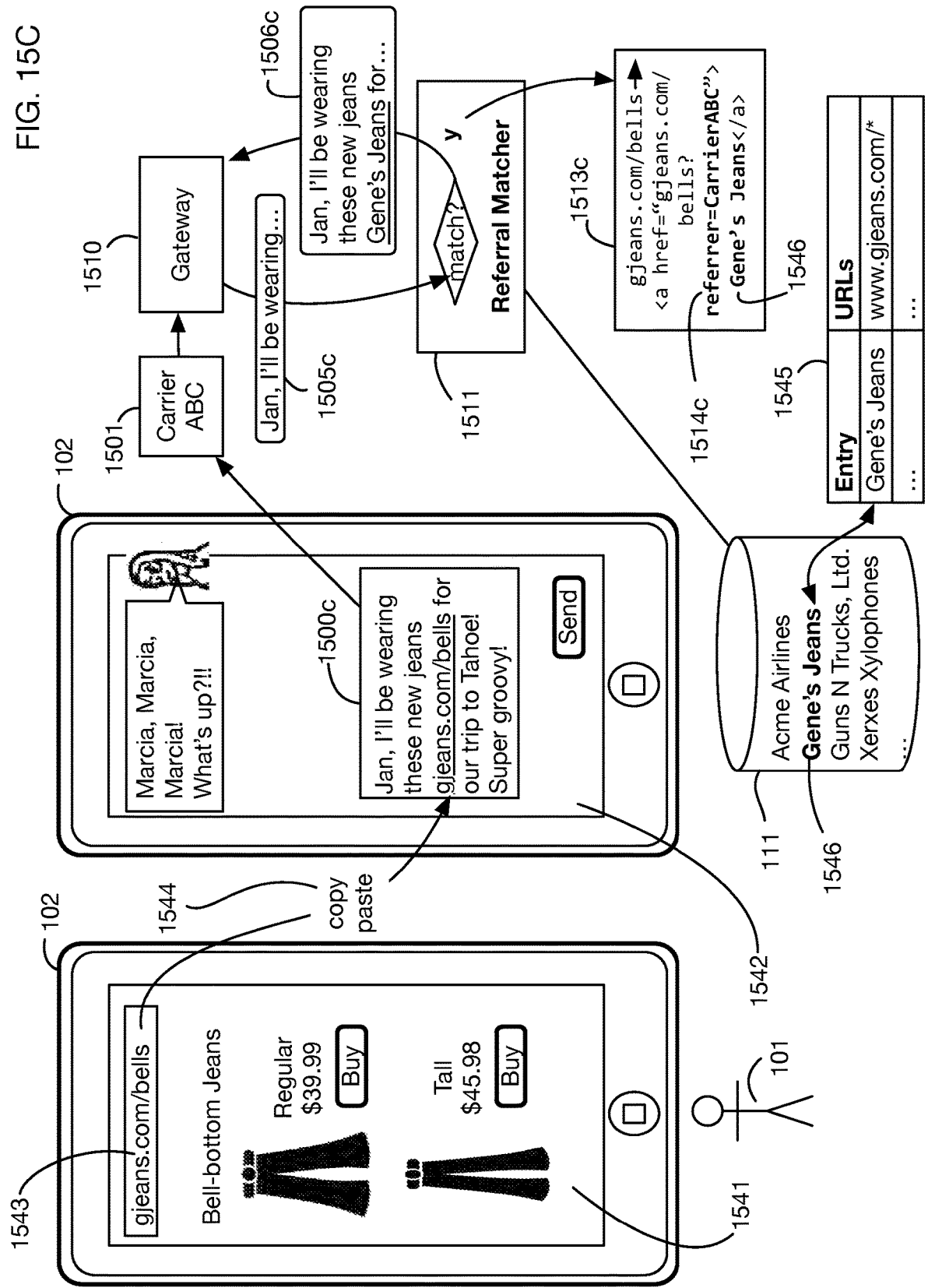
FIG. 15C shows another variation of the embodiment of FIG. 15, where a sender copies a URL into a message, and the referral matcher identifies an entry in the referral database that matches this URL.

Instead of or in addition to generating a link based on references to database entries found in messages, one or more embodiments may transform messages in the opposite sense, and may recognize database entries based on links a user has placed messages. FIG. 15C shows an illustrative example of this process. User 101 initially views screen 1541 on mobile device 102, which may be for example a web browser screen. The user views a web page or similar resource with URL or other identifier 1543, and decides to send this link to one or more recipients in a message. User 101 therefore performs a copy and paste 1544 and inserts the link into message 1500c in screen 1542, which may be for example a messaging app. The message is sent via carrier 1501 and gateway 1510, as described with respect to FIG. 15, and the message content 1505c is transmitted to the referral matcher 1511. In this embodiment, database 111 includes or references a table or other data structure 1545 that associates URLs or similar links with database entries. The referral matcher therefore identifies that the URL 1543 in message body 1505c corresponds to entry 1546. As a result of this match, it makes the transformation 1513c to convert the reference to a hyperlink that identifies the entry 1546 and credits the communications intermediary with an embedded referral code 1514c. One or more embodiments may in addition or instead insert an embedded referral code that references the sender, receiver, or any other entity.

In one or more embodiments, the transformed communication may include or may consist of instructions for modifications to the message that may be executed at a later stage in the path of the message to the receiver. FIG. 15D shows an illustrative embodiment with a variation on the process flow of FIG. 15, where the initial message transformation generates transformation instructions to add a link to the message, and the message body is modified afterwards based on those transformation instructions. As in FIG. 15, message 1500 is transmitted to communications intermediary 1501, which forwards it to gateway 1510. The body 1505 of the message is processed by referral matcher 1511, which finds a match and determines that a replacement 1513 of a term by a link is indicated. However, the referral matcher in this embodiment does not make the replacement directly; instead it returns transformation instructions 1513a to the gateway 1510. The gateway sends these instructions 1513a to the communications intermediary 1501, which executes the transformation instructions to generate the transformed message 1506. In one or more embodiments, the replacement or augmentation of a portion of a message with a link may be performed at any stage in the transmission of the message from the sender to the receiver; the referral matcher may execute this replacement or augmentation, or it may provide instructions that any later stage or stages may perform to effect the replacement or augmentation of the message.

FIG. 16 continues the example of FIG. 15 to show the referral link being used by a receiver of a communication. If receiver 121 clicks on the link 124, the link directs to site 201a, with an embedded referral tracking code in the URL. If the receiver then performs an action such as a purchase by pressing the button 203, the merchant 212 may transmit a notification 1601 of the transaction to referral tracker 1602. The referral tracker 1602 may be integrated with the referral matcher, or it may be a separate system. The notification 1601 may include the referral tracking code, so that the referral tracker can calculate a credit 211a and record or transmit this credit to the appropriate entity 1501, which in this example is the carrier. For the scenario illustrated in FIG. 15A, credits may be provided to both a communication intermediary and to the sender of the message. For the scenario illustrated in FIG. 15B, credits may be provided to both the communications intermediary associated with the receiver, and to the receiver of the message.

Figure 17:
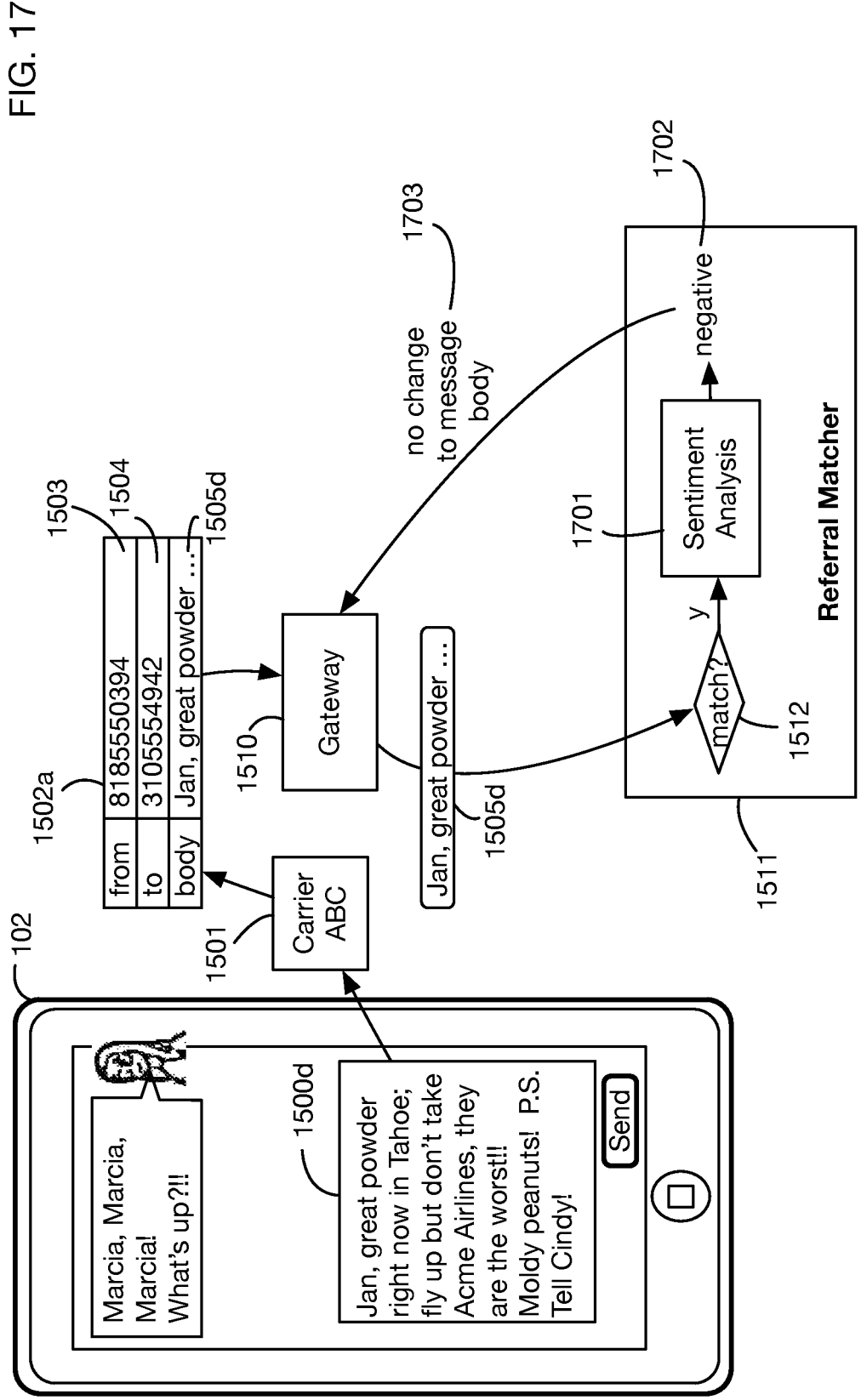
FIG. 17 shows an illustrative embodiment that performs sentiment analysis on a message to avoid adding a link to a target that the message refers to negatively.

In one or more embodiments, the referral matcher 1511 may perform additional analysis of the body of a communication to determine whether the context of the match indicates that adding a referral link is warranted. FIG. 17 shows an example where message 1500d mentions a merchant, but in a negative sense. The referral matcher 1511 may first perform matching search 1512 on message body 1505d to determine that the merchant is mentioned or otherwise matches the communication body, and then perform sentiment analysis 1701 to determine whether the mention is positive, neutral, or negative for example. Sentiment analysis 1701 may use any of the techniques known in the art to determine the sentiment associated with a message. For example, sentiment analysis 1701 may track the usage of positive or negative words, particularly if they are in proximity to the located matching work or phrase. In this example, sentiment analysis determines that the sentiment 1702 is negative; therefore, the referral matcher returns an indication 1703 to the gateway that it has not added a referral link.

Figure 17A:
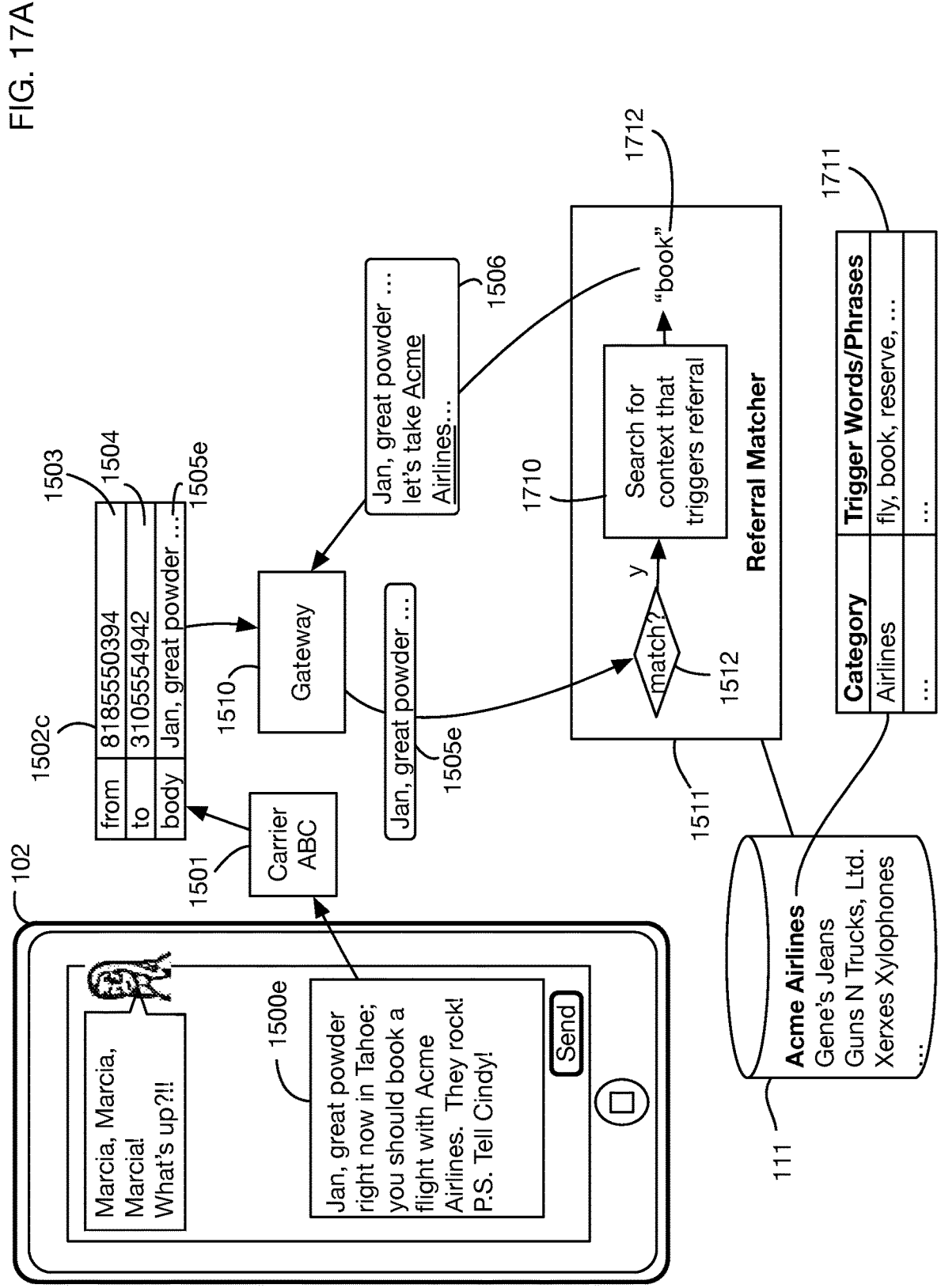
FIG. 17A shows an illustrative embodiment that analyzes the context of a matching item, such as nearby words or phrases, to determine whether to a referral link.

In one or more embodiments, the referral matcher may analyze the body of a communication to determine whether a database entry is referenced in or with a context that indicates that a referral link is appropriate. The required context may for example include certain trigger words or trigger phrases that must appear in proximity to the mention of the item in order to generate a referral link. This situation is illustrated in FIG. 17A. Referral database 111 contains or references a set of trigger words or phrases 1711 associated with entries in the database or with categories of entries. Message 1500e is sent from device 102, and corresponding message body is transmitted to referral matcher 1511. The matching step 1512 indicates that an item from database 111 occurs in the message body. The subsequent step 1710 searches the message body 1505e for additional context that may be required to generate a referral. For the matched item, the trigger word 1712 from table 1711 appears in the message body 1505e in a position that is near the matched item; therefore, the referral link is inserted into transformed message body 1506. If no trigger word or phrase were located, then the existence of the positive match from the initial matching step 1512 may not be sufficient to generate a referral link in this illustrative example.

In one or more embodiments, the closeness of a match needed between the text of a communication body and a listing in the database may be a configurable parameter that may be set for example by the gateway or by a communication intermediary. FIG. 18 shows an illustrative embodiment with three levels of "closeness of match" defined. These levels are illustrated in table 1805 for entry 1810 of database 111. The most specific type of match is "exact," which requires that specific words or phrases describing the particular merchant, brand, or similar item be present in the body of a communication. The next, less specific type of match is "category," which is a grouping of a generic class of products or services into which the associated listing belongs. The least specific type of match is "activity," which describes activities for which the associated listing is related. These groupings are illustrative; one or more embodiments may use any type of hierarchy or other organization of matching levels. The gateway 1510 (or other entity) may set a closeness-of-match parameter 1801 from among these three levels to control how the referral matcher 1511 operates. In the example of FIG. 18, if parameter 1801 is value 1803a (exact), then the matcher indicates no match 1804a, since the words associated with exact match do not appear in the message; however if parameter 1801 is either 1803b (category) or 1803c (activity), then the referral matcher does find a positive match. For message 1500f with message body 1505f, the referral matcher may for example insert a referral link to listing 1810 around the category word "flight" in transformed message body 1506f.

Figure 18A:
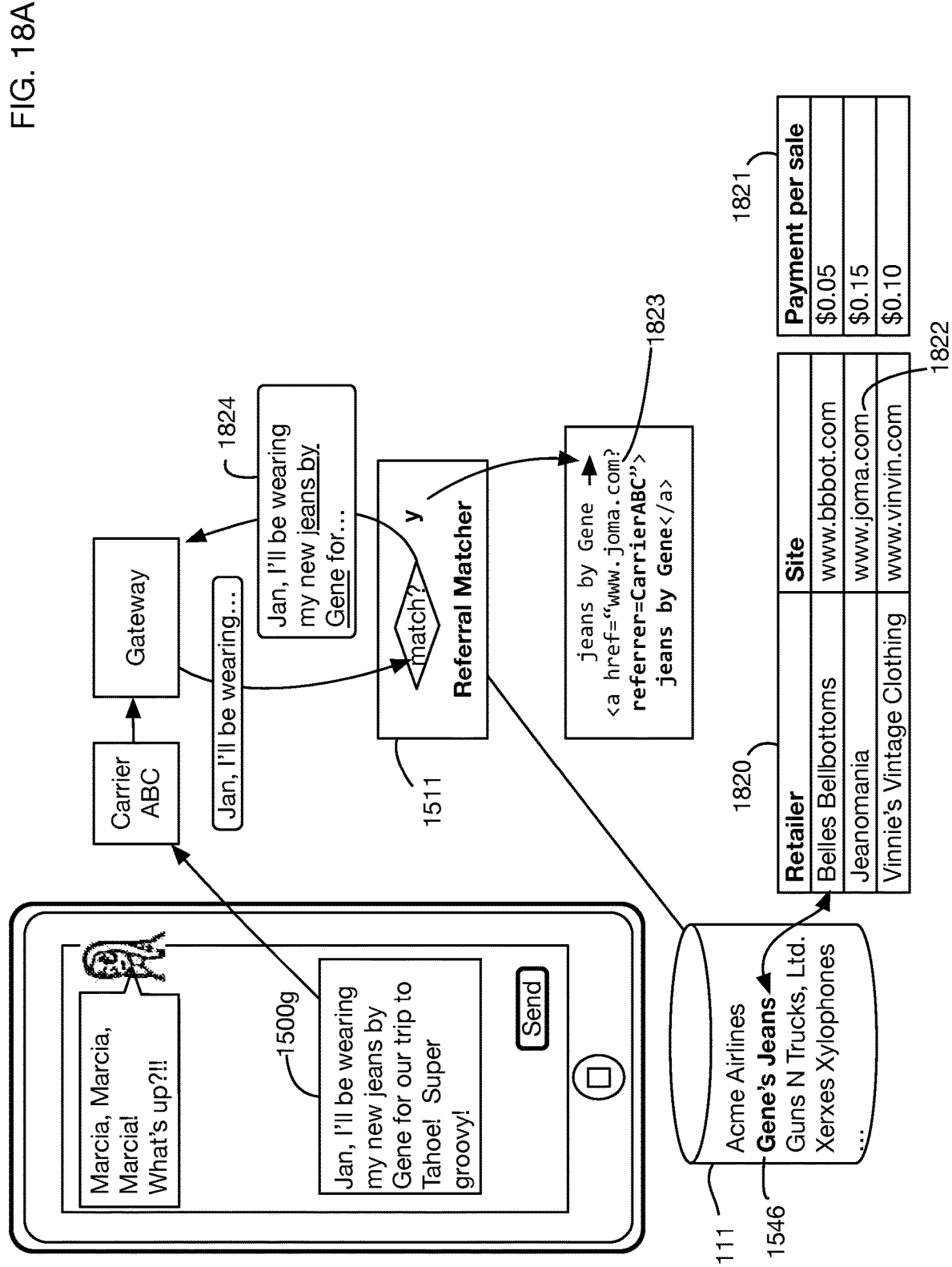
FIG. 18A shows an illustrative embodiment with multiple sites that match a database listing; the referral matcher selects a specific site from the multiple options based on performance metrics such as the reimbursement for a successful referral.

Particularly for non-exact matches, a referral matcher may in some scenarios identify multiple listings in database 111 that match a communication body, even for the same word or phrase. In these situations, the referral matcher may select from among the multiple matches, using for example prioritization processes as described above based on factors such as conversion rates, payout rates, or seller reliability. In some situations, a listing in database 111 may be associated with multiple sites, and generation of a referral link may include selection of a specific site from these multiple sites. FIG. 18A shows an illustrative embodiment with listing 1546 in database 111 associated with multiple sites 1820. In this example, listing 1546 is a brand, and the sites 1820 associated with the list correspond to retailers that offer this brand for purchase. One or more embodiments may associate multiple sites with a database listing in any desired manner. Referral matcher 1511 may select a specific site from the sites 1820, and may insert a link to that selected site into the transformed communication. This selection may be based on any criterion or criteria, as described above. In the example shown in FIG. 18A, data 1821 associated with each site is available to the referral matcher (either in database 111 or as another data source accessible to the referral matcher). This data shows the amount of referral fee each retailer pays for a completed transaction resulting from a recipient clicking on a referral link and completing a purchase. In this example, the site 1822 with the highest payment per sale is selected and is inserted as link 1823 into transformed message 1824. Any performance metric in addition to or instead of payment data may be used to select a specific site from multiple sites associated with a listing in one or more embodiments. Illustrative performance metrics associated with a site that may be used in one or more embodiments include for example, without limitation, the amount of referral credit provided by the site, the price of items on the site, the closeness of match of the site to the communication, the transaction conversion rate of the site, a defined set of business logic associated with the site, closeness of match of the site to characteristics of the sender or receiver, proximity of the location of the site to the sender location or receiver location, speed of fulfillment by the site, and a review score, popularity score, or rating score associated with the site.

In one or more embodiments, the selection of a specific site from multiple matching sites may be performed after a recipient clicks on a referral link, as described for example above with respect to FIG. 8A. The referral link may send a recipient to an intermediate server, which then accesses data such as a list of possible destination sites 1820 and metrics 1821 associated with each site in order to select a final destination site.

Figure 19:
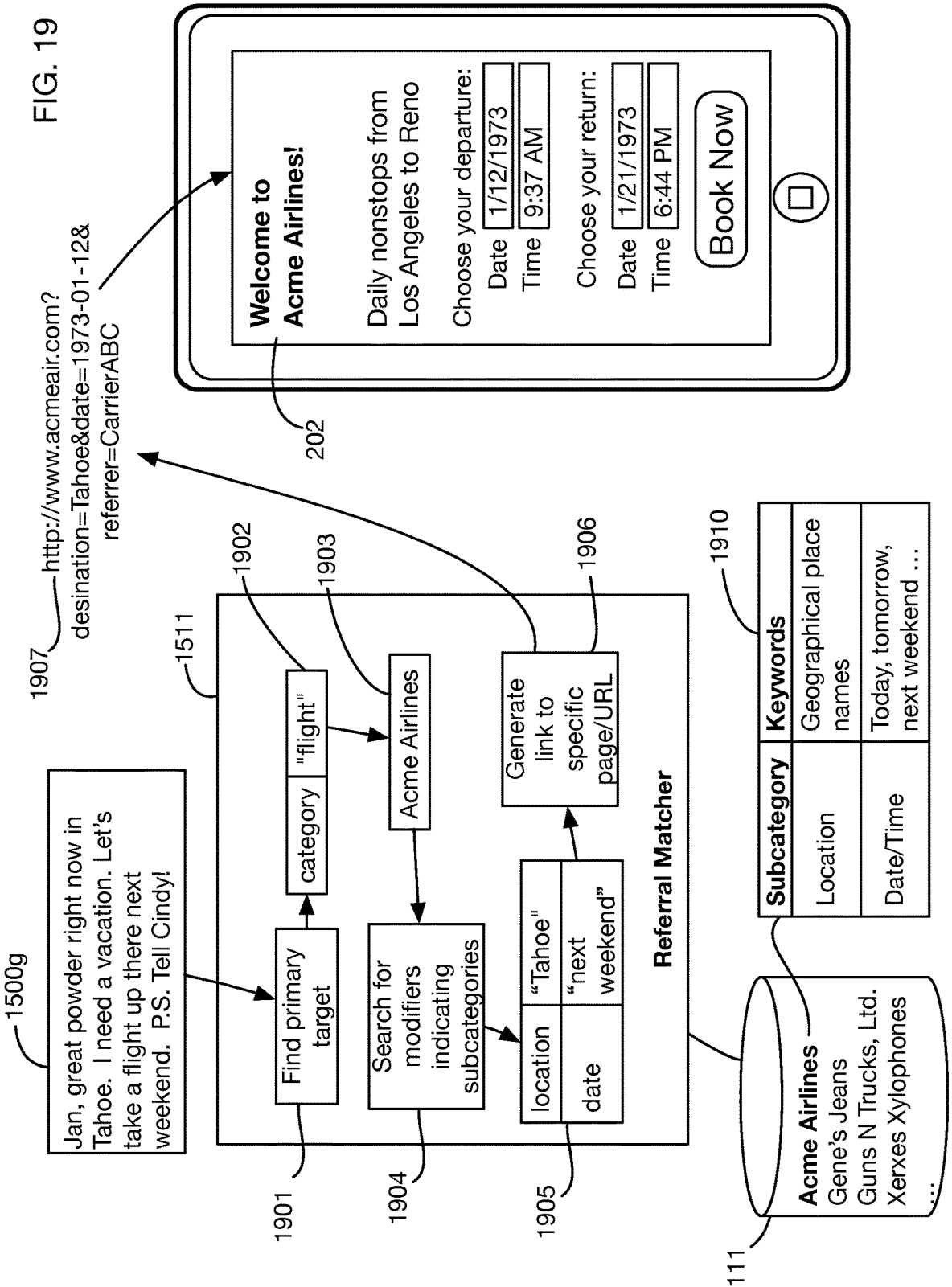
FIG. 19 illustrates an embodiment that searches a message for subcategory information related to a primary target in order to generate a more specific referral link.

In one or more embodiments, language processing or other analysis of the body of a communication may allow the referral matcher to generate a more specific link that incorporates additional information from the communication. FIG. 19 shows an illustrative embodiment in which listings in the database 111 may be associated with subcategory information that may be used to identify a more specific page on a site or specific parameters in a referral link URL. The type of subcategory information that is relevant may in general vary among listings in the database 111. For example, for clothing brands, relevant subcategory information may include data such as size, style, or color; for air travel, on the other hand, relevant subcategory information may include data such as departure, destination, date, and time. In the example shown in FIG. 19, referral matcher 1511 first performs a search 1901 for a primary target match between the body of message 1500g and listings in database 111. The result is a category match 1902 that is associated with listing 1903. Database 111 contains a table 1910 of subcategory information linked to this listing, which indicates that location and date/time information may be relevant to a referral link for this entry. This data is used in a subsequent search 1904 for modifiers in the message body that may indicate the subcategories of flights that are relevant. This search may look for certain keywords or categories of words or phrases, such as those identified in table 1910, or it may use any other type of natural language processing or artificial intelligence to infer modifiers and context. The search results 1905 may be used in link generation process 1906, which generates referral link 1907. This link 1907 passes the location data and date/time data (which the system may convert from the generic "next weekend" to a specific date) to the target site as URL parameters. One or more embodiments may use subcategory data to refine a referral link in any desired manner, including for example linking to a specific page on a site, linking to one of several related sites, or passing data to a web page in URL parameters.

One or more embodiments may analyze message histories in addition to individual messages to generate referral links. For example, the content of message 1500g of FIG. 19 may be spread over two or more messages, and the system may analyze the combined content of these messages to determine whether a referral link should be added and possibly to determine the specific target of the link. For instance, a first message may contain the first sentence of message 1500g, which indicates the destination. A subsequent message may contain the remainder of message 1500g, which indicates the date. The system may track the message history to generate the specific referral link 1907, which combines the location data from a previous message with the date information from a subsequent message.

Figure 20:
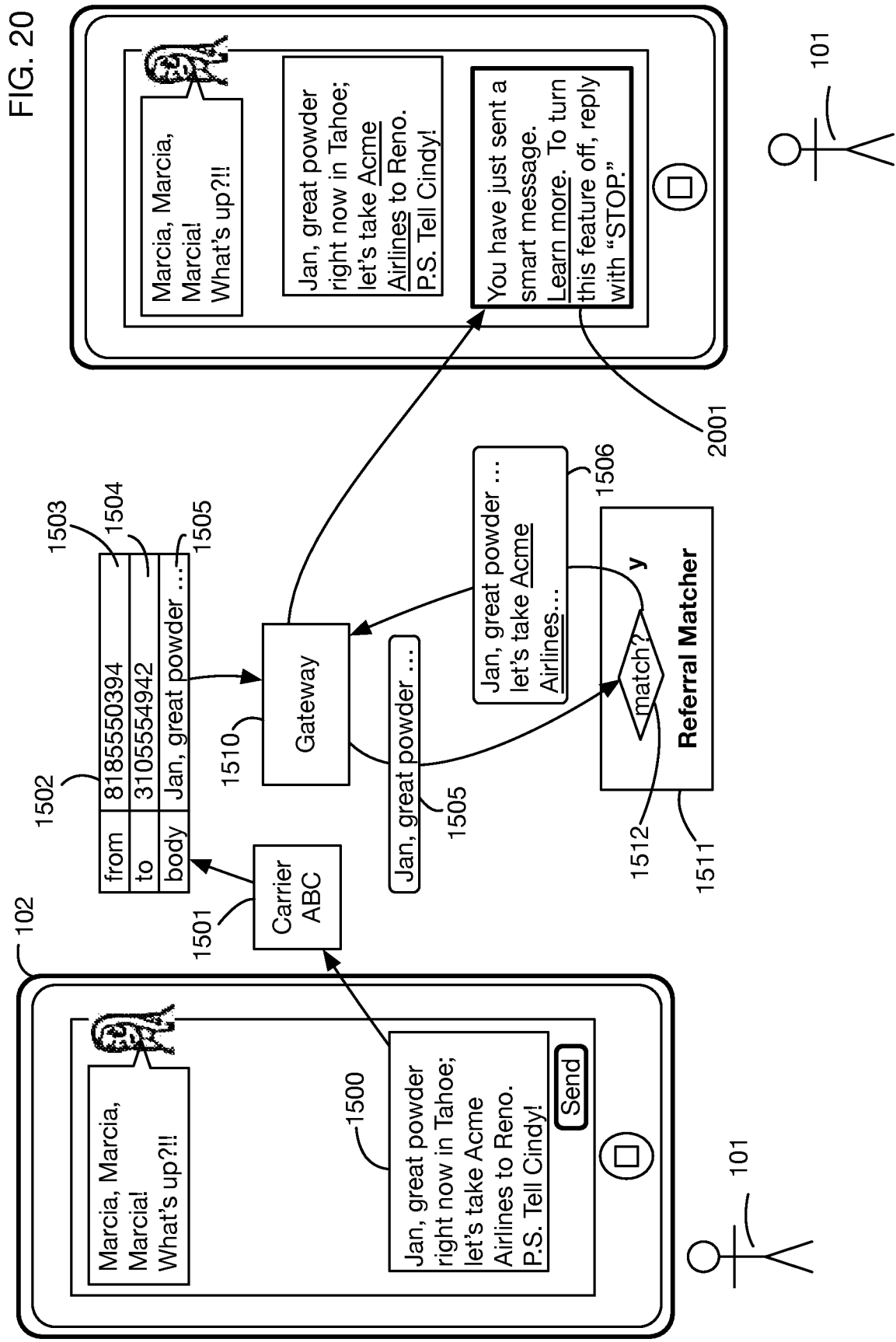
FIG. 20 shows an illustrative embodiment that lets a sender opt-out of having referral links added by a communication intermediary.

In one or more embodiments, senders or receivers of messages may be able to opt-out of the link insertion process performed by a communication intermediary or gateway. This feature is illustrated in FIG. 20, which illustrates a variation on the example of FIG. 15. In this example, the gateway 1510 passes the message body 1505 to referral matcher 1511 and receives a transformed body 1506 with an inserted referral link. The gateway (or the carrier 1501) recognizes that this message is the first message from the sender 101 for which a referral link has been generated. Therefore, it generates a message 2001 to the sender that informs the sender that the sender's message has been automatically converted to a "smart message" with an embedded link. The sender has the option of learning more about the process, and of opting out of having links added to messages from this sender. If the sender chooses to opt out, the gateway 1510 or the carrier 1501 may track this information and may refrain from sending future messages from this sender to the referral matcher 1511. One or more embodiments may provide a similar opt-out capability for the receiver. One or more embodiments may instead require the sender or receiver to opt in to the referral link process before generating these links. In addition to or instead of opting in or opting out, in one or more embodiments the sender or receiver may be able to send any other types of communication preferences messages to the referral matcher or to any of the communications intermediaries. Communications preferences messages may for example modify the frequency with which referral links are inserted, or the manner in which the referral links are inserted, displayed, or used. For example, a recipient may request that referral links be inserted only from selected senders, only for selected topics, or only at specific times. A recipient may request that referral links be highlighted in messages as referral links, to distinguish them from other links that may already be in messages, or that referral links be displayed only at certain times or under certain conditions. A sender may similarly request for example that referral links be inserted only for selected recipients, only at a certain frequency, or only for certain topics.

One or more embodiments may process images, and may generate referral links based on analysis of these images. Images may be obtained for example from any digital communication, such as an email, text message, or social media post. As described above, processing of images and generation of referral links may occur at any node or nodes in a communication link between a sender and a receiver, including for example the sender's device, the receiver's device, a messaging gateway, a communications server, or any combination thereof. Processing may occur on any device used to encrypt or decrypt all or a portion of a communication, including for example a device used by the sender to encrypt a communication or a device used by the receiver to decrypt a communication.

Figure 21:
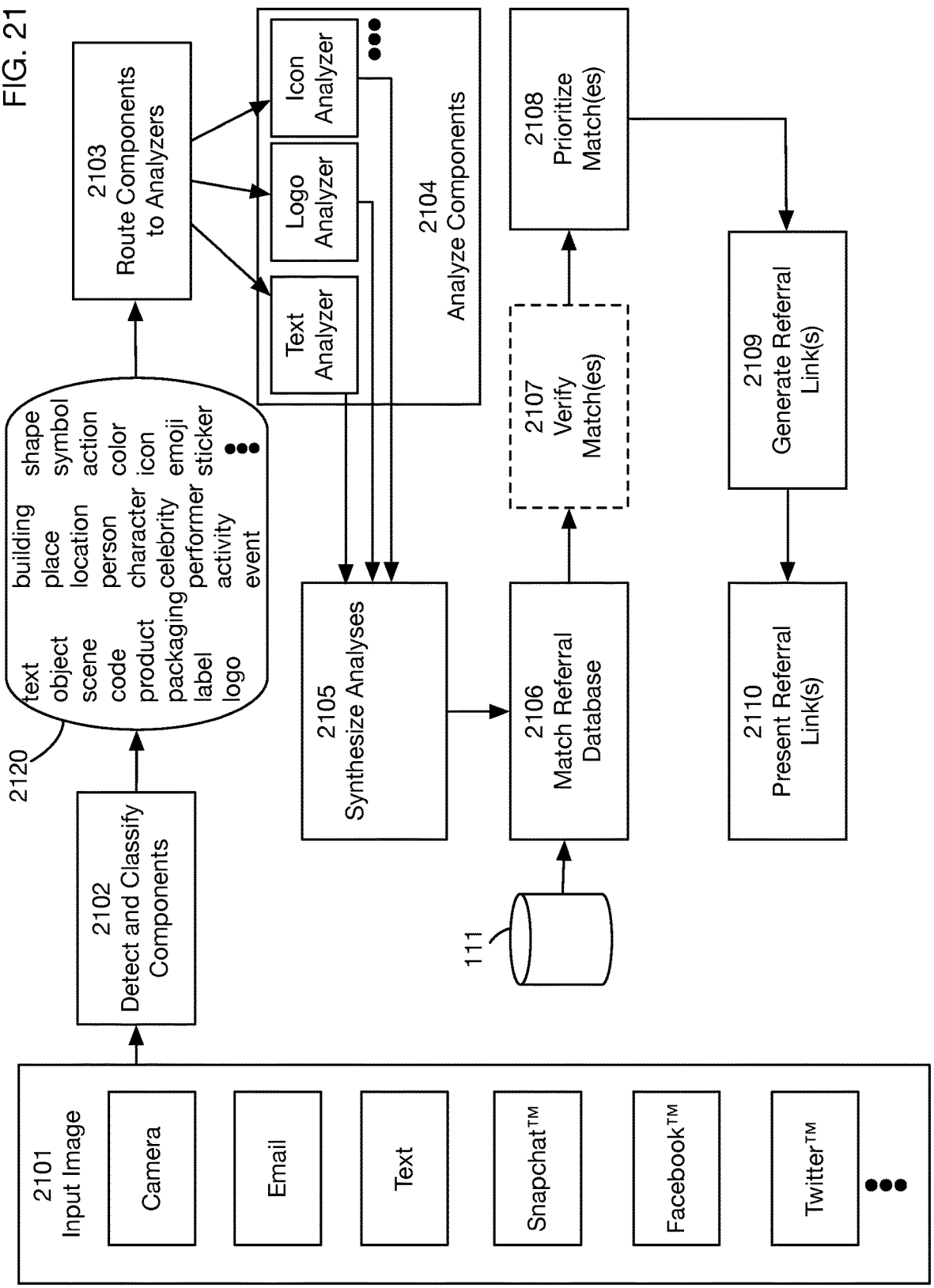
FIG. 21 shows an illustrative flowchart of steps that may be used to analyze images and generate referral links based on this analysis.

FIG. 21 shows a flowchart of illustrative steps that may be used in one or more embodiments to generate referral links from images. One or more embodiments may perform only a subset of these steps, for example omitting any of the steps in FIG. 21, and may reorder and restructure steps in any desired manner. Any of these steps shown in FIG. 21 may be performed by one or more third-party services or systems. In step 2101, an image input is obtained, for example from a digital communication or from a device or image library. Illustrative sources of images may include for example, without limitation, a camera, an email, a text message, a picture message, a video message, a Snapchat™ message, a Facebook™ message, a Twitter® message, a post on any website or blog, or a gallery from a photo sharing or photo archiving site. Images may also be obtained from videos associated with any of these sources. Images may be for example, without limitation, photos, videos, video frames, drawings, paintings, graphics, 2D models, 3D models, screenshots, barcodes, QR codes, icons, emoticons, avatars, or virtual reality scenes or characters. In step 2102, the components of an image are detected and classified. Components 2120 may include for example, without limitation, any or all of text, object, scene, code (such as barcodes or QR codes or similar identifying marks), product, product packaging, label, logo, building, place, location, person, character, celebrity, performer, activity, event, shapes, symbol, action, colors, icon, emoji, and sticker. A single image may have one or more types of components. Step 2103 then routes individual components to analyzers that may for example be specialized to analyze a specific type or types of component. For each component type there may be a distinct extraction method. The routing methodology may split the image into its components and may route each component to a corresponding analysis method. In one or more embodiments, different component analyzers may execute on different systems, and routing may be performed over network connections. Step 2104 then analyzes the components of the input image, using for example individual analyzers such as a text analyzer, a logo analyzer, an icon analyzer, etc. Depending on the component type, extraction of the component from the image and analysis of the extracted component may include various types of processing. For example, for text components, analysis may recognize the letters, words, or phrases in a component. Text analysis may process or transform the orientation, font size, font type, boundary, decoration, and color; it may de-noise and de-warp the extracted component. For image components, analysis may identify the object or objects contained in an image component. Image processing may include for example de-noising, de-warping, boundary detection, logo analysis, analysis of orientation, shape, and color, and reverse image lookup. For codes (such as barcodes or QR codes), the codes may be extracted and decoded, or they may bypass extraction and skip to the synthesis or matching steps described below.

Results of the component analyzers from analysis step or steps 2104 may then be transmitted to step 2105 that synthesizes the various analyses. The synthesis stage 2105 may for example determine relationships among the extracted component data, and reconstruct the extracted and analyzed components of the images. The extracted component data may be synthesized into a text descriptor of the image, which may include for example a list of keywords or key phrases, a hierarchically structured descriptor of the image components, or a summary sentence or phrase that describes the image and its components. The result of synthesis 2105 is then transmitted to referral matching step 2106, which searches referral database 111 for one or more matches, as described above. After matching against an item in the referral database, an optional verification step 2107 may verify the match or matches, for example by comparing the original image input to an image of the item that it has matched against in the referral database 111. This verification step 2107 may be optional in one or more embodiments. It may not be performed at all in one or more embodiments, and in one or more embodiments it may be performed only in certain situations. Verify match step 2107 may for example generate a confidence score based on how closely the original input image matches an image of the matched item or items. This confidence score may provide a measure of how close the match is. In embodiments that perform optional verification step 2107, the system may set a threshold for the confidence score, and may proceed with generating a referral link for the input image only if the confidence score is above the threshold. The confidence score and threshold may not be used in embodiments that do not perform optional verification step 2107.

If matching step 2106 generates multiple matches against referral database 111, then a prioritization step 2108 may be performed to select one or more of these matches for referral links. This prioritization may use any information from the component analyses 2104 and any information from the referral database 111 to prioritize matches. For example, as described above, merchants may be prioritized based on factors such as the size or amount of the referral credit associated with each merchant, the location of the merchant, the availability of inventory, speed of fulfillment of orders, ratings or reviews related to the merchant, or the price of the product or service offered by the merchant. If verification step 2107 is performed, then the confidence score generated for each match may also be used for prioritization; for example, the match with the top confidence score may be selected, or all matches with a confidence score above a threshold may be selected. One or more embodiments may use any desired method to prioritize matches and to select which match or matches to use for referral links.

Step 2109 then generates one or more referral links, as described above. Each referral link is trackable, and may include for example the identity of one or more of the matched item, the sender, the receiver, a messaging intermediary, or a gateway. In step 2110, the referral link or links are presented by modifying or augmenting a message or communication that is displayed to a recipient. For example, presentation step 2110 may construct and transmit markup instructions to whatever system or systems are responsible for formatting or displaying a message. Formatting transformations may occur for example at the sending device, at the receiving device, at the messaging gateway, at a messaging intermediary, at a communications server, in any application or software, or using any combinations thereof. The message body may be formatted in one or more ways to incorporate the trackable referral link. For example, the image in the message may be made clickable or interactive, or one or more elements may be placed adjacent to or over the image. Added elements may include for example a URL, a link, a token, a sticker, a button, an image, a product name, or a product description. One or more embodiments may present a referral link by transmitting an additional message with any of the above elements included.

Figure 22:
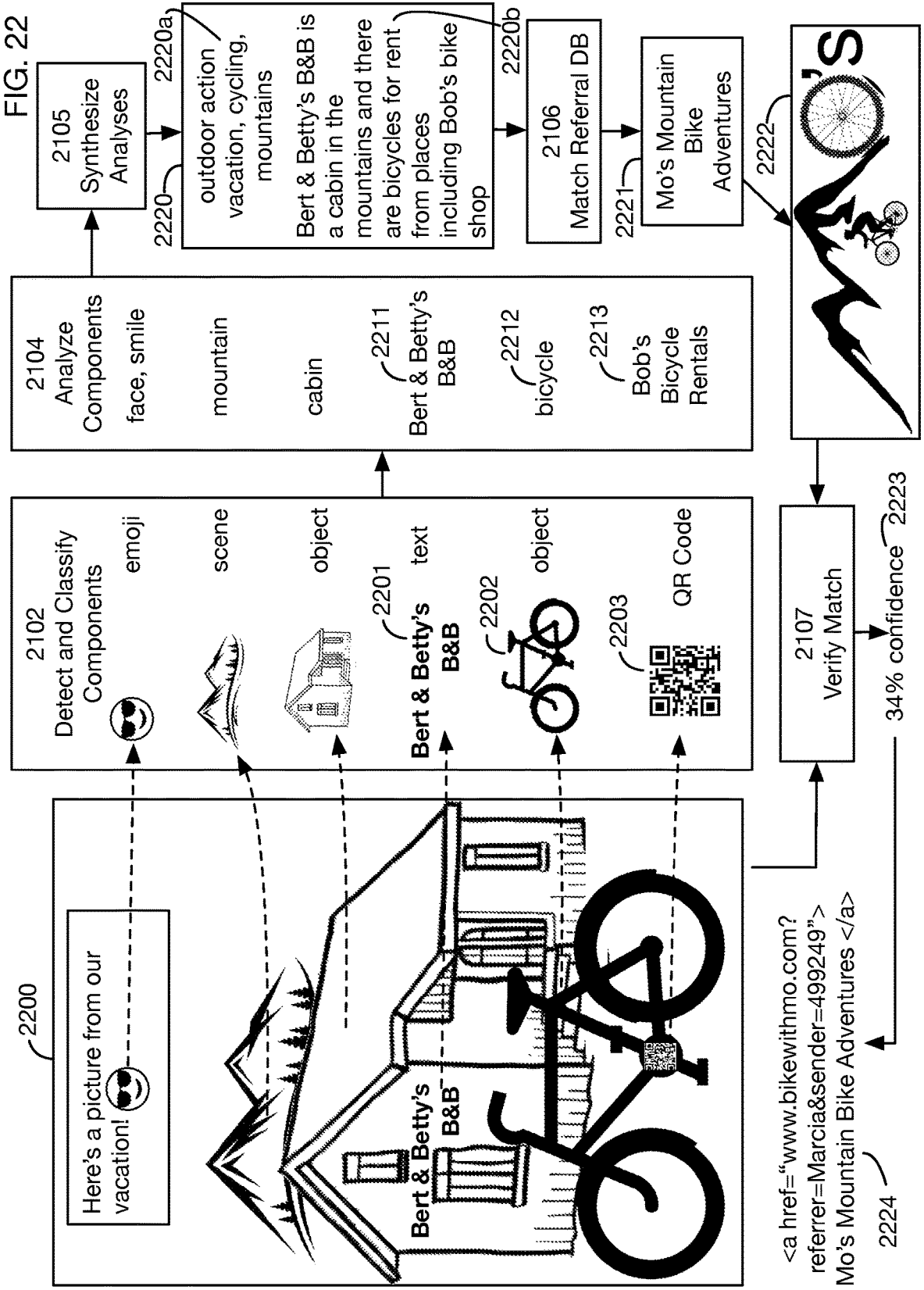
FIG. 22 shows analysis of an illustrative image and generation of a referral link for this image.

FIG. 22 shows selected processing steps applied to an illustrative image 2200. This image 2200 may for example be sent from a sender to a receiver in a message, or shared between a sender and a receiver. In step 2102, individual components of the image are detected and classified. For example, this step may identify a text component 2201, an object 2202, and a QR code 2203 attached to an item in the image. Analysis step 2104, which may occur on various systems using analyzers appropriate for each component type. Each analysis may for example generate a list of keywords or phrases associated with the components. Text 2211 may be for example a direct translation of the textual content of item 2201 in the image. Keyword 2212 may be the result of applying an object recognizer (such as a neural network) to object 2202. Descriptor 2213 may result from decoding QR code 2203. In step 2105, the individual component analyses are synthesized into a descriptor 2220 of the entire image. This descriptor may include for example a list 2220*a* of keywords and phrases; in one or more embodiments it may be structured hierarchically to match for example a hierarchical decomposition of image components. The descriptor 2220 may include for example a summary sentence or phrase 2220*b* that describes the image and its major components. Step 2106 then matches descriptor 2220 against the referral database, generating a match against item 2221, such as a merchant. Verification step 2107 may for example retrieve an image 2222 associated with the matched item 2221, and compare this image 2222 to the original input image 2200. A match score 2223 may indicate how closely the two images match. In this illustrative scenario, the two images are similar because they contain some similar elements, but they are not close matches. Depending on the threshold set for the match score 2233, a referral link 2224 may be generated and added to image 2200 for display to the image recipient.

Figure 23:
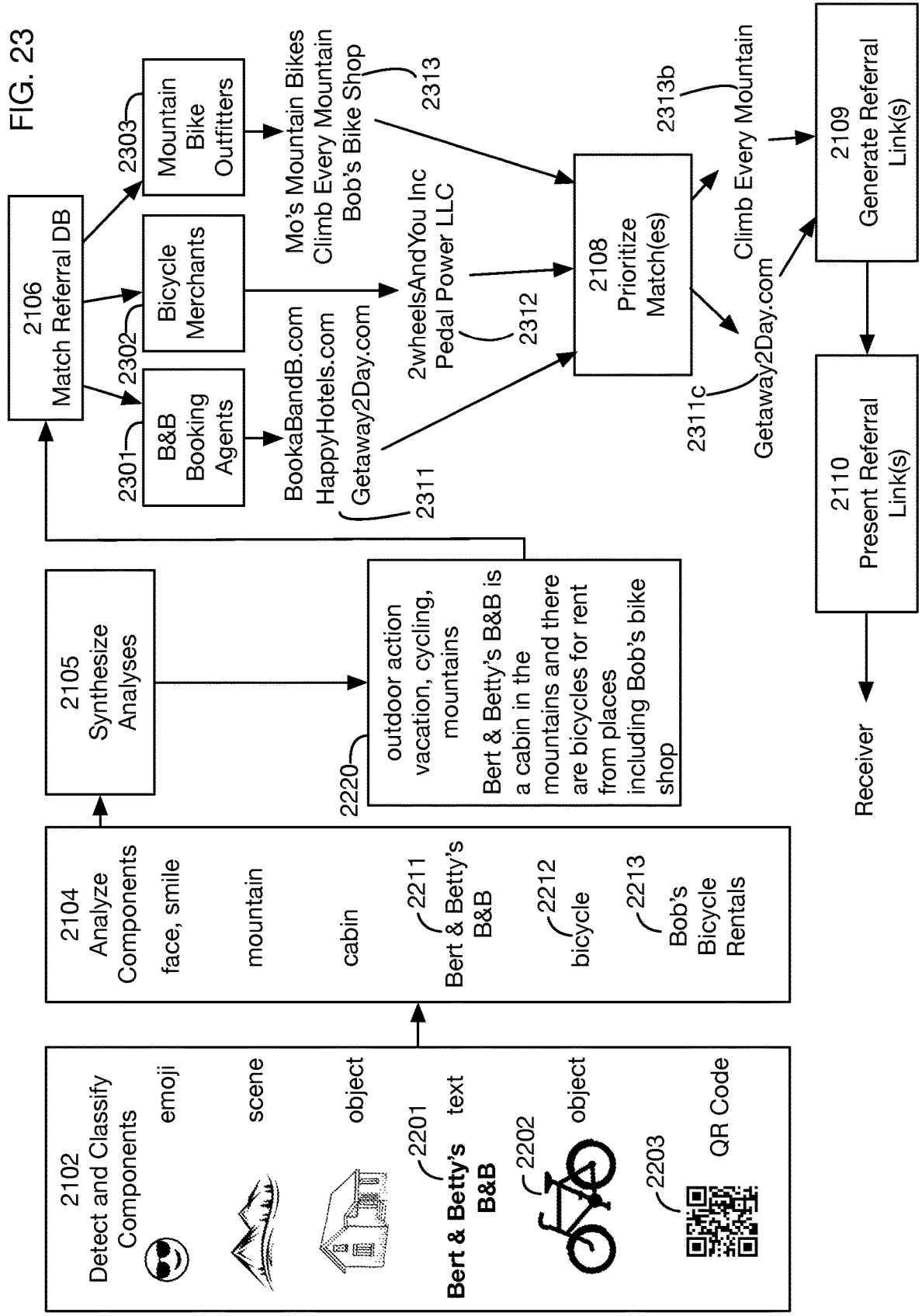
FIG. 23 shows a variation of the example of FIG. 22 where multiple items from the referral database match the image, and a prioritization and selection step is performed to determine which match or matches to use for referral links.

FIG. 23 shows a variation of the example of FIG. 22 where the match referral database step 2106 generates multiple matches for the components of the image or the image descriptor 2220. In this example, component 2201 generates matches 2311 in category 2301 of booking agents that may for example be able to reserve stays at the identified bed and breakfast 2211; component 2202 generates matches 2312 in category 2302 of sellers of the identified item 2212 (a bicycle); and component 2203 generates matches 2313 in category 2303 of rental services similar to or identical to the identified service 2213. The multiple matches 2311, 2312, and 2313 are then input into prioritization step 2108, which selects one or more matches from which to generate referral links. Prioritization and selection may be based for example on closeness of match, or on any characteristics of the matched merchant or service, as described above. In this example, two matches 2311*c* and 2313*b* are selected in step 2108, and these matches are input into step 2109 for generation of referral links, which are transmitted to step 2110 that presents the referral links to the receiver.

In one or more embodiments, the system may monitor the user interface of an application used by a user, and may present the user with sharing or earning options when content of that user interface matches an item in the referral database. FIG. 24A shows an illustrative example of user on a mobile device using a mobile browser on mobile device 102, such as for example a mobile phone or tablet. This browser application is illustrative; one or more embodiments may monitor user interface content of any application used by a user, including for example, without limitation, a messaging application, a web viewing application, a social media platform application, a merchant or e-commerce application, a search application, a shopping application, or an app provided by a website or service. In the example of FIG. 24A, the user is browsing a website at URL 2401 The referral matcher 110 may analyze the content of the user interface to obtain for example the URL 2401, as described in detail below. Content may be obtained or accepted by the referral matcher in any manner, including via analysis of user interface events, as described below. The referral matcher may also analyze other elements of the content of the browsing session, such as text 2402 or images 2403 on the web page. Content may be analyzed using any of the techniques described above, including for example, without limitation, machine learning, text parsing, image analysis, audio analysis, artificial intelligence, keyword matching, and natural language processing. The referral matcher may then compare the content to the referral database to identify one or more matches. If a match is located (for example, if the merchant associated with the URL 2401 is in the referral database), the system may then present options 2410 to the user for how to use the referral link to the matched item. In one or more embodiments the system may present these options 2410 in any desired manner; for example, it may modify the user interface of the browser to include the options 2410, or it may use operating system services to display a notification. In the embodiment shown in FIG. 24A, the referring options 2410 include two options: a "share and earn" option 2412, and a "cashback" option 2411. These options and their names are illustrative; one or more embodiments may present any number of ways to use a referral link, and may describe and present them in any desired manner. In this example, the share and earn option 2412 may be used for the user to send a referral link to one or more other users, and the cashback option 2411 may be used by the user to obtain his or her own discount or other credit from the referral link. In one or more embodiments, use of both options at once may be supported.

Figure 24B:
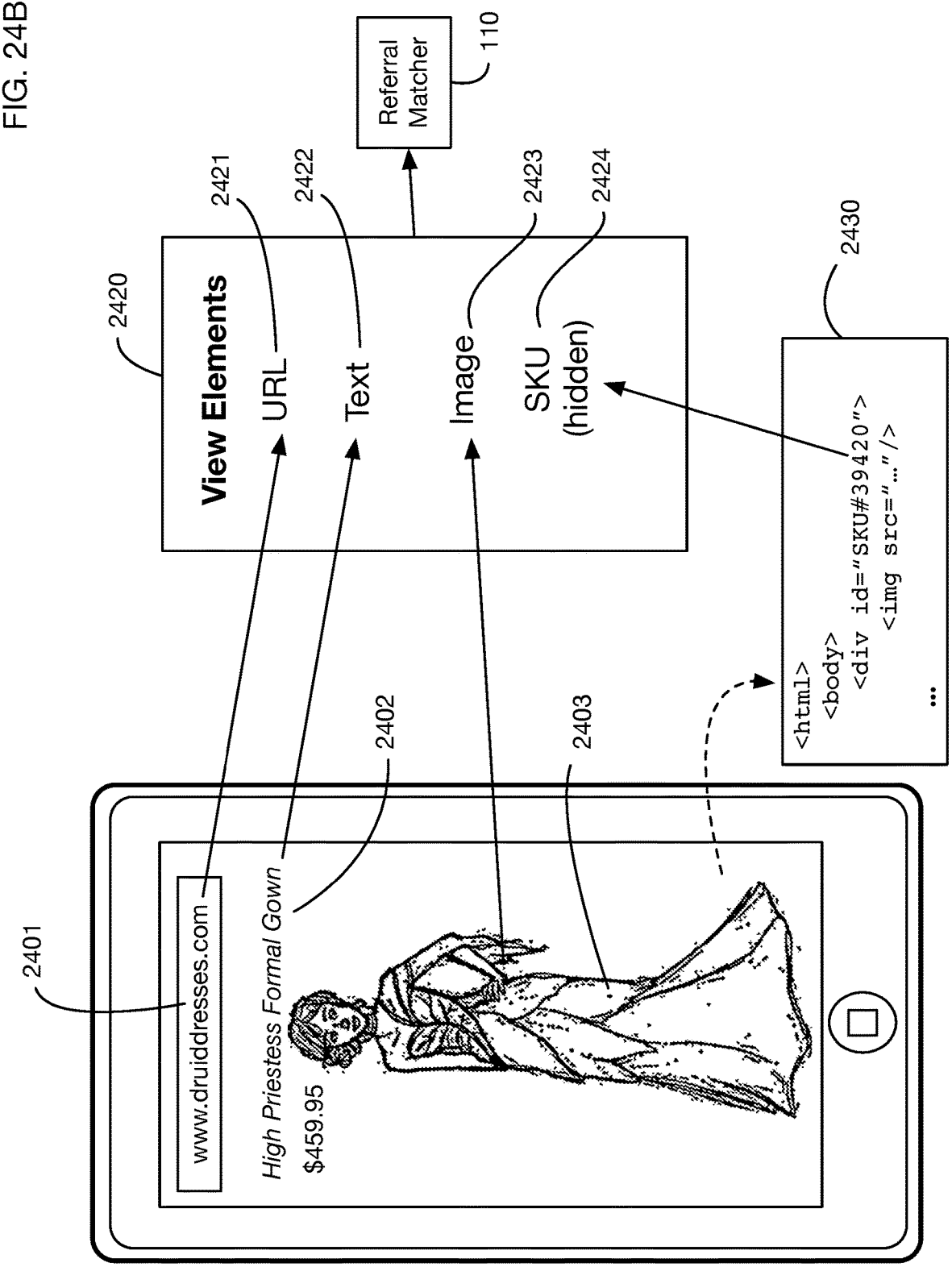
FIG. 24B shows other elements of the user interface of FIG. 24A that may be analyzed for matches to the referral database.

FIG. 24A illustrates obtaining a URL 2401 from the user interface of a browser application. One or more embodiments may analyze the user interface of any application to extract any type of content. FIG. 24B shows additional content that may for example be obtained from the user interface of the web browser screen shown in FIG. 24A. Any view elements 2420 in the user interface, including possibly hidden elements that may be machine readable but not visible to the user, may be extracted and compared by the referral matcher 110 to the referral database. In addition to URL 2421, these elements may include text elements 2422, such as text 2402, image elements 2423, such as image 2403, and hidden elements 2424 such as an SKU embedded in the raw HTML 2430 of the web page source for the browser. Other elements that may be analyzed in one or more embodiments may include for example, without limitation, icons, logos, codes, product identifiers, application identifiers, and merchant identifiers.

Figure 25:
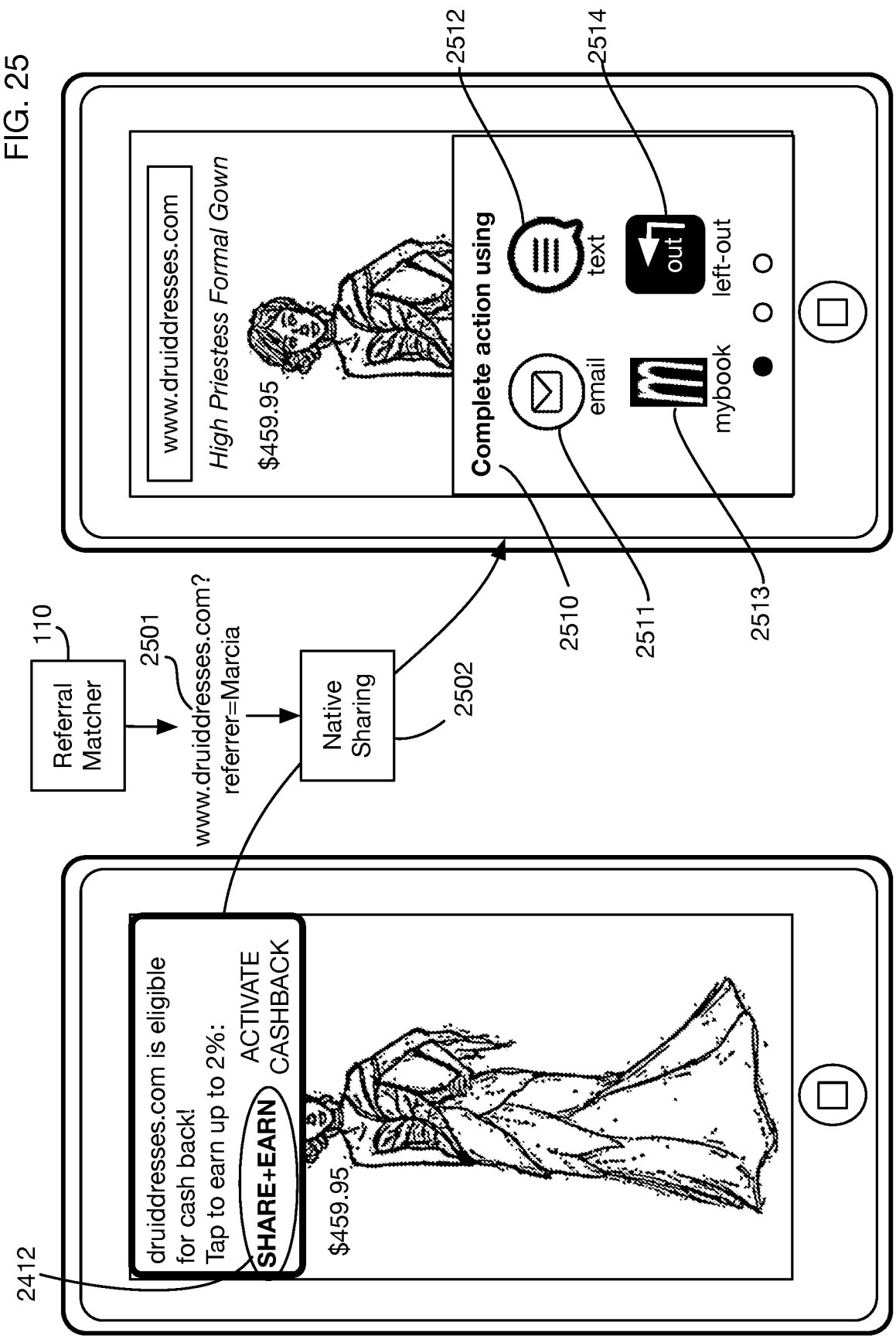
FIG. 25 continues the example of FIG. 24A to illustrate share options presented to a user when the user decides to share a web URL.

FIG. 25 continues the example of FIG. 24A to illustrate the result of the user selecting the share and earn option 2412. The referral matcher 110 generates a referral link 2501, as described above, which may include for example the URL of the site that is being referred and identifying information of the sender (or of another entity) so that the referral credit can be applied to the referrer. When the user selects share and earn, the referral matcher may invoke a native sharing service 2502, which may be supplied by a mobile operating system, for example. The referral link 2501 may be passed to the sharing service 2502 as the context to be shared. The native sharing service 2502 may then present a sharing menu 2510 to the user with options for how the link 2501 is to be shared. These options may include any types of communication or transfer services, such as for example, without limitation, email 2511, text messaging 2512, or social media services or sites such as 2513 and 2514. When the user selects a specific sharing option from this menu 2510, the associated application or service may be invoked to create a message or communication, to insert the referral ink 2501, and to select the recipient or recipients of the communication.

If the user selects the cashback option 2411, the system may transmit the referral link 2501 directly to the user's browser and refresh the page, so that the user is viewing effectively the same content but will receive a credit if the user performs the action (such as a purchase) associated with the referral. In this scenario the user is effectively making a referral to himself or herself, and may receive credit for his or her own actions as a result of this referral.

Figure 26A:
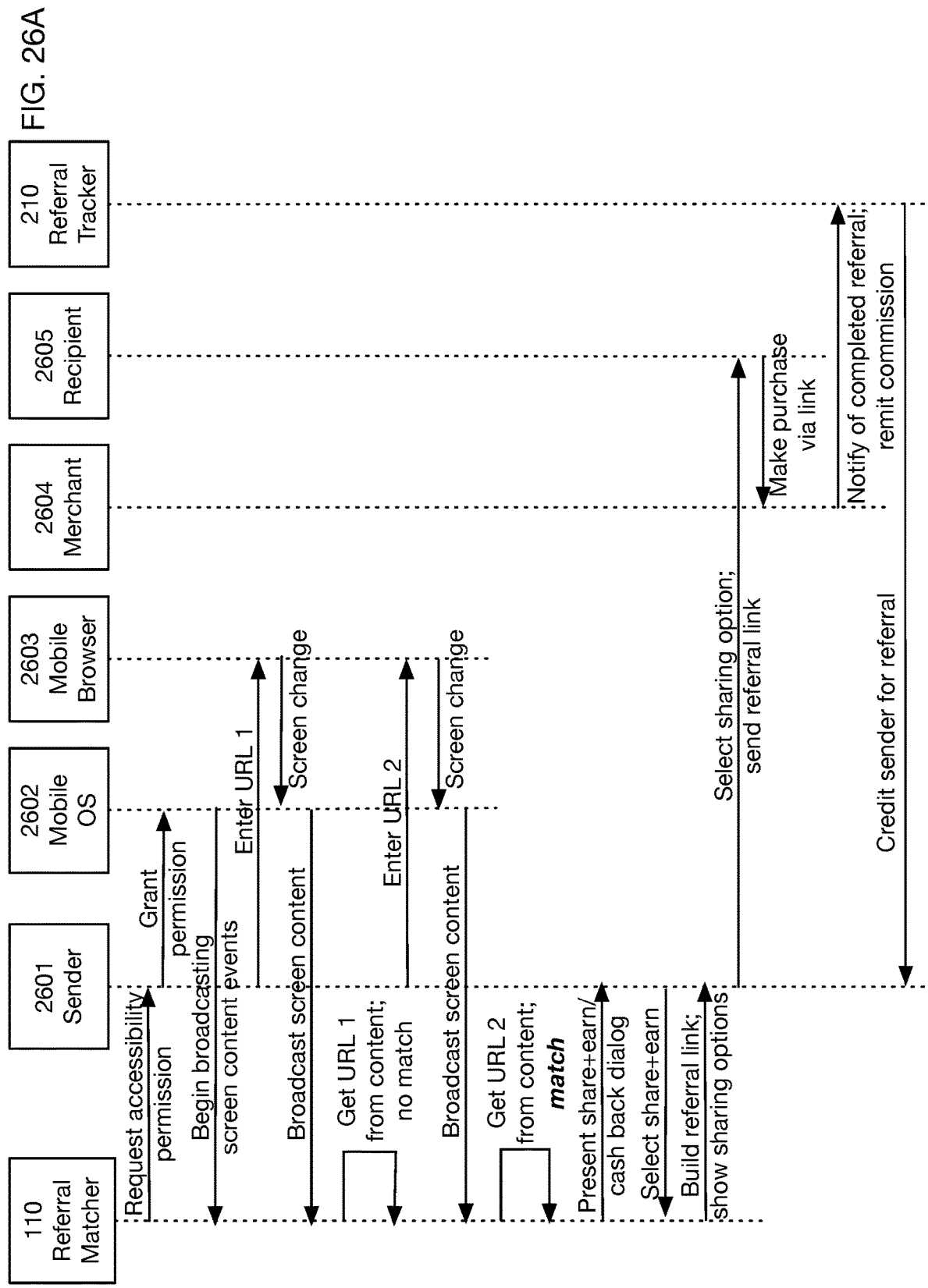
FIG. 26A shows an illustrative sequence diagram for actions that may be performed in an embodiment of the system that monitors a mobile device web browsing application.

FIG. 26A shows an illustrative sequence diagram for actions that may be performed to implement referral matching and referral tracking for a scenario such as the one shown in FIGS. 24A and 25. This sequence diagram illustrates a referral matcher that monitors a web browsing session and that generates a referral link based on the URL of the address bar of the browser. As described above, one or more embodiments may monitor the user interface of any application for any content, and may generate referral links based on this content. In this illustrative embodiment, the referral matching system may monitor the contents of the user's browsing session by subscribing to operating system events that indicate the state of the browser user interface. For example, without limitation, one or more embodiments may use "accessibility services" of an operating system that provide programmatic access to user interface elements and that may generate events when user interface elements change. In some operating systems, permission must be granted by the user for an application to access accessibility services. The referral matcher subsystem 110 therefore requests accessibility permission from the user, who is identified as the "Sender" 2601 in FIG. 26A. The Sender 2601 then grants permission to the operating system 2602, which in this example may be a Mobile operating system such as Android® for a smart phone. The Mobile OS 2602 then begins broadcasting screen content events to the referral matcher 110. These events may be for example Accessibility Events on Android®, or similar events in other environments that notify the referral matcher of user interface changes.

During a web browsing session using Mobile Browser 2603, the Sender (user) 2601 enters a first URL, for example into the address bar of the browser, to browse the associated web page. This triggers a screen change as the Mobile Browser 2603 invokes display services of the Mobile OS 2602. The Mobile OS 2602 then transmits events with the screen content changes to the referral matcher 110, since the referral matcher has previously subscribed to receive these notifications. As the referral matcher 110 receives these events, it analyzes the events (as described below with respect to FIG. 27) to obtain the URL of the web page being browsed. In this example, the initial URL is not a match for any listing in the referral database, so the referral matcher takes no further action.

The Sender 2601 then enters a second URL to browse a different web page. Again this triggers a screen change, which generates new events with the updated screen content.

Again the referral matcher analyzes the events to obtain the new URL, and it determines that this second URL is a match to one or more listings in the referral database. The referral matcher 110 then presents a referral options dialog (such as the dialog 2410 of FIG. 24A, with share and earn and cashback options) to Sender 2601. If the Sender 2601 selects a share and earn option, the referral matcher 110 constructs a referral link and presents a sharing options dialog (such as menu 2510 of FIG. 26A) to the Sender. The Sender then selects a sharing option and one or more recipients, which results a transmission of the referral link to a Recipient 2605. If the Recipient 2605 then performs an action (such as a purchase) via the referral link, the Merchant 2604 (or other entity) that receives this action may transmit a notice to the Referral Tracker 210, indicating that the referral has been used and remitting a commission if needed. The Referral Tracker 210 may then credit the Sender 2601 for the completed referral.

The sequence of actions shown in FIG. 26A is illustrative; one or more embodiments may organize these actions differently to obtain content from a browsing session and to generate referrals from this content. For example, any method of obtaining a URL or other page content from a browser or an operating system may be used by the referral matcher. For example, in one or more embodiments, the referral matcher may use a browser extension to access this content, instead of or in addition to using operating system events that reflect user interface changes. FIG. 26B illustrates a general sequence of actions that may be used for any type of application to obtain and analyze content from the application and to generate referrals based on this content. The referral matcher 110 begins monitoring mobile content 2610 from an application, using any method including, but not limited to, monitoring of events as described in FIG. 26A. When the sender 2601 invokes mobile content on the application, the referral matcher analyzes any of this content to detect a match to the referral database. As described with respect to FIG. 26A, the referral matcher than presents a dialog to the sender with for example share and earn and cash back options. When the user selects to share and earn, the referral matcher generates and transmits a referral link, which the sender forwards to the recipient 2605. When the recipient completes an action associated with the referral link, the referral tracker provides the associated credit to the sender for the referral.

FIG. 27 shows an illustrative method for extracting the web page URL from screen content events that may be used in one or more embodiments. As described above, in one or more embodiments the referral matcher may subscribe to screen contents events using for example accessibility services on a mobile device. The mobile OS 2602 then broadcasts Accessibility Events 2701 when the user interface changes. In some operating systems (such as Android®, for example), an Accessibility Event may be associated with a view element of a user interface, such as a panel, field, image, or control. These view elements may be organized in a tree of nodes, and each event may therefore be associated with a specific node (or nodes) of this tree. In the example shown in FIG. 27, the tree 2700 of nodes corresponds to the browser user interface shown in FIG. 24A. Data associated with each node may include for example an identifier, a type, a value, and a set of actions that may be performed on the corresponding user interface element. When the user interface is changed (for example when the user browses a new URL), this tree is modified and a series of Accessibility Events is transmitted to the referral matcher corresponding to the new or updated nodes. The referral matcher may process these nodes (corresponding to user interface elements) to determine for example the URL of a web page being browsed. FIG. 27 shows a sequence of illustrative filters 2711, 2712, 2713, and 2714 that may be used to extract this URL. The first filter 2711 checks whether the type of content in a node is text. Nodes containing other types of information, such as images, are not evaluated further. The second filter 2712 checks whether the text content of a node matches a pattern for a possible URL. This pattern may be for example a regular expression. The third filter 2713 identifies the address bar node specifically by comparing the node's id (if present) to an expected id for an address bar. This filter ensures that URLs on a page that are not in the address bar are not mistaken for the web page address. The id of an address bar varies by browser; for Chrome for example the expected address bar value is com.android.chrome:id/url_bar. Some browsers do not use an id to identify the address bar, in which case the other filters are used to find the web page URL. The fourth filter 2714 is used because some address bar actions display a URL that is not the current URL of the browser. An example of this is a type-ahead dropdown that shows examples of URLs that the user may want to navigate to. These URLs would match the first three filters 2711, 2712, and 2713. However the type-ahead proposed URLs can be distinguished from the current page URL by the set of actions available on the field: for the node of the current URL, the available actions include a focus action (which moves the screen focus to the address bar input field), while the type-ahead URL nodes do not include a focus action. In this example, the result of applying these 4 filters is the URL 2401 of the current web page being browsed. The referral matcher can then match this URL 2401 against entries in the referral database.

The filters 2711 through 2714 shown in FIG. 27 are illustrative. One or more embodiments may analyze user interface elements in any desired manner to extract a web page URL or other desired content from a browsing session. For example, one or more embodiments may apply only filter 2711 to obtain all text content from a web page or other user interface, and may match all of this text content against the referral database. Similar filters may be used to obtain images or other types of content, and to match this content against the referral database. The organization of user interface elements and the data available from operating system generated events may differ across browsers and across operating systems.

As described above with respect to FIG. 24A, in one or more embodiments the system may analyze the user interface of an application to provide a user with options to activate monetization offers directly, even without sending a referral to another user. The "Activate Cashback" option 2411 in FIG. 24A for example may apply to purchases by the user. In one or more embodiments, offers that are detected by the system may be identified or applied when a user is at or near a checkout screen that requests payment; in one or more embodiments the system may also automatically select a payment method and use this to enable a user purchase. FIGS. 28 through 30 show an example of an embodiment of the invention that activates an offer and that applies a payment method, and that credits the user or an intermediary with this offer when the user completes a purchase. In FIG. 28, a user views information 2801 on an application user interface of a device 102, which may be for example a mobile device, a computer, or any other type of device with which a user may interact. The user may for example be viewing a shopping cart screen associated with an online store, or any related screen associated with a purchasing process or product search process. The user interface of device 102 contains user interface elements 2802 that are related to purchasing or purchase or payment methods. The referral matcher 110, which may be for example installed on device 102 or may receive data from device 102, may monitor and analyze the application to identify and select a monetization offer 2810 from a database of offers 2803. Each offer in database 2803 may be associated with one or more listings in database 111. This selection of an offer may for example use any of the methods and techniques described above to match against words, phrases, images, URLs, or any other contextual elements of the application. Database 111 may contain any listings of products, merchants, or other items that are associated with any types of rewards available to the user, such as discounts, promotions, bonuses, points, cashback, or any other offers. In one or more embodiments the referral matcher may compare offers associated with different listings and may select an optimal reward for the transaction. In some cases, the system may obtain feedback from the merchant regarding the value of the offer associated with a listing in database 2803. This may be accomplished for example either (a) by testing promotion/coupon codes at the checkout and seeing which code earns or saves the user the most or (b) in some cases the merchant provides feedback (such as via APIs or post-backs) some time after the transaction has been competed to confirm that value of the reward/cashback/savings.

In one or more embodiments the listings in database 111 may be associated with shopping cart descriptors. These descriptors may be used by the system to detect when a user is at or near a purchase step. For example, shopping cart descriptor 2804 is associated with listing 2805 in database 111. A shopping cart descriptor may contain any information that allows the system to recognize when a purchase or similar transaction is in process or is at a particular stage in a purchasing process; for example, a shopping cart descriptor may contain any or all of a URL, a web page element, a page title, a header, a calculation, an input field, a control, a text element, an image element.

In one or more embodiments the system may include a payment assistant 2850 that analyzes user interface elements to make a detection 2811 of payment related elements. This detection may for example detect specific configurations, characteristics, attributes, fields or components (whether or not these are visible to the user), may search for specific descriptors, specific terms or images (such as credit card names, input fields, or icons), or it may use the URL of a web page to recognize when a user is at or nearing checkout. Illustrative user interface elements 2802 provide multiple payment options from which the user can select; in one or more embodiments the application on device 102 may preselect an option or prepopulate payment options. Instead of accepting the options or prepopulated data from this application, in one or more embodiments the payment assistant 2850 may analyze a database 2821 of the user's payment methods and may make a selection 2812 of a payment method 2831 to use for this transaction.

Payment methods database 2821 may for example contain information on one or more payment methods that may be used by the user. This information may be obtained from the user directly or from other applications or services. Payment methods may include for example, without limitation, any or all of credit cards, debit cards, gift cards, digital wallets, funds transfer services, debt financing products, installment payment services, and bank accounts. Database data associated with a payment method may include for example, without limitation, any or all of an account number, a card number, an issuing or responsible institution, a username, a user email, a user address, a billing address, a shipping address, an expiration date, and a verification number. Database 2821 may contain any payment method information that may be needed to fill in or validate payment data in any application, which may include for example, without limitation, billing addresses, shipping addresses.

Payment methods database 2821 may also contain information on one or more additional benefits that may be available to the user when the user uses the associated payment method. These benefits may be distinct from the offers in the listing of database 2803. Illustrative benefits associated with payment methods may include for example, without limitation, coupons, cashback offers, discounts, promotions, savings, points offers (such as for loyalty programs), or miles offers (such as for frequent flyer programs and affiliated programs). Some benefits may be associated with specific merchants, specific products, or specific conditions such as times or quantities of purchases.

When the payment assistant 2850 detects payment related elements 2802 in an application user interface, it may analyze the payment methods database 2821 to make a selection 2831 of a specific payment method to propose to the user or to apply automatically to the associated transaction in the application. If payment methods have associated additional benefits (such as cashback deals), this analysis may compare the available benefits to select an optimal benefit for the user within the context of the transaction. Applicable benefits may be compared on any monetary or nonmonetary scale to select an optimal benefit. In one or more embodiments a user may indicate preferences that may be stored database 2821 to control or influence the selection of an optimal benefit.

In the example shown in FIG. 28, step 2812 selects payment method 2831 and associated cashback benefit 2832. In this situation the additional benefit 2832 associated with payment method 2831 exceeds the benefit 2833 associated with another payment method, so payment method 2831 is selected for the transaction In one or more embodiments some or all of the payment methods 2821 may be associated with a service that generates a single use identifier, such as a virtual credit card PAN (primary account number), that can be used only for a single transaction. For example, selected payment method 2831 in FIG. 28 uses such a system. These types of payment methods provide additional security because numbers cannot be reused if they are stolen or leaked.

FIG. 29 continues the scenario illustrated in FIG. 28 from the point where payment method 2831 is selected. In some situations, the payment assistant 2850 may present this payment method to the user for confirmation before proceeding to use the payment method. (Confirmation may not always be needed or indicated; in one or more embodiments the referral matcher may proceed directly to generate a referral link and to populate payment information using the selected payment method.) When to the system is configured to perform step 2901 to obtain user confirmation, it may for example generate a dialog box 2911 or similar user interface element and display this element on the screen of device 102. Element 2911 may for example present the suggested payment method and may indicate the identified offer 2810, as well as any additional benefits (such as cashback) associated with the payment method. When the user confirms with input 2912 (or if confirmation steps 2901 is not performed), the payment assistant 2850 may then perform step 2903 to populate the application user interface with the payment information for the selected payment method. For some payment methods, this step 2903 may include communication with the issuing institution 2920 or with another payment service, for example to generate a one-time card identifier 2921 that may be used for payment for this transaction exclusively. For some payment methods all of the payment information may be obtained directly from database 2821, without the need to obtain additional data from a financial institution. Payment information may include for example, without limitation, a card number 2931, a name 2932, an expiration date 2933, and any other required data such as addresses or verification codes. The payment information may be obtained directly from payment methods database 2821 or from an institution or service 2920 associated with the selected payment method. The referral matcher may perform step 2902 to generate a referral link or referral code that contains a reference to the associated offer and information that identifies the user or intermediary who will be credited when the offer is activated. This referral link or referral code may for example be a URL encoded with information that identifies the user and the reward, as described above. The referral link may be embedded into the application user interface, for example as one or more parameters associated with the payment information or as a URL that encodes the referral information.

FIG. 30 continues the scenario of FIG. 29 from the point where the user uses the populated payment information to pay for the transaction. When the user presses the button 3001 for example, a message is transmitted to the merchant, payment institution or clearinghouse 2920. The receiving service 2920 may then apply payment, and may credit any benefits associated with the payment method. The referral link included in the transaction information (for example in a URL parameter) may be transmitted to the associated merchant, or to one or more intermediaries. A referral tracker 3010 may also receive a message that the offer has been awarded and may perform step 3011 to record the transaction associated with the offer. In one or more embodiments a subsequent step 3012 may be performed to notify the user or an intermediary that the offer has been received or credited to the account of the user or intermediary. For example, referral tracker 3010 may transmit a message 3013 to the user's device 102 that describes the offer and the associated purchase transaction.

While the invention herein disclosed has been described by means of specific embodiments and applications thereof, numerous modifications and variations could be made thereto by those skilled in the art without departing from the scope of the invention set forth in the claims.

What is claimed is:

1. A system that activates monetization and applies a payment method, comprising:
 a merchant database comprising one or more listings, wherein each listing of said one or more listings comprises
  one or more of a merchant, a name of a merchant, a name of a web site, a product, a service, a brand, a name of a product, a name of a service, a product number, a model number, a product category, an SKU, a person, an organization, a professional;
  one or more shopping cart descriptors, wherein each shopping cart descriptor of said one or more shopping cart descriptors comprises one or more of a URL, a web page element, a page title, a header, a calculation, an input field, a control, a text element, an image element;
 an offers database comprising one or more monetization offers, wherein
  each monetization offer of said one or more monetization offers is associated with one or more of said one or more listings;
  each monetization offer comprises one or more of a coupon, a cashback rate, a discount, a promotion, a savings, a reward, a bonus, a payment, a commission;
 a payment methods database comprising
  one or more payment methods that may be used by a user, wherein each payment method of said one or more payment methods comprises
   one or more of a credit card, a debit card, a gift card, a digital wallet, a funds transfer service, a debt financing product, an installment payment service, a bank account; and,
  user checkout information comprising one or more of a name, a user identifier, an address, a billing address, a shipping address, a phone number, an email address, a password, an expiration date, a security code; information on one more additional benefits available to the user when the user uses the one or more payment methods;
 a computer that executes specific instructions to implement
  a referral matcher coupled to
   an application of a user computer used by said user via a user interface comprising user interface elements and a screen,
   said merchant database, and
   said offers database,
    wherein said referral matcher is configured to
     determine when said application is performing a shopping activity associated with a listing of said one or more listings from said one or more shopping cart descriptors;
     compare said one or more monetization offers associated with said one or more of said one or more listings;
     detect and select a monetization offer in said offers database that is associated with said listing to select the monetization offer for a checkout transaction associated with said shopping activity;
     obtain feedback regarding a value of the monetization offer associated with said listing from the merchant via said user interface after the checkout transaction has been completed to confirm the value of the monetization offer and, generate a referral link based on said monetization offer,
      wherein said referral link contains a reference to said monetization offer and information that identifies said user who will be credited when the monetization offer is activated,
      wherein said referral link is embedded into said user interface of said application as one or more parameters associated with payment information,
      wherein said referral link is clickable and trackable,
      wherein said referral link is presented by modifying or augmenting a message displayed on said user interface,
       such that an image of the message is formatted to incorporate the referral link that is clickable and trackable,
       wherein the image of the message is made clickable or interactive,
  a payment assistant coupled to said application via said user interface comprising said user interface elements and to said payment methods database, wherein said payment assistant is configured to analyze said user interface elements to detect payment related elements from said user interface elements, wherein said user interface elements provide multiple payment options from which the user is able to select, wherein said analyze said user interface elements to make a detection of payment related elements comprises applying at least one filter to obtain all text content from said user interface to detect specific configurations, characteristics, attributes, fields or components of said user interface elements, obtain specific descriptors, specific terms or images, of said user interface elements, or recognize when the user is at or nearing said checkout transaction from a shopping cart descriptor of said one or more shopping cart descriptors that includes any or all of said URL of a web page;

analyze said payment methods database to make a selection of a specific payment method of said one or more payment methods to propose to the user or to apply automatically to the checkout transaction in the application;

compare the one or more additional benefits to select a benefit for the user within a context of the checkout transaction, wherein said compare comprises comparing the one or more additional benefits to a nonmonetary scale to select the benefit, display said specific payment method, said monetization offer and said benefit that are selected on said screen of said user interface;

enter information into said application associated with said specific payment method of said one or more payment methods that is selected, wherein said information comprises said user checkout information associated with said specific payment method; and, update said application to include said referral link when said application makes a payment associated with said listing; and, a referral tracker configured to, when said application makes said payment associated with said listing, receive a message that said monetization offer has been awarded;

record a transaction associated with said monetization offer associated with said referral link;

notify said user that said monetization offer has been received to an account of said user;

transmit a message to said user computer that is displayed on said screen of said user interface used by said user, wherein said message describes the monetization offer and the checkout transaction;

wherein said computer is configured to
in an event of a malfunction,
fix the malfunction automatically.

2. The system that activates monetization and applies a payment method of claim 1, wherein said payment assistant is further configured to:

present said specific payment method to said user via said user interface;

prompt said user to confirm selection of said specific payment method; and, when said user confirms selection of said specific payment method, enter said information into said application.

3. The system that activates monetization and applies a payment method of claim 1, wherein said payment assistant is further configured to:

obtain a single use payment identifier linked to said specific payment method; and, enter said single use payment identifier into said application.

4. The system that activates monetization and applies a payment method of claim 1, wherein said referral link or said referral code comprises an identity of one or more of said user, said listing, a merchant, an intermediary.

5. The system that activates monetization and applies a payment method of claim 4, wherein said referral tracker is further configured to inform one or more of said user, said listing, said merchant, and said intermediary of said transaction associated with said monetization offer.

6. The system that activates monetization and applies a payment method of claim 4, wherein said referral tracker is further configured to inform one or more of said user, said listing, said merchant, and said intermediary when one or more of said coupon, said cashback rate, said discount, said promotion, said savings, said reward, said bonus, said payment, said commission has been activated.

7. The system that activates monetization and applies a payment method of claim 4, wherein said referral tracker is further configured to inform one or more of said user, said listing, said merchant, and said intermediary when one or more of said coupon, said cashback rate, said discount, said promotion, said savings, said reward, said bonus, said payment, said commission has been earned.

8. The system that activates monetization and applies a payment method of claim 4, wherein said referral tracker is further configured to share a portion of said monetization offer with one or more of said user, said listing, said merchant, and said intermediary.

9. The system that activates monetization and applies a payment method of claim 1, wherein said computer is configured to test said one or more links continuously to ensure that URL formatting rules associated with said URL are functioning.

* * * * *